(12) United States Patent
Parsons et al.

(10) Patent No.: US 8,117,992 B2
(45) Date of Patent: Feb. 21, 2012

(54) AQUATIC FARMING SYSTEMS

(75) Inventors: Neal S. Parsons, Casa Grande, AZ (US); Steven De Wayne Wooten, Arizona City, AZ (US); Louis J. Raj, Jr., Queen Creek, AZ (US)

(73) Assignee: Aqua Culture Joint Venture, Gilbert, AZ (US)

( * ) Notice: Subject to any disclaimer, the term of this patent is extended or adjusted under 35 U.S.C. 154(b) by 536 days.

(21) Appl. No.: 12/195,304

(22) Filed: Aug. 20, 2008

(65) Prior Publication Data
US 2009/0050067 A1 Feb. 26, 2009

Related U.S. Application Data

(60) Provisional application No. 60/965,878, filed on Aug. 22, 2007, provisional application No. 60/992,053, filed on Dec. 3, 2007.

(51) Int. Cl.
*A01K 61/00* (2006.01)
(52) U.S. Cl. ......... 119/227; 119/200; 119/215; 119/226
(58) Field of Classification Search .................. 119/227, 119/200, 215, 221, 226, 232
See application file for complete search history.

(56) References Cited

U.S. PATENT DOCUMENTS

| | | | |
|---|---|---|---|
| 3,698,359 A * | 10/1972 | Fremont ...................... | 119/223 |
| 3,756,197 A | 9/1973 | Buss et al. | |
| 3,771,492 A | 11/1973 | Doherty | |
| 3,773,014 A | 11/1973 | Ewald, Jr. | |
| 3,916,834 A | 11/1975 | Buss | |
| 3,981,273 A | 9/1976 | Buss | |
| 3,996,893 A | 12/1976 | Buss | |
| 4,003,337 A | 1/1977 | Moore | |
| 4,213,421 A * | 7/1980 | Droese et al. .................. | 119/224 |
| 4,495,891 A | 1/1985 | Dugan et al. | |
| 4,516,528 A | 5/1985 | Jones | |
| 4,669,420 A | 6/1987 | Swanson | |
| 4,848,275 A | 7/1989 | Swanson | |
| 4,951,606 A | 8/1990 | Hartung | |
| 4,998,505 A * | 3/1991 | Jordan .......................... | 119/218 |
| 5,038,715 A | 8/1991 | Fahs, II | |
| 5,046,451 A | 9/1991 | Inslee et al. | |
| 5,140,941 A | 8/1992 | Takakuwa | |
| 5,178,093 A * | 1/1993 | Reese et al. .................... | 119/226 |
| 5,186,121 A * | 2/1993 | Smith, Jr. ...................... | 119/243 |
| 5,189,981 A | 3/1993 | Ewald, Jr. | |
| 5,227,055 A | 7/1993 | Timmons | |
| 6,443,097 B1 | 9/2002 | Zohar et al. | |
| 6,827,036 B2 | 12/2004 | Connolly | |
| 6,932,025 B2 | 8/2005 | Massingill et al. | |
| 6,932,026 B2 | 8/2005 | Lin | |
| 2007/0056890 A1 | 3/2007 | Johannsson et al. | |
| 2010/0116216 A1 * | 5/2010 | Fuhr et al. ...................... | 119/221 |

* cited by examiner

*Primary Examiner* — Yvonne R. Abbott

(57) ABSTRACT

A system related to inland farming of seafood products within an environmentally-controlled seafood-farming environment. The seafood-farming environment is preferably established within at least one substantially buried space. The associated apparatus preferably comprises at least one nutrient supplier to supply adequate nutrients to at least one aqueous medium supporting the farming of the seafood, and at least one waste remover to remove unwanted waste from the aqueous medium. Surface crops are grown above and around the seafood-farming environment to maximize production within the farming site. A kit and methods of implementation are also discussed.

33 Claims, 25 Drawing Sheets

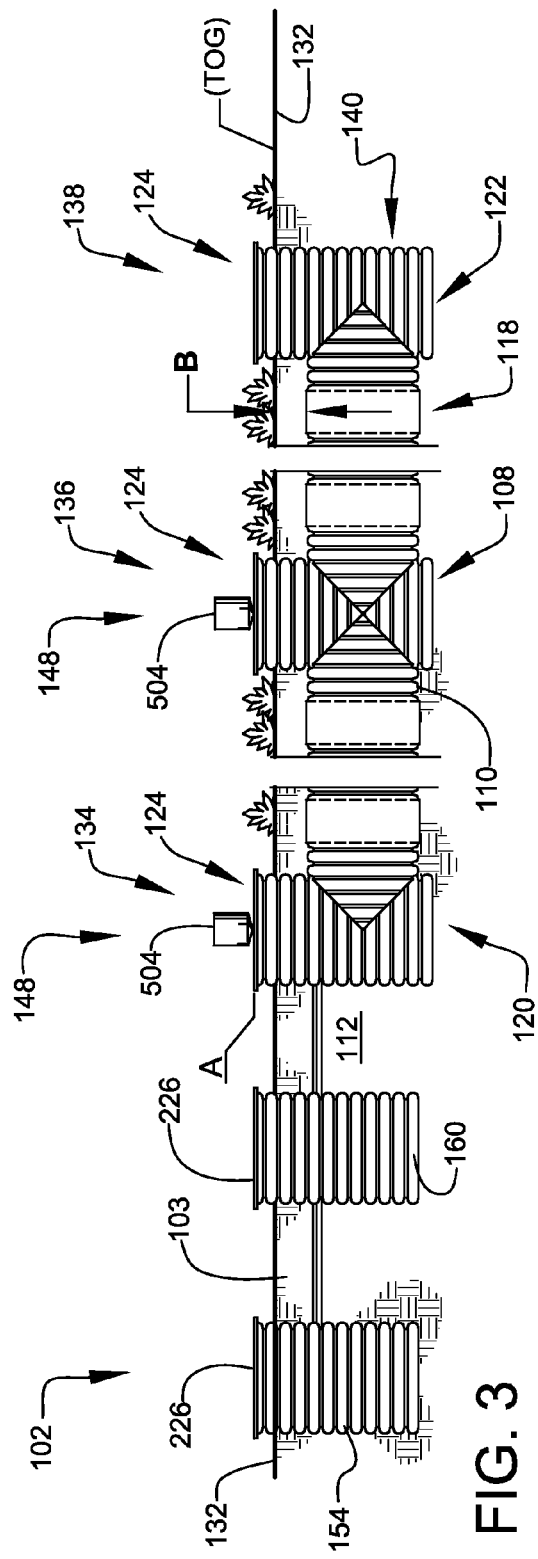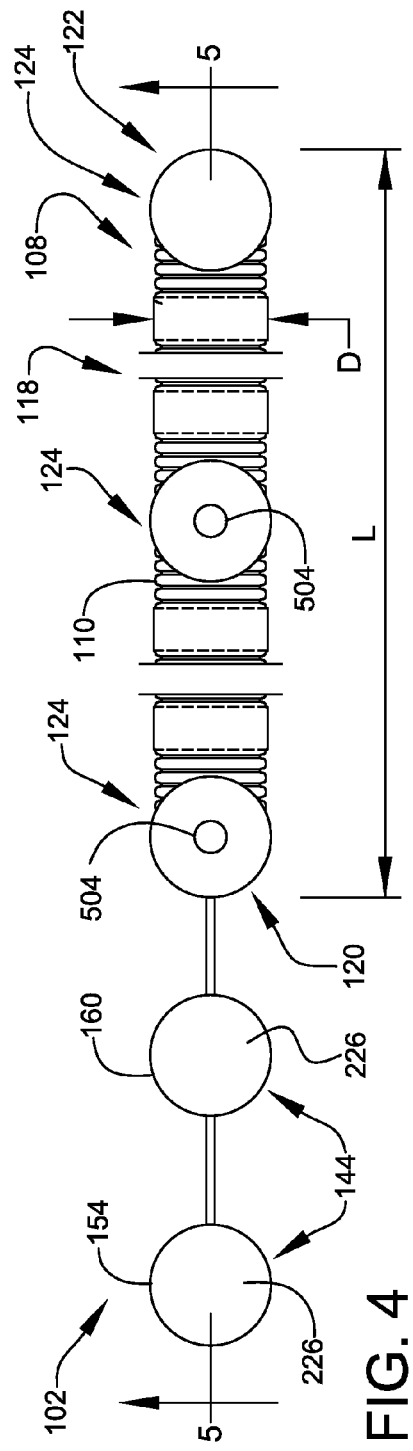

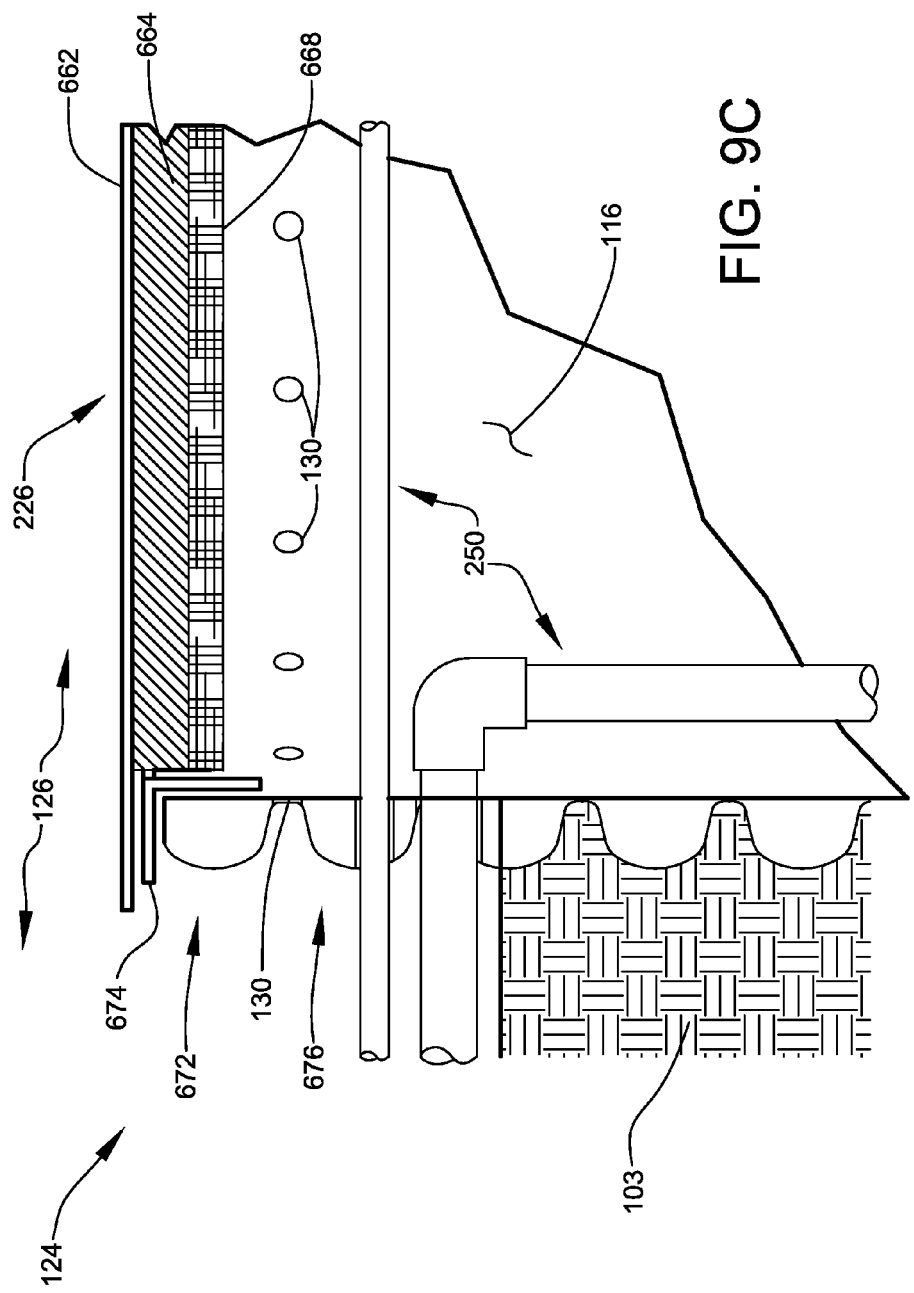

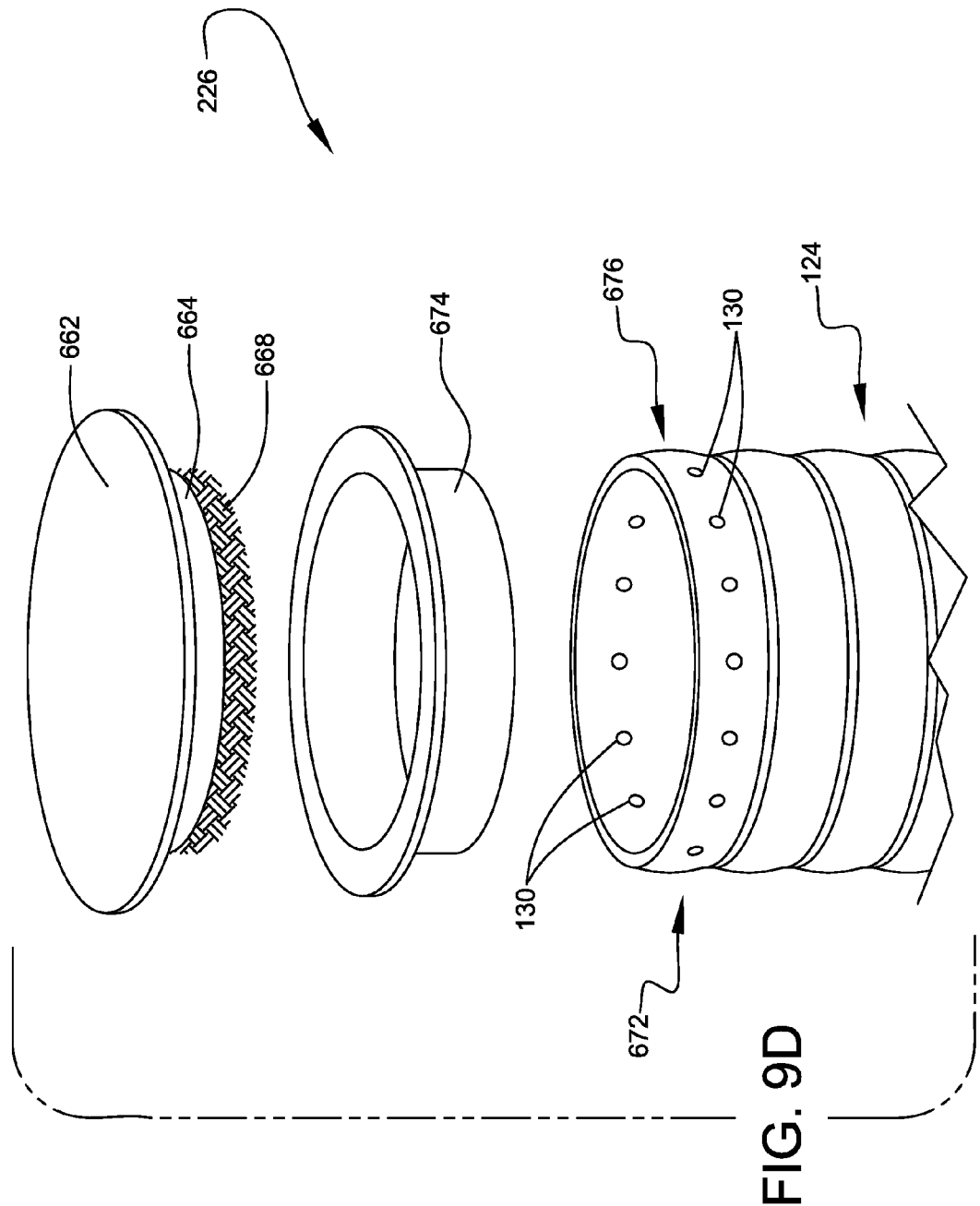

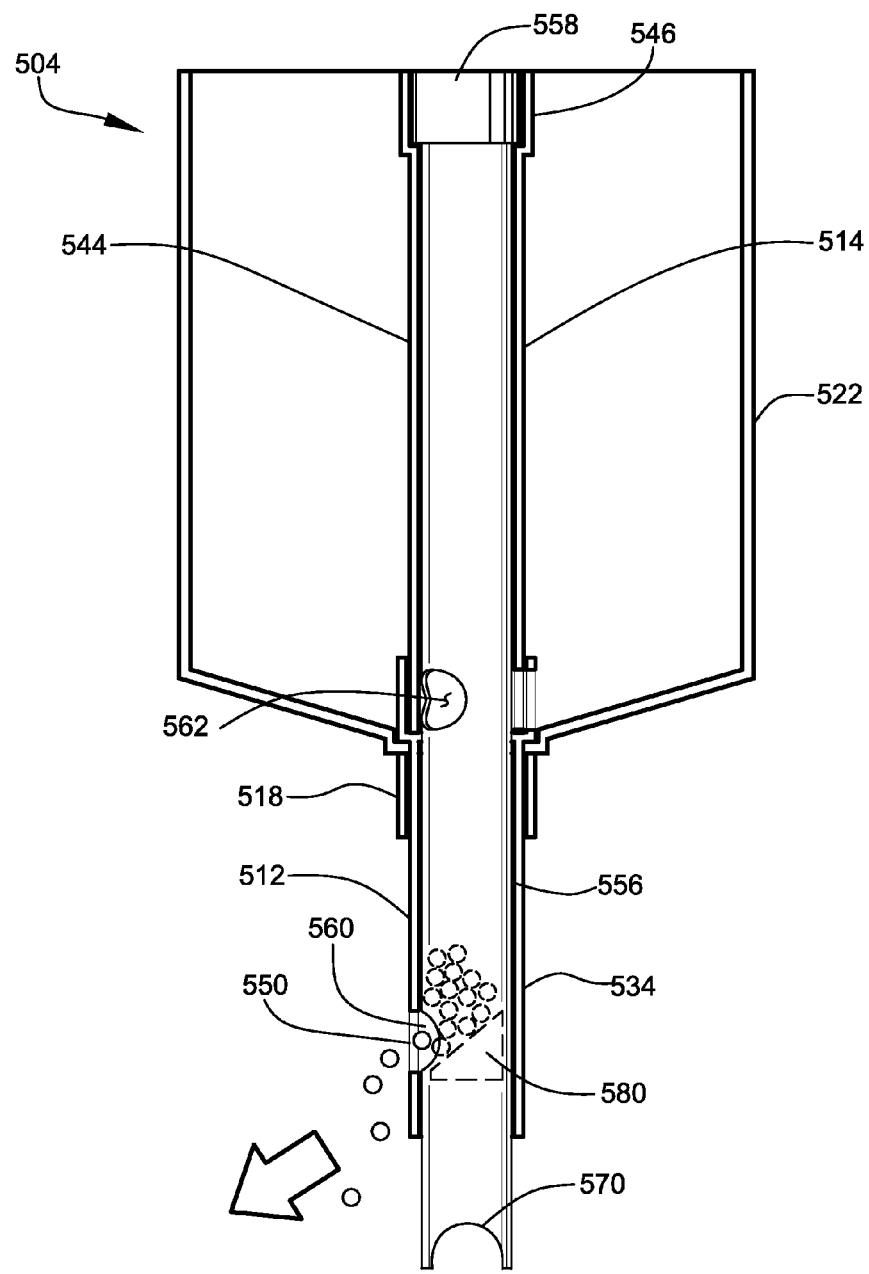
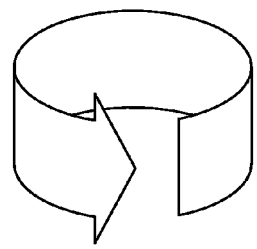
FIG. 20

AQUATIC FARMING SYSTEMS

CROSS-REFERENCE TO RELATED APPLICATION

The present application is related to and claims priority from prior provisional application Ser. No. 60/965,878, filed Aug. 22, 2007, entitled "AQUACULTURE SYSTEMS", and is related to and claims priority from prior provisional application Ser. No. 60/992,053, filed Dec. 3, 2007, entitled "AQUATIC FARMING SYSTEMS" the contents of both of which are incorporated herein by this reference and are not admitted to be prior art with respect to the present invention by the mention in this cross-reference section.

BACKGROUND

This invention relates to providing a system for improved aquatic farming systems. More particularly this invention relates to providing a system for raising seafood in a thermally stable and light-controlled aquatic farming environment.

The commercial farming of seafood, particularly "finfish-type" seafood (including edible fin-bearing fish such as trout, tilapia, etc.) generally involves raising the fish in surface ponds, surface tanks or similar surface enclosures, usually for food. The decline in natural fish stocks due to over fishing and environmental changes will make the efficient farming of seafood an important factor in maintaining an adequate supply of this important food type to growing world populations.

Numerous problems exist for current operators of fish farms utilizing conventional surface-farming techniques. Common problems include inefficient thermal control and excessive algae growth due to uncontrolled sunlight. Inland storms can devastate surface-farmed fish stocks by introducing deleterious quantities of dust and dust-borne bacteria into the surface tanks. In addition, commercial surface farming typically requires large areas of land surface devoted entirely to the aquatic habitat. Clearly, new farming approaches aimed at solving the above-described problems would be of great benefit to this important food industry.

OBJECTS AND FEATURES OF THE INVENTION

A primary object and feature of the present invention is to provide a system overcoming the above-mentioned problems.

It is a further object and feature of the present invention to provide such a system providing profitable production levels of high-quality farm-raised fish products, preferably utilizing unique underground "stable environment" fish farming apparatus and methods.

A further primary object and feature of the present invention is to provide such a system that is efficient, inexpensive, and durable. Other objects and features of this invention will become apparent with reference to the following descriptions.

SUMMARY OF THE INVENTION

In accordance with a preferred embodiment hereof, this invention provides a system related to farming at least one seafood source comprising: at least one seafood-farming-environment apparatus structured and arranged to farm such at least one seafood source in at least one substantially buried space; wherein such at least one seafood-farming-environment apparatus comprises at least one nutrient supplier structured and arranged to supply adequate nutrients to at least one aqueous medium supporting such farming of such at least one seafood source, and at least one waste remover structured and arranged to remove unwanted waste from the at least one aqueous medium. Moreover, it provides such a system wherein such at least one seafood-farming-environment apparatus is structured and arranged such that, when buried, the below-ground burial provides assistance in temperature control of such at least one seafood farming environment.

Additionally, it provides such a system wherein such at least one nutrient supplier comprises at least one aerator structured and arranged to aerate the at least one aqueous medium, and at least one food supplier structured and arranged to supply food to the such at least one seafood source; and such at least one waste remover comprises at least one solid-waste filter structured and arranged to filter solid-waste materials from the at least one aqueous medium, and at least one chemical controller structured and arranged to maintain, within the at least one aqueous medium, a safe level of deleterious chemical contaminants compatible with the farming of such at least one seafood source. Also, it provides such a system wherein such at least one seafood-farming-environment apparatus further comprises: at least one substantially enclosed container structured and arranged to contain such at least one aqueous medium and such at least one seafood source; wherein such at least one substantially enclosed container comprises at least one containment boundary structured and arranged to provide boundary containment of the at least one aqueous medium and such at least one seafood source. In addition, it provides such a system wherein: such at least one seafood-farming-environment apparatus is structured and arranged such that, when buried, the below-ground burial provides assistance in limiting photo illumination within such at least one substantially enclosed container; such limiting of photo illumination assists in inhibiting the growth of deleterious photosynthetic microorganisms within such at least one substantially enclosed container of such at least one seafood farming environment.

And, it provides such a system wherein such at least one seafood-farming-environment apparatus further comprises at least one liquid circulation network structured and arranged to circulate the at least one aqueous medium sequentially between such at least one substantially enclosed container, such at least one solid waste filter, and such at least one chemical controller. Further, it provides such a system wherein such at least one substantially enclosed container comprises: at least one substantially elongated tube structured and arranged to comprise at least one hollow interior; wherein such at least one hollow interior is defined by such at least one containment boundary; wherein such at least one containment boundary is structured and arranged to substantially surround the at least one aqueous medium and such at least one seafood source; and such at least one substantially elongated tube is oriented substantially horizontally within at least one underground environment external of such at least one containment boundary.

Even further, it provides such a system further comprising: at least one accessway structured and arranged to provide access to such at least one hollow interior from at least one aboveground environment; wherein such at least one accessway comprises at least one above-ground access opening structured and arranged to provide access to such at least one hollow interior; and at least one air-exchanging passage structured and arranged to provide at least one exchange of air between the at least one aboveground environment and such at least one hollow interior; wherein such at least one exchange of air between the at least one aboveground environment and such at least one hollow interior provides fluid communication between the air and the at least one aqueous medium.

Moreover, it provides such a system wherein: such at least one substantially elongated tube comprises at least one first terminating end portion, at least one second terminating end portion, and at least one tube length extending therebetween; such at least one first terminating end portion comprises at least one first such at least one accessway; and such at least one second terminating end portion comprises at least one second such at least one accessway. Additionally, it provides such a system wherein: such at least one substantially elongated tube comprises at least one third such at least one accessway structured and arranged to provide at least one third access to such at least one hollow interior from at least one aboveground environment; and such at least one at least one third such at least one accessway is situated between such at least one first terminating end portion and such at least one second terminating end portion. Also, it provides such a system wherein such at least one liquid circulation network comprises: at least one circulator pump structured and arranged to provide pump-assisted circulation of the at least one aqueous medium within such at least one liquid circulation network; and at least one control valve structured and arranged to controllably alter the sequence of circulation of the at least one aqueous medium between such at least one substantially enclosed container, such at least one solid-waste filter, and such at least one chemical controller.

In addition, it provides such a system such at least one solid-waste filter comprises: at least one solid-waste tank structured and arranged to contain an amount of the at least one aqueous medium to be filtered of the solid-waste materials; at least one solid-waste-tank inlet structured and arranged to inlet at least one flow of the at least one aqueous medium, containing unsettled quantities of the solid waste materials; removably located within such at least one solid-waste tank, at least one solid-waste receptacle structured and arranged to receive the at least one flow from such at least one solid-waste-tank inlet; wherein such at least one liquid circulation network is structured and arranged to deliver the at least one aqueous medium, containing the unsettled quantities of the solid waste materials, to such at least one solid-waste-tank inlet from such at least one substantially enclosed container; wherein such at least one solid-waste receptacle comprises at least one peripheral wall structured and arranged to define at least one hollow interior portion; wherein such at least one peripheral wall comprises at least one selectively-permeable wall material structured and arranged to selectively restrict passage of the solid waste materials and selectively allow the passage of the at least one aqueous medium therethrough; wherein the solid waste materials selectively removed from the at least one aqueous medium are retained within the at least one hollow interior portion; wherein such at least one solid-waste filter further comprises at least one solid-waste-tank outlet structured and arranged to outlet at least one flow of the at least one aqueous medium, substantially free of unsettled quantities of the solid waste materials, to such at least one chemical controller. And, it provides such a system wherein: the at least one aqueous medium, containing the unsettled quantities of the solid waste materials, is introduced into such at least one solid-waste receptacle under fluid pressure generated by such at least one circulator pump; and the at least one circulator pump is further structured and arranged to fragment the solid waste materials prior to reaching such at least one solid-waste tank.

Further, it provides such a system wherein: such at least one chemical controller comprises at least one biological filter structured and arranged to biologically filter the at least one aqueous medium; wherein such biological filter controls levels of the deleterious chemical contaminants through at least one biological process utilizing at least one biofiltering microorganism. Even further, it provides such a system wherein such at least one biological filter comprises: at least one biofilter tank structured and arranged to contain an amount of the at least one aqueous medium to be biologically filtered; and located in fluid communication with the at least one aqueous medium contained within such at least one biofilter tank, primary biological support media structured and arranged to support colonization and growth of the at least one biofiltering microorganism; wherein such at least one biofilter tank comprises at least one biofilter-tank inlet structured and arranged to be in fluid communication with such at least one liquid circulation network, and at least one biofilter-tank outlet structured and arranged to outlet the at least one aqueous medium from such at least one biofilter tank to such at least one liquid circulation network; wherein such at least one liquid circulation network is structured and arranged to such at least one substantially enclosed container. Moreover, it provides such a system wherein such at least one biological filter further comprises: located in fluid communication with the at least one aqueous medium of such at least one biofilter tank, at least one substantially cylindrical support surface structured and arranged to support such primary biological support media in at least one position forming at least one outer annular layer substantially covering such at least one cylindrical support surface; wherein such at least one cylindrical support surface comprises at least one biomedia rotator structured and arranged to rotate such primary biological support media about a substantially vertical axis of rotation within the at least one aqueous medium of such at least one biofilter tank; wherein such at least one biomedia rotator comprises at least one fluid coupler structured and arranged to operably couple such at least one biomedia rotator to such at least one liquid circulation network; and at least one first fluid-ejecting nozzle structured and arranged to generate at least one torque force by pressurized ejection of the at least one aqueous medium; and wherein operation of such at least one first fluid-ejecting nozzle is enabled by pressurization of the at least one aqueous medium by such at least one circulator pump.

Additionally, it provides such a system wherein: such at least one cylindrical support surface defines at least one hollow interior portion structured and arranged to hold at least one tertiary filter media; both such at least one cylindrical support surface and such at least one secondary filter media are structured and arranged to be substantially permeable to the at least one aqueous medium; and the tertiary filter media within such at least one hollow interior portion is in fluid communication with the at least one aqueous medium. Also, it provides such a system wherein such at least one biological filter further comprises: at least one biofilter cleaner structured and arranged to clean particulates from such at least one outer annular layer of such at least one biological support media; wherein such at least one biofilter cleaner comprises at least one second fluid-ejecting nozzle structured and arranged to flush the at least one outer annular layer with at least one pressurized stream of the at least one aqueous medium. In addition, it provides such a system wherein such at least one aerator comprises: at least one fluid coupler structured and arranged to operably couple such at least one aerator to such at least one liquid circulation network, and at least one sprayer structured and arranged to generate at least one dispersing spray of the at least one aqueous medium; wherein operation of such at least one sprayer is enabled by pressurization of the at least one aqueous medium by such at least one circulator pump; and wherein passage of the at least one dispersing spray through the air assists in maintaining levels of dissolved oxygen within the at least one aqueous medium. And, it provides such a system wherein such at least one sprayer comprises: a plurality of spray nozzles, each one structured and arranged to generate the at least one dispersing spray; and at least one spray rotator structured and arranged to rotate such plurality of spray nozzles; wherein such at least one spray rotator comprises at least one third fluid-ejecting nozzle structured and arranged to generate at least one torque force by pressurized ejection of the at least one aqueous medium; and wherein operation of such at least one third fluid-ejecting nozzle is enabled by pressurization of the at least one aqueous medium by such at least one circulator pump.

Further, it provides such a system wherein such at least one aerator is located within each such at least one accessway. Even further, it provides such a system wherein such at least one aerator comprises at least one torque force coupler structured and arranged to transfer at least one portion of the at least one torque force. Moreover, it provides such a system wherein such at least food supplier comprises: at least one food holder structured and arranged to hold at least one volume of food; wherein such at least one food holder is structured and arranged to store the at least one volume of food in a weather-tight condition; wherein such at least one food holder is structured and arranged to provide at least one timed food release; wherein such at least one food holder is structured and arranged to provide at least one measured quantity food release; wherein such at least one food holder is structured and arranged to provide food distribution in an aquatic environment wherein such at least one food holder is structured and arranged to couple with such at least one torque force coupler; whereby when coupled with such at least one torque force coupler, such at least one food holder provides timed distribution of a measured quantity of food. Additionally, it provides such a system wherein such at least food supplier comprises at least one above-ground food holder structured and arranged to provide timed distribution of a measured quantity of food below ground.

Also, it provides such a system according wherein such at least food supplier further comprises: at least one food conduit structured and arranged to assist transfer of the food from above-ground to below-ground using gravity; wherein such at least one food conduit comprises at least two nested rotating tubes; wherein each of such at least two nested rotating tubes comprising at least one respective aperture, in alignment with each other respective aperture, and structured and arranged to allow food passage when such apertures overlap during rotation of such at least two nested rotating tubes; wherein rotation of such at least two nested rotating tubes allows food passage when such apertures overlap. In addition, it provides such a system wherein controlling the rotation speed of such at least two nested rotating tubes provides measured quantity food release. And, it provides such a system wherein varying at least one aperture area of such at least one respective aperture provides measured quantity food release. Further, it provides such a system wherein such at least one timed food release is a continuous food release. Even further, it provides such a system wherein: each such at least one accessway comprises at least one removable accessway cover structured and arranged to removably cover such at least one above-ground access opening; wherein each at least one removable accessway cover comprises at least one lower cover surface structured and arranged to be, when covering such at least one above-ground access opening, oriented generally toward such at least one hollow interior, and fitted to such at least one lower cover surface, at least one secondary biological support media structured and arranged to support colonization and growth of the at least one biofiltering microorganism; wherein the at least one dispersing spray generated by each one of such plurality of spray nozzles is directed to impinge such at least one secondary biological support media. Moreover, it provides such a system wherein such at least one containment boundary comprises at least one heat-exchanging composition structured and arranged to assist exchange of thermal heat between the at least one aqueous medium within such at least one containment boundary and at least one underground environment external of such at least one containment boundary.

Additionally, it provides such a system wherein such at least one substantially enclosed container further comprises at least one hollow cylindrical pipe having a diameter of between about 24 inches and about 48 inches. Also, it provides such a system wherein: such at least one hollow cylindrical pipe is of a type utilized in gravity-flow wastewater applications; and such at least one hollow cylindrical pipe comprises at least one substantially non-metallic composition. In addition, it provides such a system wherein such at least one seafood-farming-environment apparatus substantially comprises non-corrosive materials; and such non-corrosive materials comprise compositions substantially nontoxic to such at least one seafood source. And, it provides such a system wherein such at least one hollow cylindrical pipe is oriented substantially horizontally during such below-ground burial. Further, it provides such a system wherein such at least one hollow cylindrical pipe comprises a linear length, extending between such at least one first terminating end portion and such at least one second terminating end portion, of between about 100 feet and about 300 feet. Even further, it provides such a system wherein such at least one solid-waste tank and such at least one biofilter tank each comprise a liquid-holding capacity of at least about 500 gallons.

Moreover, it provides such a system further comprising: at least one harvesting tool structured and arranged to assist the harvesting of such at least one seafood source; wherein such at least one harvesting tool comprises at least one screen structured and arranged to screen such at least one seafood source from the at least one aqueous medium within such at least one hollow interior, and at least one screen tether structured and arranged to draw such at least one screen along such at least one hollow interior between such at least one first terminating end portion and such at least one second terminating end portion; wherein harvesting of such at least one seafood source from such at least one second such at least one accessway is assisted by moving such at least one seafood source toward such at least one second terminating end portion. Additionally, it provides such a system further comprising: at least one inland site structured and arranged to support the burial of such at least one seafood-farming-environment apparatus; and such at least one aqueous medium; wherein at least one aqueous medium substantially comprises liquid water derived from at least one water source of such at least one inland site. Also, it provides such a system further comprising, within such at least one inland site, at least one seafood processing facility structured and arranged to process substantially on-site such at least one seafood source harvested from such at least one seafood-farming-environment apparatus.

In accordance with another preferred embodiment hereof, this invention provides a method related to seafood farming comprising the steps of: selecting at least one seafood source; providing at least one substantially buried space adaptable to farming such at least one seafood source; providing at least one seafood farming environment structured and arranged to farm such at least one seafood source in such at least one substantially buried space; and farming such at least one seafood source in such at least one farming environment; wherein such step of providing such at least one seafood farming environment comprises providing at least one aqueous medium within which to farm such at least one seafood source, providing at least one nutrient supplier structured and arranged to supply adequate nutrients to at least one aqueous medium supporting such farming of such at least one seafood source, and providing at least one waste remover structured and arranged to remove unwanted waste from the at least one aqueous medium.

In addition, it provides such a method further comprising the steps of providing at least one seafood processing facility structured and arranged to process substantially on-site such at least one seafood source harvested from such at least one substantially buried space. And, it provides such a method further comprising the steps of: selecting at least one surface-grown farm product; providing, disposed at an elevation vertically above such at least one substantially buried space, at least one surface space adaptable to farming such at least one surface-grown farm product; providing at least one surface farming environment structured and arranged to farm such at least one surface-grown farm product within such at least one at least one surface space; and surface farming such at least one surface-grown farm product utilizing such at least one surface farming environment. Further, it provides such a method further comprising the steps of: extracting from such farming of such at least one seafood source at least one aquatic-farming-associated byproduct beneficially usable in such surface farming; and utilizing such at least one farming-associated byproduct to beneficially enhance such surface farming. Even further, it provides such a method further comprising the steps of: identifying at least one production time-cycle of such at least one aquatic food source, wherein such at least one production time-cycle comprises at least one cycle start time and at least one cycle harvest time; providing a plurality of substantially buried spaces each one adaptable to farming at least one such at least one aquatic food source; providing within each substantially buried space of such plurality of substantially buried spaces, at least one aquatic farming environment structured and arranged to farm such at least one aquatic food source; using such at least one production time-cycle to farm such at least one aquatic food source in each such at least one farming environment; and staggering sequentially at least two such at least one cycle harvest times; wherein at least one extended harvest duration may be established.

In accordance with another preferred embodiment hereof, this invention provides a kit system related to the on-site construction of at least one underground aquatic farming environment useful in aquatic farming of at least one aquatic species, such kit comprising: a plurality of direct-burial pipe components structured and arranged to comprise, when assembled, at least one substantially buried watertight container; wherein such at least one substantially buried watertight container is structured and arranged to contain liquid water supporting such aquatic farming of the at least one aquatic species; wherein such at least one substantially watertight container comprises at least one water-inlet connector to connect such at least one substantially watertight container to at least one source of the liquid water, at least one nutrient supplier structured and arranged to supply adequate nutrients to the liquid water contained within such at least one substantially watertight container, at least one waste remover structured and arranged to remove unwanted waste from the liquid water contained within such at least one substantially watertight container, and at least one liquid circulation network structured and arranged to circulate the liquid water between such at least one substantially buried watertight container, such at least one waste remover. Even further, it provides such a kit system wherein such pluralities of direct-burial pipe components are of at least one type utilized in gravity-flow wastewater applications.

In accordance with another preferred embodiment hereof, this invention provides a method related to the establishment of at least one aquatic farming environment useful in aquatic farming of at least one aquatic species, such method comprising the steps of: forming at least one substantially watertight container comprising pipe utilized in gravity-flow wastewater applications; burying such at least one substantially watertight container substantially underground; coupling to at least one such at least one substantially watertight container at least one water source structured and arranged to provide liquid water supporting such aquatic farming of the at least one aquatic species, at least one nutrient supplier structured and arranged to supply adequate nutrients to the liquid water supporting such aquatic farming of the at least one aquatic species, and at least one waste remover structured and arranged to remove unwanted waste from the liquid.

In accordance with another preferred embodiment hereof, this invention provides a method, relating to the establishment of at least one substantially-underground aquatic farming environment useful in aquatic farming of at least one aquatic species, comprising the steps of: licensor-offering, to at least one potential licensee, to license intellectual property relating to such at least one substantially-underground aquatic farming environment in at least one territory including at least one proposed farming site; licensor-offering, to such at least one potential licensee, to assist in providing materials and information relating to on-site construction, relating to such at least one proposed farming site, of at least one such substantially-underground aquatic farming environment; receiving at lest one contractual agreement, from such at least one potential licensee, relating to at least one such licensor-offering; and providing, with assistance from at least one such licensor, relating to such at least one contractual agreement, to at least one such licensee, such materials and information; wherein such at least one contractual agreement is monetized to provide consideration to such at least one licensor. Even further, it provides such a method, wherein such step of providing such materials and information comprises providing: a plurality of direct-burial pipe components structured and arranged to comprise, when assembled, at least one substantially buried watertight container; wherein such at least one substantially buried watertight container is structured and arranged to contain liquid water supporting such aquatic farming of such at least one aquatic species; wherein such at least one substantially watertight container comprises at least one water-inlet connector to connect such at least one substantially watertight container to at least one source of the liquid water, at least one nutrient supplier structured and arranged to supply adequate nutrients to the liquid water contained within such at least one substantially watertight container, at least one waste remover structured and arranged to remove unwanted waste from the liquid water contained within such at least one substantially watertight container, and at least one liquid circulation network structured and arranged to circulate the liquid water between such at least one substantially buried watertight container and such at least one waste remover. Even further, it provides such a method, further comprising the step of providing, with assistance from at least one such licensor, relating to such at least one contractual agreement, to at least one such licensee, assistance in transport of crops from such farming to be packaged and distributed. Even further, it provides such a method, further comprising the step of providing, with assistance from at least one such licensor, relating to such at least one contractual agreement, to at least one such licensee, assistance with monetizing crops from such farming. And it provides each and every novel feature, element, combination, step and/or method disclosed or suggested by this patent application.

BRIEF DESCRIPTION OF THE DRAWINGS

FIG. 3 shows a side elevational view, in partial section, of the seafood-farming apparatus, situated in a substantially below ground position, according to the preferred embodiment of FIG. 1.

FIG. 4 shows a top view of the seafood-farming apparatus of FIG. 1.

FIG. 9C shows the enlarged sectional view 9C of FIG. 9A, illustrating the preferred construction of an insulated cover for the seafood-growing container, according to a preferred embodiment of the present invention.

FIG. 9D shows a partial exploded perspective view, of the primary components of the insulated cover, according to the preferred embodiment of FIG. 9C.

FIG. 20 shows a perspective view illustrating the feeder mechanism of the automated feeding sub-system of FIG. 1 in preferred operation.

DETAILED DESCRIPTION OF THE BEST MODES AND PREFERRED EMBODIMENTS OF THE INVENTION

Figure 1:
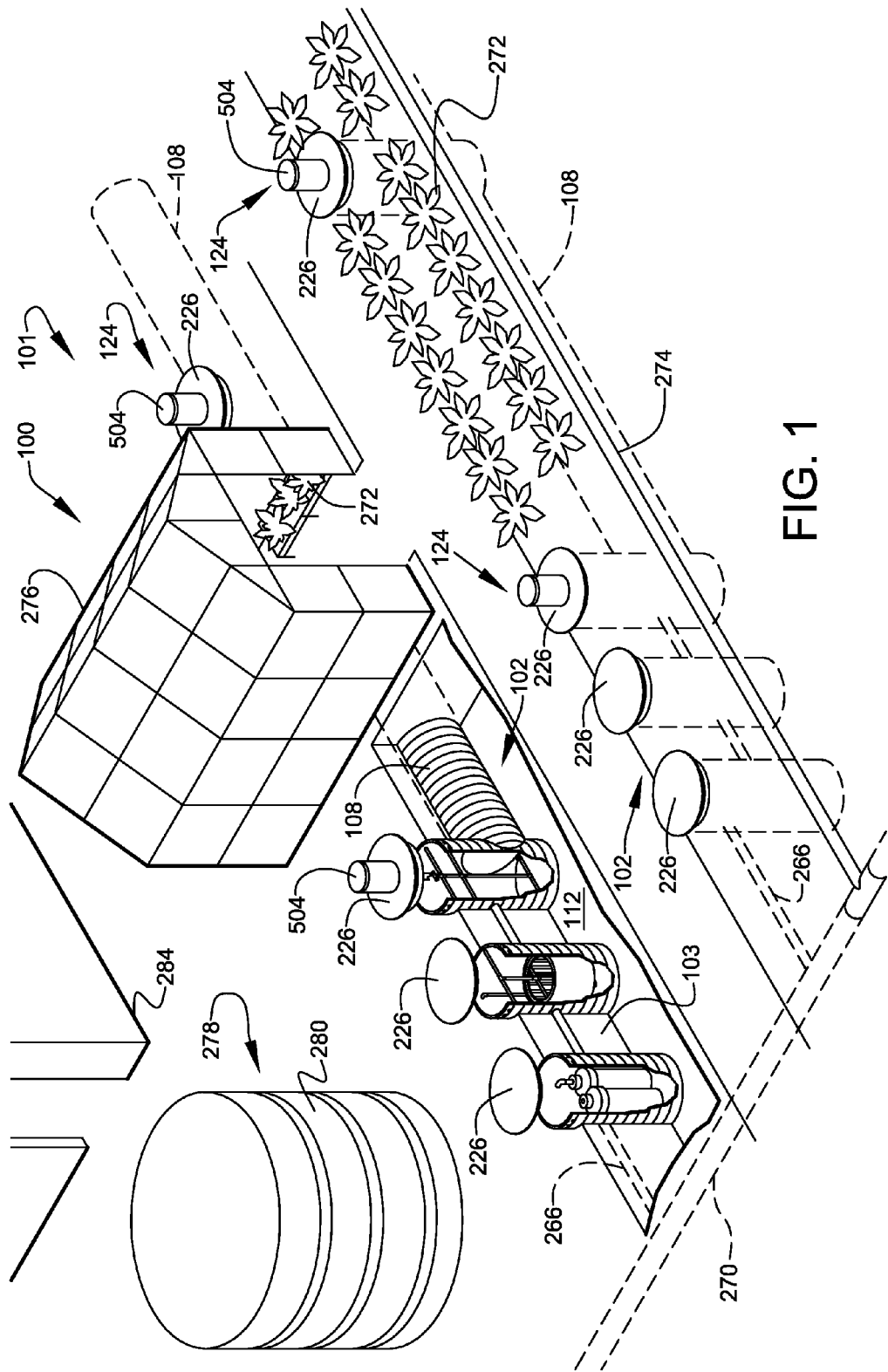
FIG. 1 shows a perspective view, diagrammatically illustrating a high-density farm site combining controlled-environment aquatic-seafood farming with surface-grown crop production, according to preferred embodiments of the present invention.
Figure 2:
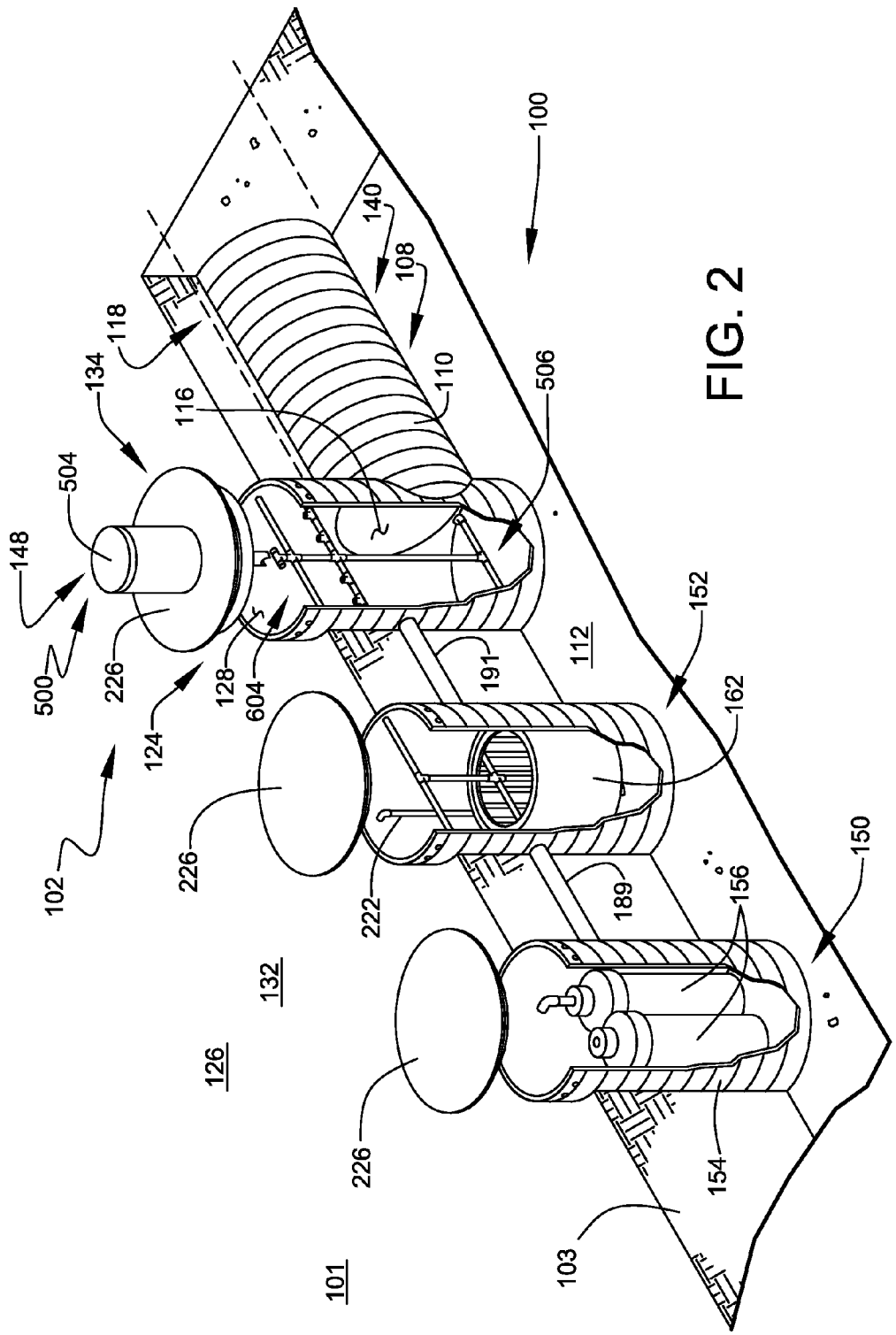
FIG. 2 shows a partial cutaway perspective view, illustrating preferred arrangements of a seafood-farming apparatus, according to a preferred embodiment of FIG. 1.
Figure 5:
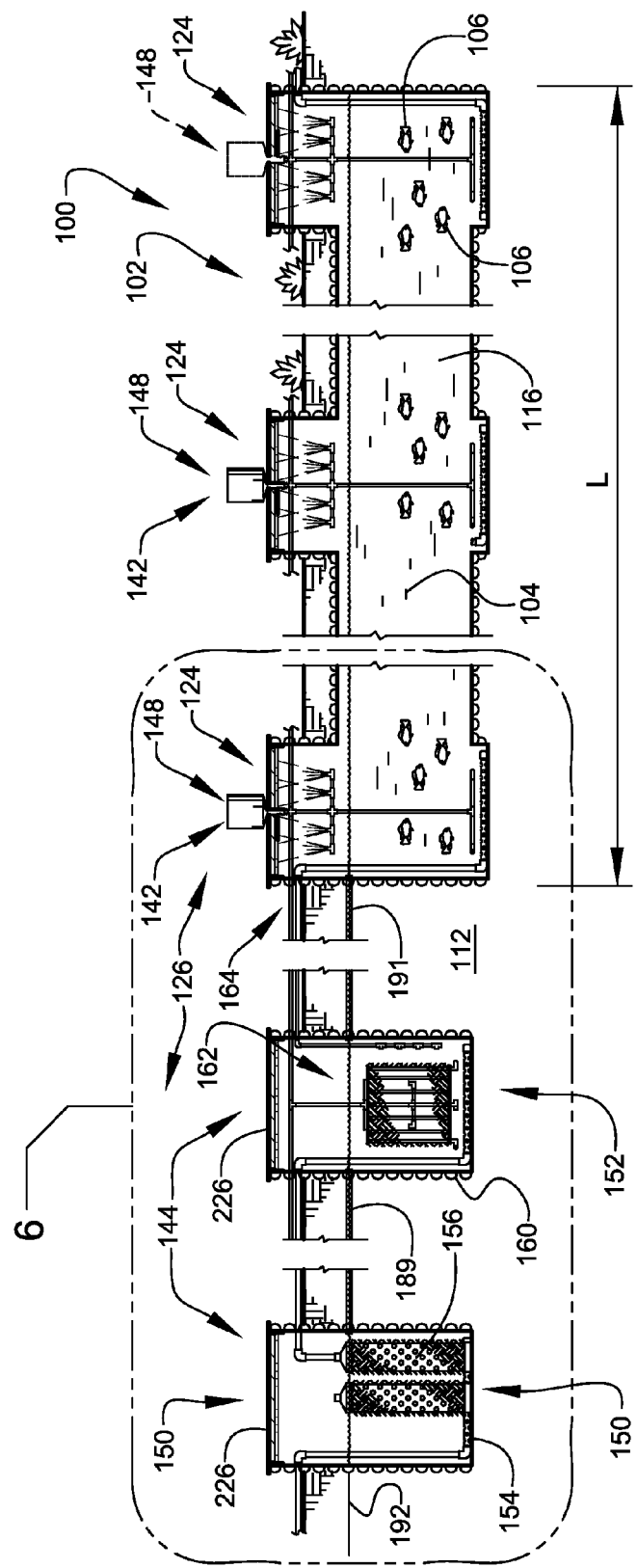
FIG. 5 shows a sectional view through the section 5-5 of FIG. 4, illustrating interior features of the seafood-farming apparatus of FIG. 1.

FIG. 1 shows a perspective view diagrammatically illustrating high-density farming site 101, preferably combining below-ground aquatic-seafood farming with surface-grown crop production, according to preferred embodiments of the present invention. FIG. 2 shows a partial cutaway perspective view illustrating preferred arrangements of the seafood-farming apparatus 102 of FIG. 1. FIG. 3 shows a side elevational view, in partial section, of seafood-farming apparatus 102 situated in a substantially-below-ground position, according to the preferred embodiment of FIG. 1. FIG. 4 shows a top view of seafood-farming apparatus 102 of FIG. 1. FIG. 5 shows a sectional view through the section 5-5 of FIG. 4, illustrating interior features of seafood-farming apparatus 102 of FIG. 1. The structures and arrangements depicted in FIG. 1 through FIG. 5 comprise preferred embodiments of aquatic farming system 100.

In reference to FIG. 1 through FIG. 5, aquatic farming system 100 preferably comprises one or more below-ground seafood production components, individually identified herein as seafood-farming apparatus 102, as shown. Seafood-farming apparatus 102 preferably provides a controlled growing environment suitable for supporting the production of a diverse range of "seafood" products. In the present disclosure, the term "seafood" shall include in its definition both freshwater and saltwater aquatic animal species. Such "seafood" species shall preferably include finfish such as, for example, tilapia, catfish, carp, trout, etc. Upon reading the teachings of this specification, those of ordinary skill in the art will now understand that, under appropriate circumstances, considering such issues as commercial demand, farming costs, regulatory considerations, etc., the below-ground production of other plant and animal species, such as crayfish, lobster, clams, oysters, shrimp, cephalopods (squid and octopus), non-photosynthetic members of the plant kingdom (mushrooms fungus), etc., may suffice.

Seafood-farming-environment apparatus 102 is preferably designed to increase the production rate of the aquatic farm stock by insulating the growth stock from the rigors of weather and predation while minimizing overall amounts of water necessary to complete a grow-out/harvest cycle. Generally stated, seafood-farming apparatus 102 preferably utilizes a substantially buried space to form a protected environment conducive to the production of one or more of the above-described seafood sources (at least embodying herein at least one seafood-farming-environment apparatus structured and arranged to farm such at least one seafood source in at least one substantially buried space). The preferred substantially-below-ground location of seafood-farming apparatus 102 takes advantage of the inherent thermal stability of the surrounding earth. In the preferred embodiment of FIG. 1, the external thermal mass of the ground 103 is used to passively control the temperature of aqueous medium 104 (see FIG. 5) within seafood-farming apparatus 102 (at least embodying herein wherein such at least one seafood-farming-environment apparatus is structured and arranged such that, when buried, the below-ground burial provides assistance in temperature control of such at least one seafood farming environment).

Seafood-farming apparatus 102 preferably comprises a substantially enclosed container 108 designed to contain aqueous medium 104 and at least one seafood source 106 (as best illustrated in FIG. 5). It is noted that aqueous medium 104 preferably comprises either freshwater (containing low concentrations of dissolved salts and other total dissolved solids) or saltwater amended with an appropriate level of salts/minerals to essentially replicate seawater. Upon reading the teachings of this specification, those of ordinary skill in the art will now understand that, under appropriate circumstances, considering such issues as seafood species, farming technique, etc., other aqueous mediums, such as enzyme enriched solutions, aqueous solutions containing dechlorinators/chelating agents, aqueous solutions containing fertilizers, aqueous solutions containing protective colloid compounds to reinforce the natural coating of the finfish body, etc., may suffice.

Substantially enclosed container 108 preferably comprises an outer containment boundary 110, as shown. Containment boundary 110 preferably comprises at least one heat-exchanging composition selected to assist exchange of thermal heat between aqueous medium 104 (adjacent the interior face of containment boundary 110) and underground environment 112 external of containment boundary 110. A hollow interior 116 is preferably defined by the surrounding containment boundary 110, as shown. To maximize the thermal advantages of direct in-ground burial, containment boundary 110 surrounds substantially the entire volume of aqueous medium 104 contained within enclosed container 108, as shown. This preferred arrangement serves to maximize thermal transfer between aqueous medium 104 and the surrounding earth. Enclosed container 108 preferably comprises a minimum earth-coverage depth B of about 24 inches below top of grade (TOG), as best illustrated in FIG. 3. Upon reading the teachings of this specification, those of ordinary skill in the art will now understand that, under appropriate circumstances, considering such issues as surface farming arrangements, container construction, etc., other burial depths, such as greater depths to avoid seasonal ground freezing, greater depths to take advantage of geothermal phenomenon, near-surface depths to avoid rock strata, near-surface depths to avoid underground utilities, etc., may suffice.

The underground burial of enclosed container 108 provides a preferred secondary benefit in that it suppresses the development of potentially harmful photosynthetic organism populations within the aquatic farming environment. In conventional surface farming, harmful overgrowth of algae is a major contributor to the disruption of production and loss of aquatic stock. It is recognized that overgrowth of algae can be a contributor in the failure of biofilter systems critical to the control of harmful chemicals within the aqueous medium. The cause of this phenomenon is not clearly understood, but may occur as the algae compete with beneficial nitrifying bacteria. In addition, high levels of photosynthetic-organism activity can significantly alter the pH of the water (aqueous medium 104) creating an adverse condition for both the beneficial nitrifying bacteria and seafood source 106.

Enclosed container 108 preferably eliminates the growth of substantially all photosynthetic organisms, including algae, by removing photo illumination (sunlight) from the seafood-farming environment (at least embodying herein wherein such at least one seafood-farming-environment apparatus is structured and arranged such that, when buried, the below-ground burial provides assistance in limiting photo illumination within such at least one substantially enclosed container; and such limiting of photo illumination assists in inhibiting the growth of deleterious photosynthetic microorganisms within such at least one substantially enclosed container of such at least one seafood farming environment). Thus, seafood-farming apparatus 102 generates a substantially continuous nocturnal environment highly suitable for the rearing of compatible aquatic species, such as, for example, some cichlid finfish including those of the genus *Tilapia*.

The preferred external geometry of enclosed container 108 is that of an elongated tube 118, as shown. Elongated tube 118 preferably comprises first terminating end portion 120, second terminating end portion 122, and at least one tube length L extending therebetween (as best shown in FIG. 4). The preferred length L of elongated tube 118 is variable and is preferably selected based on available length of the buried site, intended capacity of seafood production, etc. A preferred embodiment of elongated tube 118 comprises a length L of about 200 linear feet. Most preferably, elongated tube 118 comprises a hollow cylindrical-shaped pipe (a right cylinder) having a cross sectional diameter D of between about 24 inches and about 48 inches (the smaller diameter being preferred for hatching and growth of fingerlings).

Elongated tube 118 preferably comprises at least one accessway 124 to provide vertical access to hollow interior 116 from aboveground environment 126, as shown. Each accessway 124 preferably comprises at least one aboveground access opening 128, as shown. Access opening 128 is preferably located at an elevation A of about 12 inches above the surrounding grade 132, and is preferably of a sufficient diameter to allow passage of an adult human (thus facilitating inspection and maintenance of hollow interior 116). The preferred elevation A of about 12 inches protects access opening 128 from flooding/ground crop irrigation and maintains access opening 128 at a convenient elevation for human access.

Each accessway 124 preferably comprises at least one air-exchanging passage 130 (see also FIG. 9C) to provide at least one exchange of air between aboveground environment 126 and hollow interior 116, as shown. This exchange of air between aboveground environment 126 and hollow interior 116 establishes a condition of fluid communication between the ambient air and aqueous medium 104. This preferred feature is of critical importance to maintaining adequate levels of dissolved oxygen in aqueous medium 104, as further described in FIG. 9A.

Elongated tube 118 preferably comprises a plurality of accessways 124, as shown. An elongated tube 118 comprising the preferred length L (of about 200 linear feet) preferably comprises at least three separate accessways 124, as shown. In a preferred arrangement, first terminating end portion 120 comprises first accessway 134 with second terminating end portion 122 comprising second accessway 136, as shown. In addition, a third accessway 138 is preferably situated between first terminating end portion 120 and second terminating end portion 122, most preferably located at the approximate midpoint of length L, as shown.

Enclosed container 108 (at least embodying herein at least one watertight container) is preferably constructed using pluralities of direct-burial pipe components 140, as shown. Such direct-burial pipe components 140 are preferably of a type utilized in gravity-flow wastewater applications (storm sewers, highways, airports, and similar engineered construction). This preferred construction methodology, of adapting existing commercial drainage piping to produce preferred embodiments of aquatic farming system 100, greatly reduces initial startup costs while increasing in-service performance derived from the implementation of "field-tested" commercial products. It is noted that, although the preferred direct-burial pipe components 140 are inherently adapted to underground water-handling applications, specific non-obvious modifications are required to utilize such materials for seafood farming, as further described below.

Preferably, direct-burial pipe components 140 substantially comprise non-metallic drainage pipe. More preferably, direct-burial pipe components 140 comprise plastic drainage pipe, even more preferably, high-density polyethylene (HDPE) pipe combining an annular corrugated exterior (for strength) with a smooth interior wall conducive to safe surface interaction with seafood source 106 (especially finfish that are known to be susceptible to scale damage when coming into contact with abrasive surfaces). Direct-burial pipe components 140 preferably meet the latest version of American Association of State Highway and Transportation Officials (AASHTO) M294, Type S or American Society for Testing and Materials (ASTM) F2306. In addition, direct-burial pipe components 140 preferably comprising bell and spigot-type connections or other fittings generally conforming to AASHTO M252, AASHTO M294, or ASTM F2306.

It is preferred that the installation of direct-burial pipe components 140 be in general accordance with the pipe manufacturers recommended installation guidelines. This preferably includes properly preparing the subgrade to receive the direct-burial pipe components 140, providing proper compaction of backfill materials, etc. Installation methodologies preferably deviate from the manufacturer's recommendations in one specific area; it is preferred that baker's grease be used to seal pipe-to-pipe connections against leakage. This preferred material has been found to provide effective in-service durability while protecting the seafood source 106 from harmful chemicals that would otherwise would leach into aqueous medium 104 if conventional assembly methods/material were used. Products preferred for use as direct-burial pipe components 140 include HDPE pipe products produced and supplied by Advance Drainage Systems, Inc. (ADS) of Hilliard, Ohio. Upon reading the teachings of this specification, those of ordinary skill in the art will now understand that, under appropriate circumstances, considering such issues as cost, intended use, etc., other piping arrangements, such as piping of alternate plastic compositions, concrete pipe, stainless-steel pipe, etc., may suffice.

Seafood-farming apparatus 102 preferably comprises two principal subsystems supporting the farming of seafood source 106. Seafood-farming apparatus 102 preferably comprises at least one nutrient-supplying sub-system 142, preferably functioning to support the growth and health of seafood source 106 by supplying adequate nutrients to aqueous medium 104. In the present disclosure the term "nutrient" is used as a general reference to identify those substances used to sustain the metabolism of seafood source 106. Such nutrients preferably include food-derived organic nutrients (carbohydrates, fats, proteins, and vitamins) and inorganic chemical compounds such as minerals, water, and oxygen. In addition, seafood-farming apparatus 102 preferably comprises at least one waste removal subsystem 144 structured and arranged to remove unwanted waste from aqueous medium 104.

Both nutrient-supplying sub-system 142 and waste removal subsystem 144 preferably comprise a number of essential subcomponents. Preferably, nutrient-supplying sub-system 142 comprises at least one aerator assembly 604 (of spray rotator 506) and at least one automated feeding sub-system 148, as shown. Aerator assembly 604 preferably functions to maintain levels of dissolved oxygen within aqueous medium 104. In addition, aerator assembly 604 preferably assists in degassing aqueous medium 104, whereby higher than normal concentrations of harmful gasses are removed by the aeration process. Automated feeding sub-system 148 is preferably structured and arranged to supply food to seafood source 106 contained within hollow interior 116, as shown.

Waste removal subsystem 144 preferably comprises at least one solid-waste filter sub-system 150 and at least one chemical-control sub-system 152, as shown. Preferably, solid-waste filter sub-system 150 is principally adapted to filter solid-waste materials (primarily biological wastes excreted by seafood source 106) from aqueous medium 104. Chemical-control sub-system 152 is structured and arranged to maintain, within aqueous medium 104, safe levels of harmful chemical contaminants (such as ammonia excreted by seafood source 106).

Solid-waste filter sub-system 150 is principally embodied in the preferred operational components of solid-waste tank 154. During normal operation, solid-waste tank 154 preferably receives a substantially-continuous flow of aqueous medium 104 from enclosed container 108. This flow of aqueous medium 104, containing unsettled quantities of the solid waste materials, is filtered of such solid-waste materials by passage through at least one solid-waste receptacle 156. Solid-waste receptacle 156 is preferably removably located within solid-waste tank 154, as shown. Solid-waste tank 154 preferably comprises a separate tank operationally linked with enclosed container 108, as shown.

Preferably, chemical-control sub-system 152 (at least embodying herein at least one chemical controller) is principally embodied in the operational components of biofilter tank 160. Biofilter tank 160 preferably comprises at least one biological filter assembly 162 structured and arranged to biologically "filter" harmful chemicals within aqueous medium 104. Biological filter assembly 162 preferably functions to control levels of deleterious chemical contaminants through one or more biological process utilizing at least one biofiltering microorganism (most preferably ammonia and nitrite-oxidizing bacteria). Biofilter tank 160 also preferably comprises a tank operationally linked with, but substantially isolated from, enclosed container 108, as shown. Upon reading the teachings of this specification, those of ordinary skill in the art will now understand that, under appropriate circumstances, considering such issues as engineering preference, cost, intended use, etc., other tank arrangements, such as partitioned compartments within a single tank or liquid holding structure, etc., may suffice.

Figure 10:
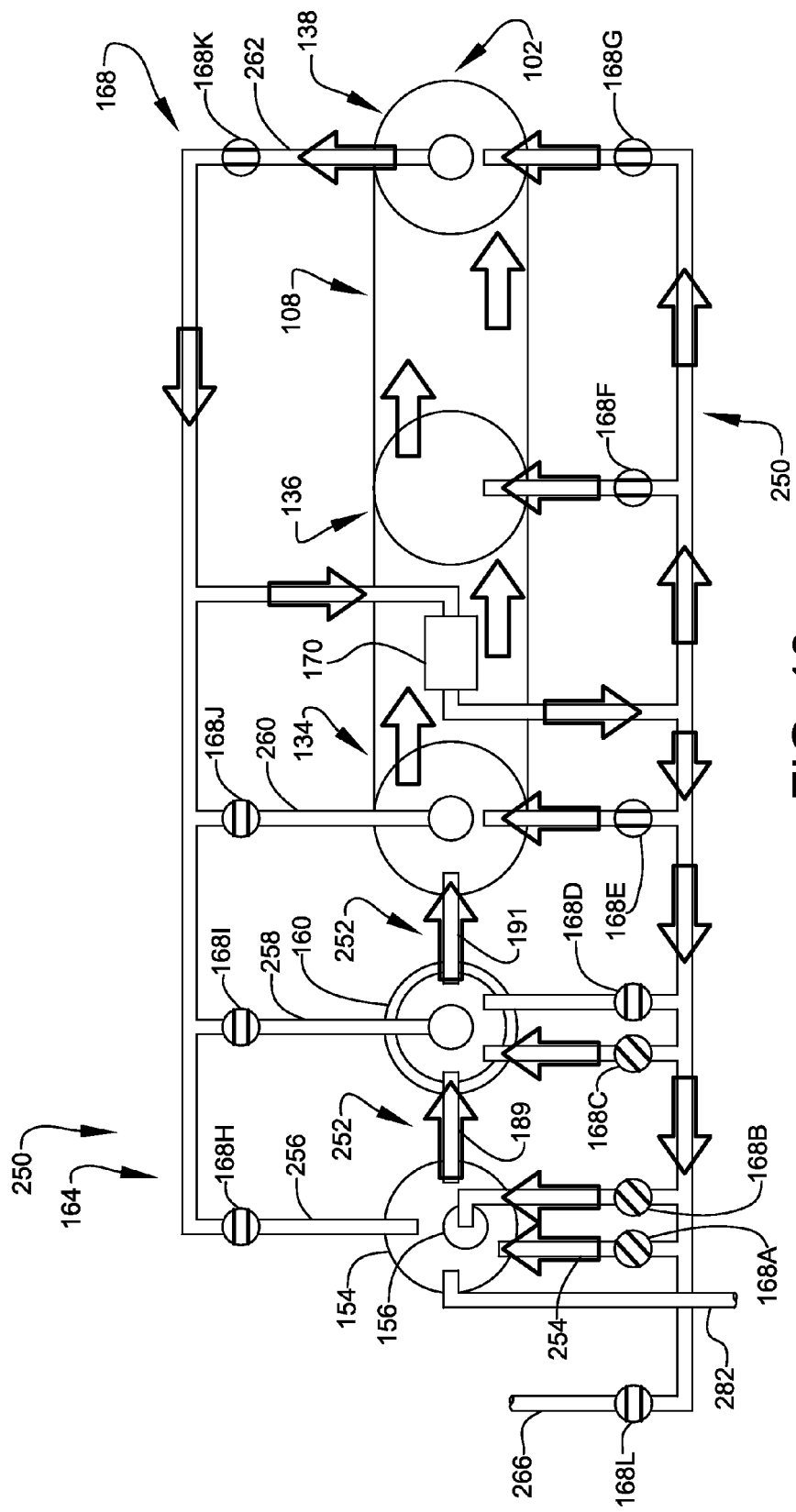
FIG. 10 shows a top view schematically diagramming a preferred flow configuration of the seafood-farming apparatus during normal operation.

Seafood-farming apparatus 102 further preferably comprises liquid circulation network 164 preferably functioning to circulate aqueous medium 104, essentially sequentially, between enclosed container 108, solid-waste filter sub-system 150, and chemical-control sub-system 152, as shown. Liquid circulation network 164 preferably comprises an organized assembly of pipes, valves, and pumps, as shown. More specifically, liquid circulation network 164 generally comprises an arrangement of liquid-carrying pipes 166, control valves 168, and at least one circulator pump 170, as best shown in FIG. 10. Within liquid circulation network 164, liquid-carrying pipes 166 comprise both pressurized piping and un-pressurized piping (operating substantially by gravity-assisted equilibrium flow).

Circulator pump 170 (see FIG. 10) is preferably structured and arranged to provide pump-assisted circulation of aqueous medium 104 between enclosed container 108 containing seafood source 106 and the above-described filter tanks. It is highly preferred that fluid movement within substantially the entire liquid circulation network 164 be driven by a single circulator pump 170. Circulator pump 170 further functions as a device to break down and fragment solids in aqueous medium 104, thus reducing the size of large solids prior to introduction into the downstream solid-waste filter sub-system 150.

The preferred hydraulic-pump sizing/flow capacity is determined utilizing conventional hydraulic engineering methodologies, such as; frequency and volume of fluid exchanges required within the system necessary to maintain the seafood-farming environment, hydraulic dynamics/head losses within the inter-connective plumbing lines/valves, respective elevations of the hydraulic-flow elements, etc. For example, in the depicted embodiment of FIG. 5, seafood-farming apparatus 102 contains about 20,000 gallons of aqueous medium 104. At this scale, (utilizing primarily 4-inch diameter interlinking piping between the subcomponents and assuming minimum impact to due to grade variations between components) seafood-farming apparatus 102 can be operated utilizing a single circulator pump 170 having a minimum rating of about 1½ horsepower. Circulator pump 170 is preferably of a type commonly used in residential swimming pools and preferably comprises a closed-faced impeller design for increased operational efficiency.

The plurality of control valves 168 within liquid circulation network 164 (see FIG. 10) are preferably structured and arranged to controllably alter the sequence of circulation of aqueous medium 104 between enclosed container 108, solid-waste filter sub-system 150, and chemical-control sub-system 152. Each valve in the system preferably operates in three different conditions; open, partially open and closed. This provides a preferred means for fine-tuning flow rates in addition to supporting "backwashing" operations within the system as further described in FIG. 11A through FIG. 14.

Figure 6:
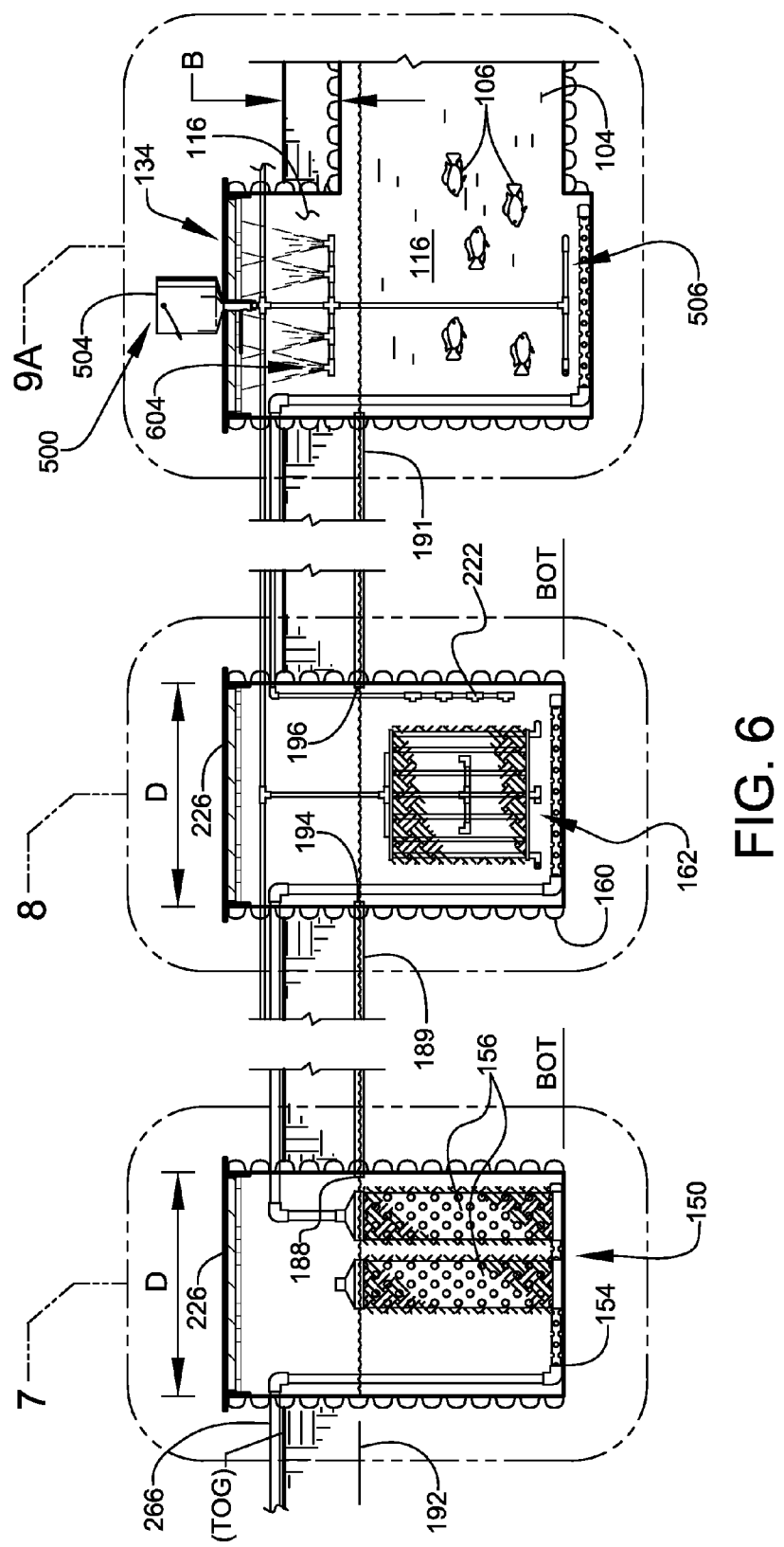
FIG. 6 shows an enlarged sectional view according to the detail 6 of FIG. 5, illustrating operational features and components of the seafood-farming apparatus of FIG. 1.
Figure 7:
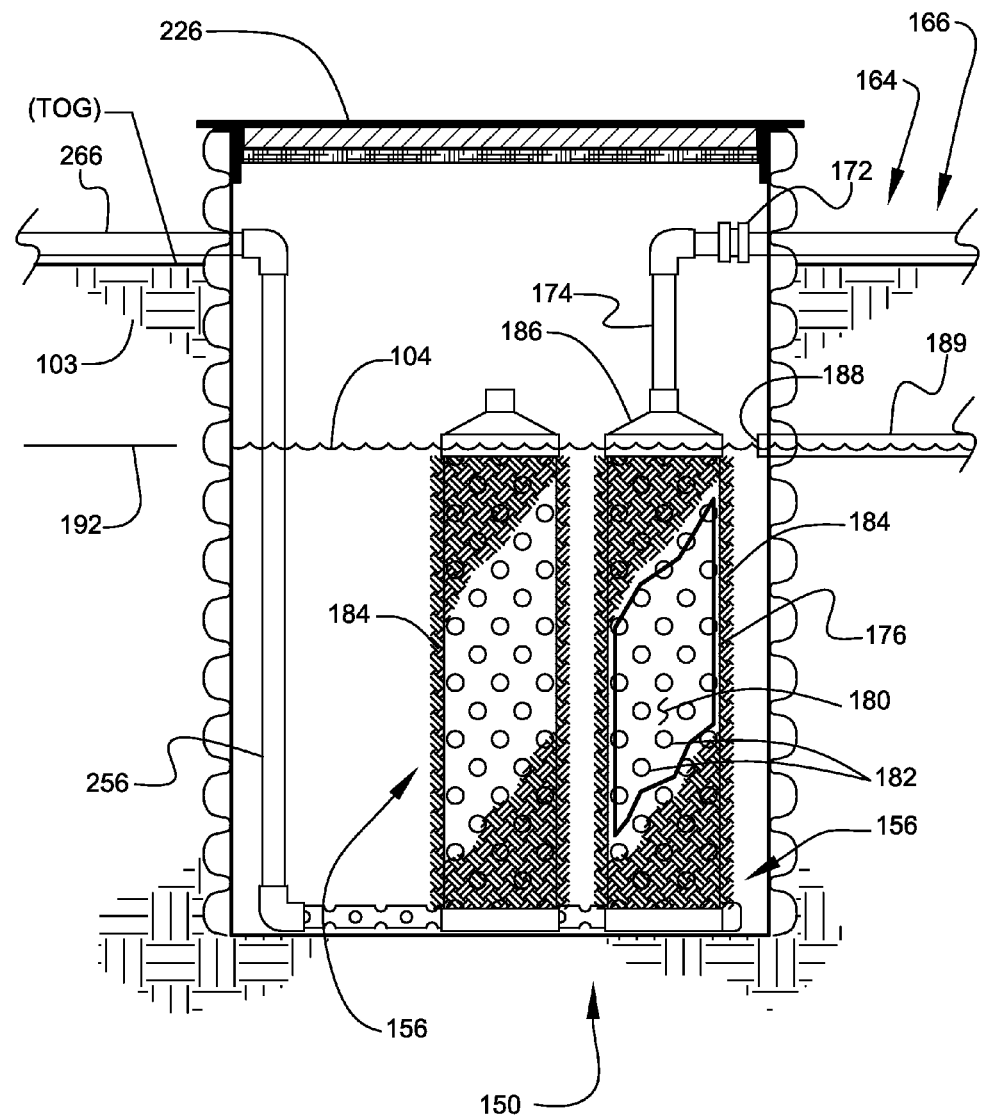
FIG. 7 shows an enlarged sectional view according to the detail 7 of FIG. 6, illustrating operational features and components of a solid-waste filter sub-system, according to the preferred embodiment of FIG. 1.

FIG. 6 shows an enlarged sectional view according to the detail 6 of FIG. 5, illustrating operational features and components of seafood-farming apparatus 102 of FIG. 1. FIG. 7 shows an enlarged sectional view according to the detail 7 of FIG. 6, illustrating operational features and components of solid-waste filter sub-system 150, according to the preferred embodiment of FIG. 1.

Solid-waste-tank inlet 172 provides a preferred fluid connection to liquid circulation network 164, as shown. During normal operation, aqueous medium 104, containing unsettled quantities of the solid waste materials, is drawn from second terminating end portion 122 of enclosed container 108 and is delivered to solid-waste-tank inlet 172 via liquid circulation network 164 and circulator pump 170. From solid-waste-tank inlet 172, aqueous medium 104 is transferred into solid-waste receptacle 156 by a detachable pipe connection 174, as shown.

Solid-waste receptacle 156 is preferably removable from within solid-waste tank 154. This preferred feature enables the periodic removal of individual solid-waste receptacles 156 as they become filled with solid waste. It is preferred that solid-waste tank 154 be sized to hold at least two solid-waste receptacles 156, thus enabling substantially continuous filtering as filled and empty receptacles are cycled in and out of solid-waste tank 154.

Each solid-waste receptacle 156 is preferably constructed around a substantially hollow tube, more preferably hollow cylindrical tube 176 comprising outer peripheral wall 178 defining hollow interior portion 180, as best shown in the cutaway view of FIG. 7. Outer peripheral wall 178 preferably comprises at least one selectively-permeable wall material structured and arranged to selectively restrict passage of the solid waste materials and selectively allow the passage of aqueous medium 104 therethrough. This is preferably accomplished by perforating outer peripheral wall 178 with an arrangement of fluid-passing apertures 182, as shown. In addition, it is preferred that the outer face of outer peripheral wall 178 be covered with at least one layer of filter material 184, as shown. In the preferred embodiment described herein, hollow cylindrical tube 176 comprises a nominal diameter of between about 8 inches and about 10 inches. The sleeve-like layer of filter material 184 is preferably removable for replacement or cleaning. Aperture sizes preferably vary from about 1-inch to about 2-inch diameter. Aperture spacing is preferably on about 3-inch centers and can be staggered, as shown. Hollow cylindrical tube 176 preferably comprises a non-metallic, substantially rigid, material, more preferably a rigid plastic, most preferably schedule 40 or schedule 80 polyvinyl chloride (PVC).

Filter material 184 preferably comprises at least one non-woven synthetic or synthetic-coated material, preferably of the type customarily identified as "hog hair" filter media. Such "hog hair" material preferably comprises a synthetic fiber (preferably a thermopolypropylene compound), spun into high loft to form an interlocking mesh, and bonded together using thermal bonding, bonding agents or the like. In the preferred embodiment of FIG. 7, filter material 184 comprises a preferred thickness of about 1½ inches and a free volume percentage open space of about 92%. Products suitable for use as filter material 184 preferably comprise Matala filter media produced by Matala USA (URL http://www- .matalausa.com). Alternately preferably, such "hog hair" material comprises a natural fiber "rubberized" with a synthetic coating.

When the filtering boundary of outer peripheral wall 178 produces a resistance to the flow of aqueous medium 104, a condition of increased pressure is generated within hollow interior portion 180 during operation. To assure that substantially the entire volume of aqueous medium 104 passes through solid-waste receptacle 156 (without overflowing the top), cap 186 is preferably fitted to the upper opening of solid-waste receptacle. Cap 186 is preferably designed to receive detachable pipe connection 174 and preferably forms a pressure-resisting seal with outer peripheral wall 178, as shown. In this highly preferred arrangement, essentially 100% of the circulated aqueous medium 104 can be passed through the filtering boundary of outer peripheral wall 178 and is filtered for solid waste materials. Thus, fragmented feces and food particles that would typically fail to settle out after passage through circulator pump 170 are efficiently removed from aqueous medium 104 without the use of large sedimentation ponds or chemical flocculants. It is noted that in normal operation, it is often preferable to bypass a portion of the circulated volume of aqueous medium 104 past solid-waste receptacle 156, as described in FIG. 10. This preferably allows a selectable rate of solid-waste filtration to occur during operation of the system.

Figure 8:
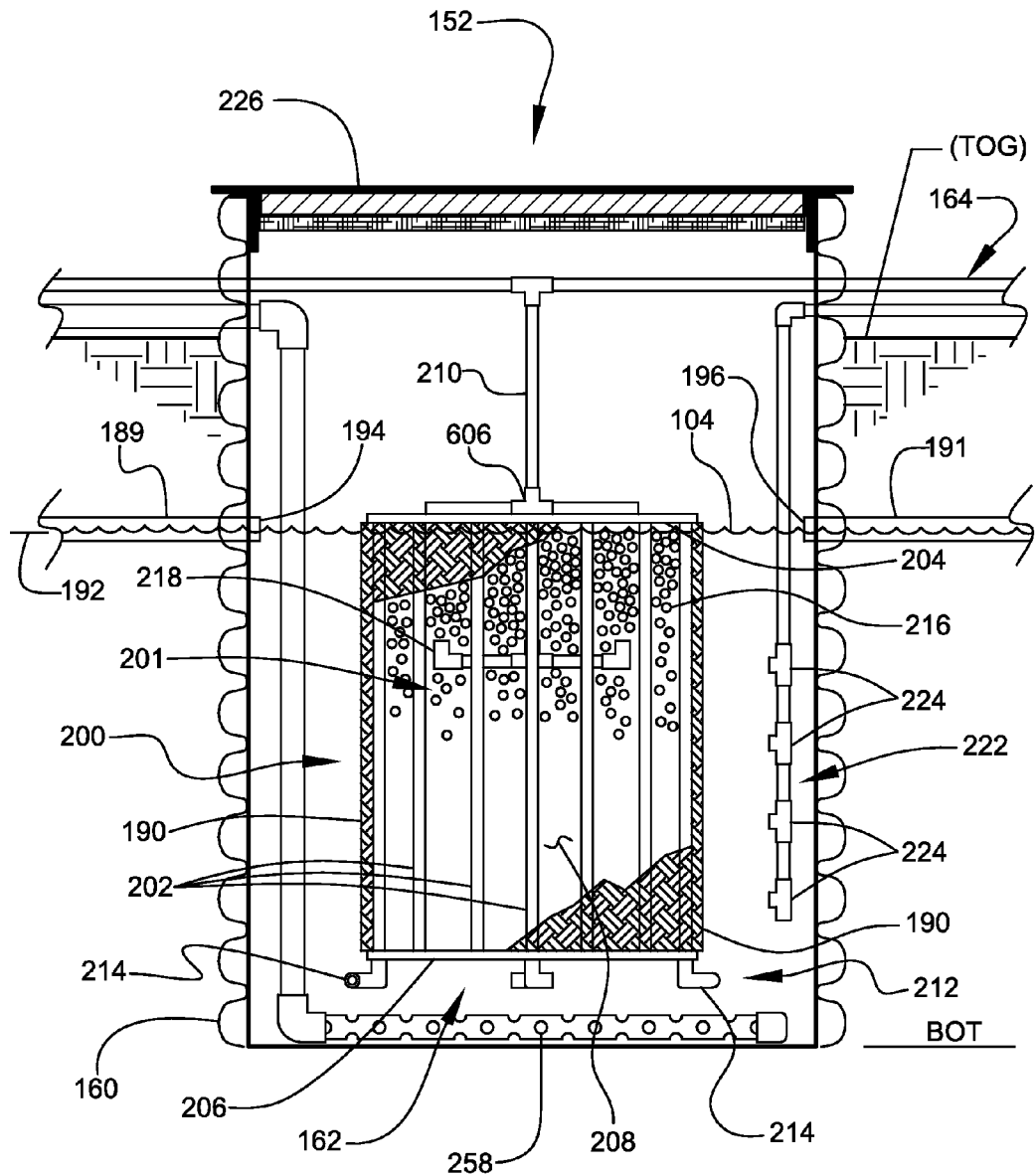
FIG. 8 shows an enlarged sectional view according to the detail 8 of FIG. 6, illustrating operational features and components of a chemical-control sub-system, according to the preferred embodiment of FIG. 1.

Preferably, the solid waste materials are selectively removed from aqueous medium 104 by passage through filter material 184. The solid waste materials removed from aqueous medium 104 are preferably retained and collected within hollow interior portion 180, as shown. Solid-waste tank 154 preferably comprises at least one solid-waste-tank outlet 188 to outlet aqueous medium 104 (substantially free of unsettled quantities of the solid waste materials) to fluid transfer pipe 189, as shown. Fluid transfer pipe 189 is preferably coupled to biofilter-tank inlet 194 of biofilter tank 160, as shown in FIG. 8. Fluid transfer pipe 189 is preferably located at an elevation substantially equal to waterline 192, thus allowing a gravity-flow transfer of aqueous medium 104 to biological filter assembly 162, as illustrated in FIG. 8. It is noted that portions of liquid circulation network 164, preferably including fluid transfer pipe 189, may be sloped to assist such gravity-flow transfers of aqueous medium 104.

FIG. 8 shows an enlarged sectional view according to the detail 8 of FIG. 6, illustrating operational features and components of biological filter assembly 162, according to the preferred embodiment of FIG. 1. As previously stated, biological filter assembly 162 is preferably structured and arranged to establish a biological-based filter to control levels of harmful chemical contaminants in aqueous medium 104. Biological filter assembly 162 preferably operates using at least one biofiltering microorganism. Certain beneficial forms of aerobic bacteria are encouraged to thrive within the biological filter assembly 162 to aid in the breakdown and elimination of wastes and contaminants created by seafood source 106 in the system.

Most seafood sources 106 excrete ammonia into aqueous medium 104 as a toxic by-product of protein metabolism. Additional quantities of ammonia are sometimes released into the aqueous medium 104 as the result of the decomposition of uneaten food. In the re-circulating system of seafood-farming apparatus 102, chemical-control sub-system 152 removes ammonia (and other harmful nitrogenous compounds) from aqueous medium 104 in a process known as nitrification. It is noted that additional nitrification occurs throughout the system, for example, within the accessways 124 (as further described below) and within liquid circulation network 164 (by aerobic bacteria deposited on the internal surfaces of liquid circulation network 164).

The preferred colonization and growth of the beneficial biofiltering microorganisms within biofilter tank 160 preferably occurs on and within primary biological support media 190. More specifically, primary biological support media 190 provides a suitable substrate for the growth of nitrifying bacteria.

In a preferred two-stage biological process, nitrifying bacteria are used to promote the oxidation of ammonia to nitrite and subsequently to nitrate. In a freshwater farming environment, the bacterial genera responsible for the oxidation of ammonia and nitrite are presumed to be predominantly the genera *Nitrosomonas* and *Nitrobacter*, both of which are members of the class Proteobacteria. More specifically, it is known in the art to use *Nitrosomonas* bacteria to convert the toxic ammonia $NH_3$ to $NO_2$ (a relatively toxic nitrite). *Nitrobacter*, the second strain of bacteria, is then used to convert nitrites $NO_2$ to $NO_3$, which is a less toxic nitrate (nitrate is typically tolerated by most cultured aquatic species in moderate concentrations).

The preferred composition of primary biological support media 190 is selected based on surface area available within the composition for bacterial colonization in relation to the associated physical volume (size) of the selected media. Preferred media compositions comprise both large bacteria holding surface areas and relatively compact physical size. Preferred media compositions must also be able to pass some quantity of aqueous medium 104. A preferred media composition suitable for use as primary biological support media 190 preferably comprises substantially the same "hog hair" filter material 184 used in solid-waste filter sub-system 150. Filter material 184 exhibits a preferred accumulation of interspaced surfaces, each one functioning as an area of attachment for the micro-organisms. The spacing between the surfaces of filter material 184 has also been determined to be suitable for the passage of aqueous medium 104, while providing sufficient room for bacterial growth. Primary biological support media 190 comprises a preferred thickness of about 1½ inches, a biological surface area for microbial growth of 96 square feet per cubic foot, and a free volume percentage open space of about 93%. Products suitable for use as primary biological support media 190 preferably comprise Matala filter media produced by Matala USA (URL http://www.matalausa.com).

Biofilter tank 160 preferably comprises biofilter-tank inlet 194 used to couple biofilter tank 160 to liquid circulation network 164, and at least one biofilter-tank outlet 196 to outlet the biologically filtered aqueous medium 104 from biofilter tank 160 to a 4-inch diameter fluid transfer pipe 191, as shown. The biologically filtered aqueous medium 104 is preferably returned by gravity flow to enclosed container 108 via fluid transfer pipe 191, as shown in FIG. 6.

Primary biological support media 190 is preferably supported within biofilter tank 160 by a substantially cylindrical support surface 198, as shown. Cylindrical support surface 198 is preferably adapted to support primary biological support media 190 in at least one position assisting the formation of an outer annular biofilter layer 200, as shown. Preferably, outer annular biofilter layer 200 substantially covers cylindrical support surface 198, as shown. Outer annular biofilter layer 200 is preferably made to be removable from cylindrical support surface 198 for replacement or cleaning.

In the preferred embodiment of FIG. 8, cylindrical support surface 198 comprises a vertical height of and diameter both of about 36 inches. The preferred physical geometry of cylindrical support surface 198 is maintained by a rigid and lightweight internal support structure 201, as shown. This support structure preferably comprises an open arrangement of equally spaced vertical bars 202, as shown. Each vertical bar 202 preferably comprises a hollow pipe having an interior isolated from the aqueous medium 104 contained within biofilter tank 160. The distal ends of each vertical bar 202 are preferably mounted rigidly to the peripheries of upper support ring 204 and lower support ring 206, as shown. This preferred arrangement defines a hollow interior portion 208 within cylindrical support surface 198, as shown. It is preferred that the overall biofilter assembly comprises a substantially neutral buoyancy to reduce structural loads on the supporting structures. Neutral buoyancy is preferably achieved by selectively adjusting the ratio of aqueous medium 104 to air within the hollow vertical bars 202.

Cylindrical support surface 198 is preferably suspended rotatably within biofilter tank 160. Preferably, internal support structure 201 is rotatably hung from down tube 210, as shown. Down tube 210 is preferably adapted to locate the upper periphery of cylindrical support surface 198 at an elevation generally even with waterline 192, so as to situate the attached primary biological support media 190 in a position of constant fluid communication with aqueous medium 104, as shown.

Down tube 210 preferably functions as both a support member and as a fluid coupler adapted to transfer a flow of aqueous medium 104 to internal support structure 201 from liquid circulation network 164. Internal support structure 201 further preferably comprises a hydraulically-driven biomedia rotator 212 functioning to rotate the entire biofilter assembly about a substantially vertical axis of rotation oriented generally coaxially with down tube 210, as shown. Aqueous medium 104 preferably passes from down tube 210 (at least embodying herein at least one fluid coupler structured and arranged to operably couple such at least one biomedia rotator to such at least one liquid circulation network) to coupling 606 (see FIG. 9B) that preferably redirects the flow to one or more vertical bars 202. One or more of the vertical bars 202 are preferably used to direct the flow to one or more fluid-ejecting nozzles 214 located adjacent lower support ring 206, as shown. Each fluid-ejecting nozzle 214 (at least embodying herein at least one first fluid-ejecting nozzle) is preferably structured and arranged to generate at least one torque force by pressurized ejection of aqueous medium 104. Biomedia rotator 212 preferably comprises a plurality of symmetrically positioned fluid-ejecting nozzles 214, most preferably four nozzles positioned at 90° intervals around the periphery of lower support ring 206, as shown. Each fluid-ejecting nozzle 214 is preferably oriented to eject aqueous medium 104 in a direction approximately parallel to the walls of the tank. Furthermore, it has been determined that the best rotational performance is achieved by application of the resulting torque forces to the base of internal support structure 201, preferably achieved by locating fluid-ejecting nozzles 214 as near to the bottom of the tank as possible.

Operation of fluid-ejecting nozzles 214 is preferably enabled by flow-based pressurization of aqueous medium 104 by circulator pump. The speed at which cylindrical support surface 198 rotates is preferably controllable by adjusting the associated control valves 168 (see FIG. 10) to reduce or increase the flow-pressure at the nozzles. In the preferred embodiment of FIG. 8, cylindrical support surface 198 is set to rotate at a preferred speed of about 30 revolutions per minute.

In preferred operation, aqueous medium 104 enters biofilter tank 160 from the 4-inch-diameter fluid transfer pipe 189, as shown. On introduction into biofilter tank 160, aqueous medium 104 quickly comes into contact with nitrifying bacteria as it passes over and through outer annular biofilter layer 200. The relatively rapid rotation of the drum-like biofilter through aqueous medium 104 results in a highly efficient contact interaction between aqueous medium 104 and the nitrifying bacteria colonies. This preferred arrangement has been found increase the rate of oxidation of ammonia to nitrite as well as the subsequent change of nitrite to nitrate.

In certain high-density farming applications, such as in high-density tilapia production, it is preferred to increase the biological filtering capacity of biological filter assembly 162 by adding at least one additional filter media. As suggested by the above descriptions, both cylindrical support surface 198 and outer annular biofilter layer 200 (comprising primary biological support media 190) are preferably arranged to be substantially permeable to the passage of aqueous medium 104. Hollow interior portion 208 is preferably designed to receive and hold a volume of loose filter media 216, as shown. Loose filter media 216 preferably comprise a plurality of independent ball-like or bead-like media elements. Loose filter media 216 preferably comprise large surface-area/size ratio. Loose filter media 216 preferably comprise chemically inert material composition, preferably plastic, alternately preferably porous ceramic. Loose filter media 216 preferably comprise neutral or slightly positive buoyancy allowing loose filter media 216 to be movably suspended within hollow interior portion 208. To maintain maximum filtering efficiency, hollow interior portion 208 is preferably fitted with hydraulic agitator 218, as shown. Hydraulic agitator 218 preferably functions to agitate loose filter media 216 to promote continuous movement of aqueous medium 104 in and around loose filter media 216. Hydraulic agitator 218 preferably comprises a set of directed fluid nozzles 220 designed to eject an agitating flow of aqueous medium 104 within hollow interior portion 208. Such an agitating flow of aqueous medium 104 continuously "churns" loose filter media 216 contained within hollow interior portion 208. Commercial products preferably suitable for use as loose filter media 216 include 4-inch-diameter perforated polyethylene beads such as biological filter media sold by Pentair Aquatics of El Monte, Calif. under the "Biomate" trademark. Extrapolations from empirical test data suggest that the above-described system arrangements are capable of maintaining safe concentrations of ammonia, even at high production densities (using cichlid genus Tilapia as the test stock). Upon reading this specification, those with ordinary skill in the art will now appreciate that, under appropriate circumstances, considering such issues as cost, fish species, etc., other filter arrangements such as, for example, using an organic bio-filter material such as straw, etc., may suffice.

By design preference, chemical-control sub-system 152 is located downstream of solid-waste-filter sub-system 150, as shown. During normal operation, small quantities of solid waste may remain suspended within aqueous medium 104 after passage through solid-waste-filter sub-system 150. These small quantities of solid waste may reach biofilter tank 160 and deposit on outer annular biofilter layer 200. Such deposits support overgrowth of heterotrophic bacteria, which can foul primary biological support media 190, eventually reducing its performance.

Biological filter assembly 162 further preferably comprises at least one biofilter cleaning assembly 222 structured and arranged to clean particulates from outer annular biofilter layer 200. Biofilter cleaning assembly 222 preferably comprises at least one, more preferably a plurality, of fluid-ejecting nozzles 224 (at least embodying herein at least one second fluid-ejecting nozzle), as shown. Each fluid-ejecting nozzle 224 is preferably structured and arranged to flush outer annular biofilter layer 200 with a pressurized stream of aqueous medium 104. Fluid-ejecting nozzles 224 are preferably coupled operationally to liquid circulation network 164 and are controlled by a least one control valve 168. Fluid-ejecting nozzles 224 are operated as required and are preferably operated during periodic backflow operations, as further described below.

Both solid-waste tank 154 and biofilter tank 160 each preferably comprise a liquid-holding capacity of about 500 gallons and each preferably contain at least about 280 gallons of aqueous medium 104 during normal operation (based on the maintaining of a preferable substantially static 3-foot liquid depth within the tank). Preferably, both solid-waste tank 154 and biofilter tank 160 each comprise a diameter D of about 4 feet and a bottom of tank elevation (BOT) of about 5 feet below top of grade (TOG), as shown.

Both solid-waste tank 154 and biofilter tank 160 each preferably comprise at least one insulated cover 226 functioning to reduce evaporative loss and thermal heat transfer between the interior of the respective tanks and aboveground environment 126. Insulated covers 226 each preferably comprise a protective capping member 228 having an underside surface to which an insulating panel 230 is adhered, as shown. Insulating panel 230 preferably comprises an insulating layer, preferably comprising expanded polystyrene sheet (EPS). It is surmised that the increased level of thermal control afforded by seafood-farming apparatus 102 assists in achieving and maintaining steady state equilibrium of ammonia concentrations by reducing environmental stresses imposed on the nitrifying bacteria colonies.

Figure 9A:
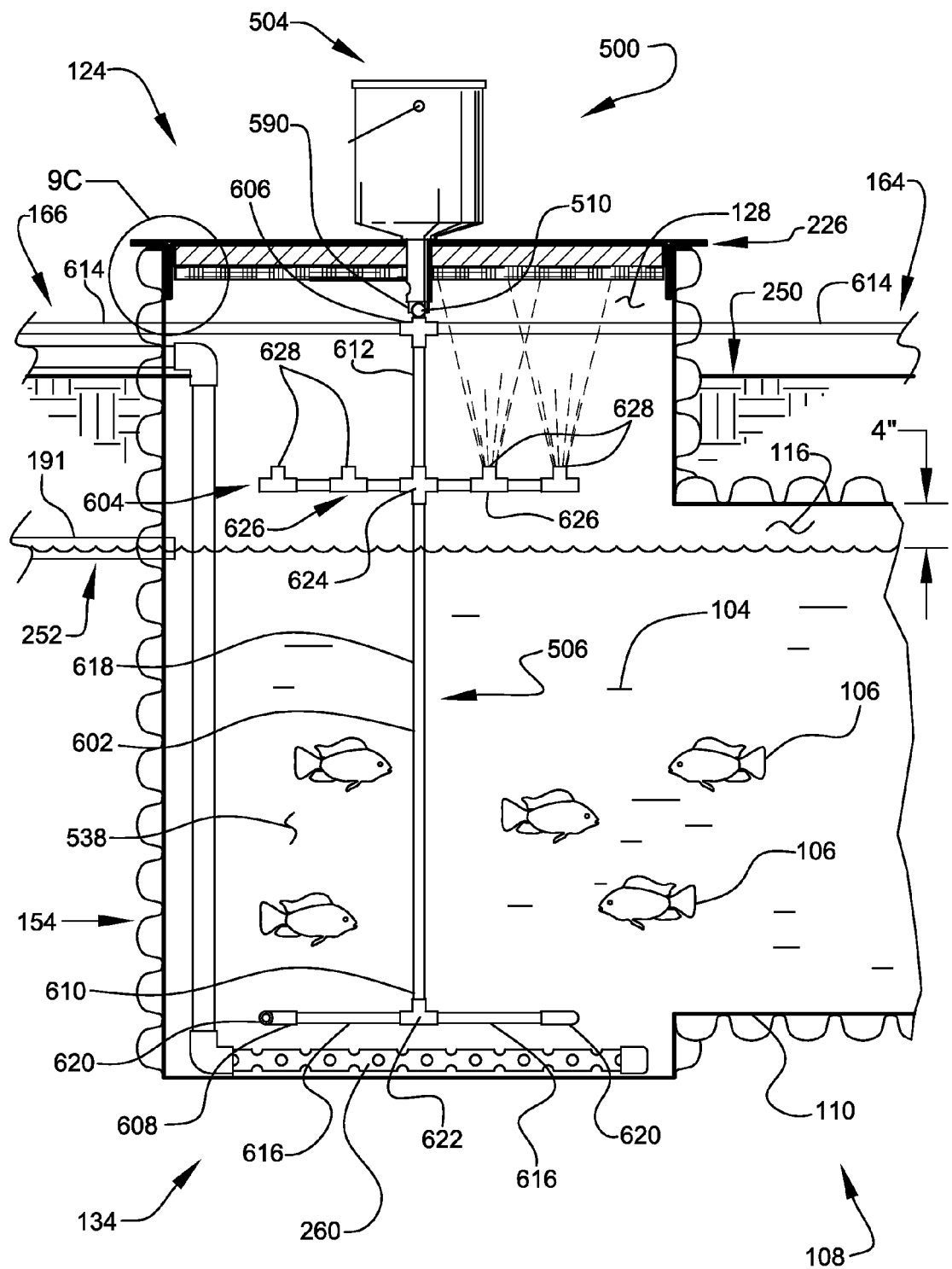
FIG. 9A shows an enlarged sectional view according to the detail 9A of FIG. 6, illustrating operational features and components of a first terminating end portion of a seafood-growing container structured and arranged to contain at least one aqueous medium and at least one seafood source, according to the preferred embodiment of FIG. 1.

FIG. 9A shows an enlarged sectional view according to the detail 9A of FIG. 6, illustrating operational features and components of first accessway 134 of first terminating end portion 120 of enclosed container 108, according to the preferred embodiment of FIG. 1. Each accessway 124 preferably comprises a spray rotator 506. Spray rotator 506 preferably comprises spindle assembly 602, aerator assembly 604, water supply coupling 606, nozzle assembly 608 and uppermost coupling 510, as shown. Spray rotator 506 preferably uses water pressure to stir solids in the lower tank portion, provide aeration to the water (aqueous medium 104) and provide rotational torque to power the automated feeding sub-system 500.

Spindle assembly 602 preferably comprises a hollow conduit 618, preferably PVC (Polyvinylchloride) pipe, preferably schedule 80 PVC pipe. Nozzle assembly 608 is preferably attached to the spindle bottom 610, as shown. Both water supply coupling 606 and uppermost coupling 510 are preferably attached at the top 612 of spindle assembly 602, as shown.

Water (aqueous medium 104) is preferably supplied, under pressure, to spray rotator 506 through supply piping 614, preferably PVC piping, more preferably schedule 80 PVC pipe. Preferably, the water is supplied to the spray rotator 506 through supply piping 614 coupled with water supply coupling 606, further described below in FIG. 9B. Pressurized water preferably enters hollow conduit 604 at water supply coupling 606 and preferably provides pressurized water to both the aerator assembly 604 and the nozzle assembly 608, as shown.

The nozzle assembly 608 preferably comprises two opposed portions of pipe 616, preferably PVC pipe, preferably schedule 40 PVC pipe. Each respective portion of pipe 606 preferably has an end nozzle 620, preferably a PVC corner connector, preferably schedule 40 pipe, preferably adhered to the pipe with PVC permanent cement. Each respective portion of pipe 606 is preferably about twelve inches to about eighteen inches in length. The pipe portions 616 are preferably attached to the spindle assembly with a 3-way connector 622, preferably PVC plastic, preferably adhered to the pipe 616 with PVC permanent cement. Upon reading this specification, those with ordinary skill in the art will now appreciate that, under appropriate circumstances, considering such issues as cost, structural requirements, available materials, user preferences, etc., other connectors using materials such as, for example, plastic pipe, metallic pipe, tubing, etc., may suffice. Further, upon reading this specification, those with ordinary skill in the art will now appreciate that, under appropriate circumstances, considering such issues as cost, structural requirements, available materials, user preferences, etc., other dimensions such as, for example, longer or shorter piping, other diameter pipe, bent pipe (in lieu of connectors), etc., may suffice.

The pressurized water preferably travels through supply piping 614 (of active piping 250) into hollow conduit 604 and exits through end nozzles 620, preferably turning hollow conduit 604. As end nozzles 620 are opposed and direct the pressurized water in opposing direction, a rotational force is generated onto hollow conduit 604. The hollow conduit is preferably suspended by water supply coupling 606 and coupled on a bearing so that it may rotate with the rotational force applied by the pressurized water exiting end nozzles 620. Preferably, as the hollow conduit 618 rotates (and acts as a spindle to rotate) it also rotates aerator assembly 604 and the uppermost coupling 510, as shown.

Aerator assembly 604 is preferably attached to hollow conduit 618 using a 4-way connector 624, preferably PVC plastic, preferably adhered with PVC permanent cement. Aerator assembly 604 preferably comprises two opposing portions 626 that further comprise one or more spray nozzles 628, more preferably at least two spray nozzles 628 on each portion 626, as shown. Spray nozzles 628 are preferably screw-in-style nozzles that are made to screw into PVC 3-way connectors 622, as shown. The spray nozzles 628 preferably assist aeration of the aqueous media (water), as shown and described herein. A variety of spray nozzles are readily available to attach within PVC piping and available at hardware stores (e.g., Home Depot™, Lowes™, etc.). Spray nozzles 628 are preferably situate about six inches to about eight inches above the water level in the tank, as shown, the water level in the tank being about forty two inches above the tank bottom in about a five-foot-deep tank, as shown. Upon reading this specification, those with ordinary skill in the art will now appreciate that, under appropriate circumstances, considering such issues as cost, structural requirements, available materials, user preferences, etc., other aerator arrangements such as, for example, one arm, more than one arm, spray from the bottom, spray from the sides, vertical sprayers, spray from the hollow conduit, etc., may suffice.

Figure 9B:
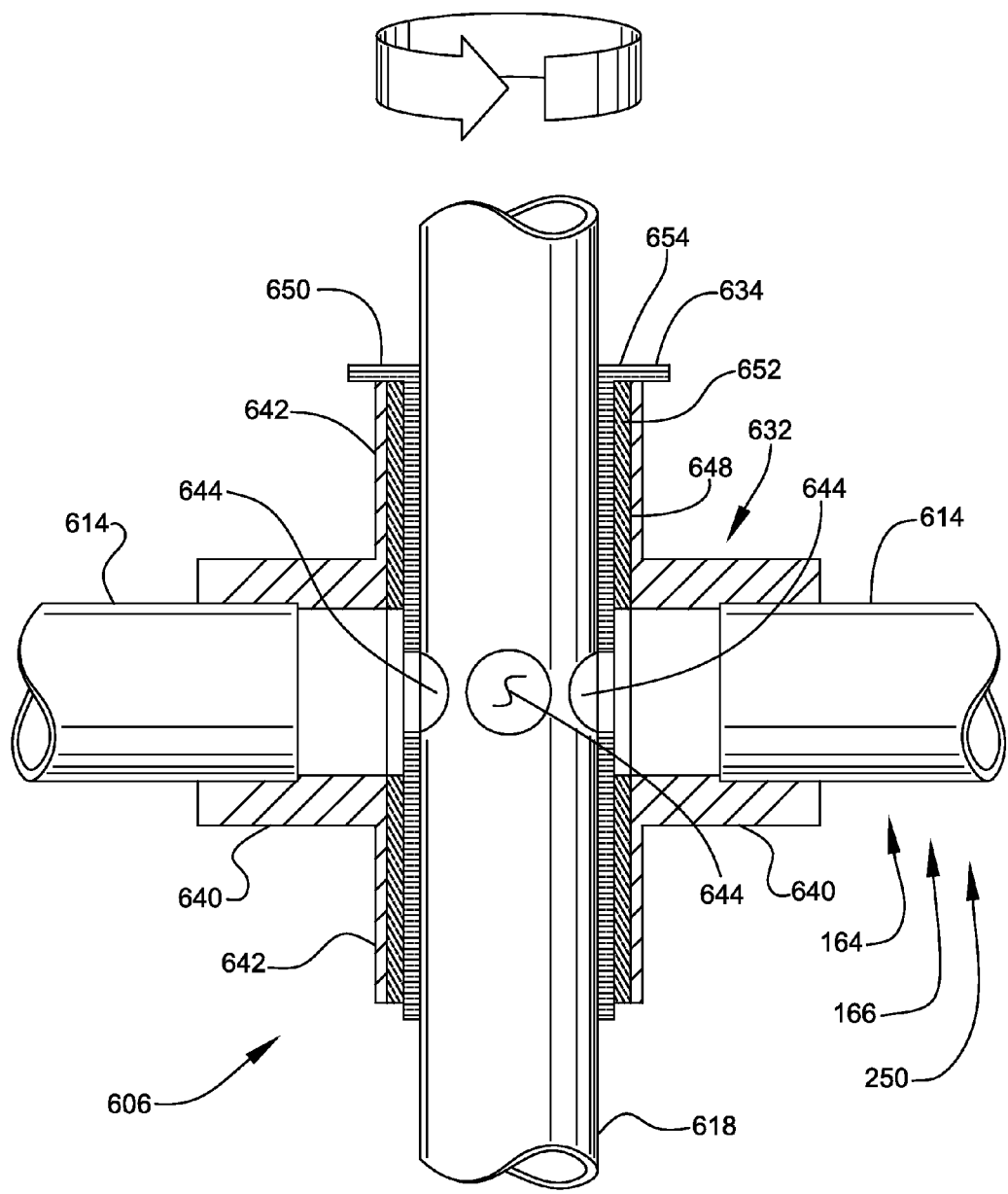
FIG. 9B shows a perspective view, illustrating a water supply coupling of a spray rotator, according to the preferred embodiment of FIG. 9A.

FIG. 9B shows a perspective view illustrating water supply coupling 606 of spray rotator 506 according to the preferred embodiment of FIG. 9A. Water supply coupling 606 provides a preferred means for assisting water supply to spindle assembly 602, assisting water supply to aerator assembly 604 and assisting support of the entire spray rotator 506, as shown. Water supply coupling 606 preferably comprises 4-way connector 632, preferably comprising a PVC housing that supports bushing assembly 634, as shown. The water supply piping preferably connects to opposing horizontal pipe arm couplings 640 on the 4-way connector 632, preferably each having the same horizontal pipe axis, as shown. Hollow conduit 618 preferably passes through the opposing vertical pipe arm couplings 642 on 4-way connector 632, preferably having the same vertical pipe axis, as shown.

Hollow conduit 618 preferably comprises sets of opposing apertures 644 structured and arranged to intermittently align with the opposing horizontal pipe connections 640 on the 4-way connector 632 as hollow conduit 618 rotates and to allow passage of the pressurized aqueous medium 104 into and past hollow conduit 618 to pressurize both aerator assembly 604 and nozzle assembly 608, as shown and described herein.

Bushing assembly 634 preferably comprises upper fixed bushing sleeve 650 and lower fixed bushing sleeve 652, both preferably bronze materials. Upper fixed bushing sleeve 650 is preferably fixed to rotating hollow conduit 618, preferably tightly press-fit onto hollow conduit 618. Upper fixed bushing sleeve 650 preferably comprises a "hat" portion 654 that rests on the vertical pipe arm coupling 640 and assists support of spray rotator 506 by supporting the weight of hollow conduit 618, aerator assembly 604 and nozzle assembly 608, as shown.

Lower fixed bushing sleeve 652 is preferably fixed to interior surface 648 of 4-way connector 632, as shown. Upper fixed bushing sleeve 650 and lower fixed bushing sleeve 652 preferably provide a wear surface for the rotation of hollow conduit 618 within 4-way connector 632 and assist maintaining a water distribution through water supply coupling 606, as shown. The above-described arrangements form a limited seal between upper fixed bushing sleeve 650 and lower fixed bushing sleeve 652; however, since the entire assembly is over water and within the aquatic environment, slight leakage through upper fixed bushing sleeve 650 and lower fixed bushing sleeve 652 is acceptable and may not hinder the intended functions as described. The spray rotators 506 within each of the three accessways 124 are preferably of similar design and construction, as shown.

FIG. 9C shows the enlarged sectional view 9C of FIG. 9A illustrating the preferred construction of insulated cover 226. FIG. 9D shows a partial exploded perspective view of the primary components of insulated cover 226 according to the preferred embodiment of FIG. 9C.

Insulated cover 226 is preferably used to cover the above-ground access openings 128 of the accessways 124, as shown. Insulated cover 226 preferably comprises a solid cap top portion 662, a rigid material middle portion 664 and a bio-filter bottom portion 668, as shown. The top cap is preferably a solid material, preferably metal or hardened plastic. The rigid material middle portion 664 preferably comprises rigid insulation material, preferably about 2 inches thick, preferably comprising expanded polystyrene sheet (EPS). Bio-filter bottom portion 668 (a secondary biological support media of waste removing subsystem 144) preferably comprises a 1½-inch thick layer of hog-hair material that is implanted with nitrifying bacteria to assist converting ammonia into less harmful compounds. Products suitable for use as bio-filter bottom portion 668 preferably comprise Matala filter media produced by Matala USA. The bio-filter bottom portion 668 is preferably attached mechanically to the rigid material middle portion 664, as shown. The solid cap top portion 662 is preferably adhered in a permanent manner to the rigid material middle portion 664, as shown.

Air-exchanging passage 130 (or air holes) is preferably placed around the vertical riser upper portion perimeter 672 of the accessways 124 to allow fouled air to exhaust and fresh air to enter the tank. Tank flange 674 is preferably placed onto the vertical riser upper portion 676 of the accessways 124 to accommodate insulated cover 226 and assist the proper fitting of insulated cover 226 over vertical riser upper portion 676, as shown. Upon reading the teachings of this specification, those of ordinary skill in the art will now understand that, under appropriate circumstances, considering such issues as costs, maintenance considerations, etc., other cover arrangements, such as the use of hinges to facilitate opening and closing, locking features to secure the cover, omission of covers entirely, etc., may suffice.

As previously indicated, the flow of aqueous medium 104 throughout seafood-farming apparatus 102 is carried by liquid-carrying pipes 166 and is controlled by a plurality of control valves 168 positioned at designated points throughout the piping, as shown. FIG. 10 shows a top view schematically diagramming a preferred arrangement of liquid-carrying pipes 166 and control valves 168 within liquid circulation network 164. In the following descriptions, reference is made to FIG. 10 and to the prior figures of the disclosure.

Liquid-carrying pipes 166 preferably fall into two general categories. The first category of piping is identified herein as active piping 250. Active piping 250 preferably includes piping within liquid circulation network 164 that is or can be placed in a condition of fluid communication with circulator pump 170, as shown. The second category of liquid-carrying pipes 166 comprises passive transfer piping 252; these pipes preferably include both fluid transfer pipe 189 and fluid transfer pipe 191 and preferably operate by gravity flow/liquid equilibrium. Passive transfer piping 252 is not directly coupled to circulator pump 170 and does not contain controlling valves, as shown.

Control valves 168 are preferably adjustable to vary the flow of aqueous medium 104 through solid-waste filter sub-system 150, chemical-control sub-system 152, and enclosed container 108, as a whole, or independent of each component. Preferably, each control valve 168 in the system is continuously adjustable between fully open, partially open, and fully closed, preferably as shown and described herein.

Seafood-farming apparatus 102 preferably comprises 12 separate control valves 168 consecutively identified herein as control valve 168A through control valve 168L, as shown. Control valve 168A preferably controls a flow of aqueous medium 104 passing through solid-waste-filter bypass pipe 254, as shown. Solid-waste-filter bypass pipe 254 is preferably used to adjustably shunt a flow of aqueous medium 104 from active piping 250 into solid-waste tank 154 (thus bypassing solid-waste receptacle 156). Control valve 168B preferably controls the passage of aqueous medium 104 delivered from active piping 250 to solid-waste receptacle 156, as shown. Control valve 168C preferably controls a flow of aqueous medium 104 from active piping 250 to biomedia rotator 212. The herein control valves preferably assist control as shown and/or as described in this application. Control valve 168D preferably controls a flow of aqueous medium 104 from active piping 250 to biofilter cleaning assembly 222. Control valve 168E preferably controls a flow of aqueous medium 104 from active piping 250 to spray rotator 506 within first accessway 134. Control valve 168F preferably controls a flow of aqueous medium 104 from active piping 250 to spray rotator 506 within second accessway 136. Control valve 168G preferably controls a flow of aqueous medium 104 from active piping 250 to spray rotator 506 within third accessway 138.

Control valve 168H through control valve 168K preferably control the operation of suction lines originating at the bottoms of solid-waste tank 154, biofilter tank 160, and the terminating accessways of enclosed container 108, as shown. The suction lines are preferably used during backwash operations during which solid waste, sediments, and the like are removed from the system, Control valve 168H is preferably coupled to suction line 256, preferably originating at the bottom of solid-waste tank 154 (see FIG. 7). Suction line 256 preferably comprises a perforated pipe having a nominal internal diameter of about 2 inches. Suction line 256 preferably extends across substantially the full width of solid-waste tank 154, as shown. Control valve 168I is preferably coupled to suction line 258 originating at the bottom of biofilter tank 160 (see FIG. 8). Suction line 258 also preferably comprises a perforated pipe having a nominal internal diameter of about 2 inches. Suction line 256 preferably extends across substantially the full width of solid-waste tank 154, as shown. Biomedia rotator 212 (the lowest structures of internal support structure 201) is preferably placed at an elevation providing about a 2-inch separation from the top of suction line 258, as shown.

Control valve 168J is preferably coupled to suction line 260 originating at the bottom of first accessway 134 (see FIG. 9). The bottom of first accessway 134 is preferably placed at an elevation about 6 inches lower than the invert elevation of elongated tube 118 (the bottom of the inside pipe wall). This preferred arrangement allows suction line 260 to reside in a recessed volume below spray rotator 506. Nozzle assembly 608 is preferably situated at an elevation about even with the invert elevation of elongated tube 118 and at least about 2 inches above the top of suction line 260, as best shown in FIG. 9A.

Control valve 168K is preferably coupled to suction line 262 originating at the bottom of third accessway 138 (see FIG. 5). The bottom of third accessway 138 is also preferably placed at an elevation about 6 inches lower than the invert elevation of elongated tube 118. This preferred arrangement allows suction line 262 to be placed in a configuration substantially matching those described for first accessway 134. Finally, control valve 168L is preferably designed to control aqueous medium 104 exiting liquid circulation network 164 and seafood-farming apparatus 102. Control valve 168L is preferably coupled with active piping 250 and main outlet pipe 266, as shown. Main outlet pipe 266 directs aqueous medium 104 pumped out of seafood-farming apparatus 102 to surface structures of high-density farming site 101, as shown.

FIG. 10 shows a top view schematically diagramming a preferred flow configuration of seafood-farming apparatus 102 during "normal" operation. "Normal" operation comprises the most predominant operational mode of the grow out-to-harvest time-cycle. During the "normal" operational mode of FIG. 10, aqueous medium 104 is sequentially circulated through enclosed container 108, solid-waste filter sub-system 150, and biological filter assembly 162, respectively. Preferred directions of flow are generally depicted by the arrow depictions.

The following table (Table A) indicates preferred valve status during "normal" operation.

TABLE A

PREFERRED VALVE POSITIONS FOR NORMAL OPERATION

Control valve 168A - adjusted for selected flow rate (to solid-waste-filter bypass pipe 254)
Control valve 168B - adjusted for selected flow rate (to solid-waste receptacle 156)
Control valve 168C - adjusted for selected biofilter rotation speed (at biomedia rotator 212)
Control valve 168D - fully closed (to biofilter cleaning assembly 222)
Control valve 168E - open (to spray rotator 506 within first accessway 134)
Control valve 168F - open (to spray rotator 506 within second TABLE A-continued

PREFERRED VALVE POSITIONS FOR NORMAL OPERATION accessway 136)
Control valve 168G - open (to spray rotator 506 within third accessway 138)
Control valve 168H - closed (controlling suction at solid-waste tank 154)
Control valve 168I - closed (controlling suction at biofilter tank 160)
Control valve 168J - closed (controlling suction at first accessway 134)
Control valve 168K - open (controlling suction at third accessway 138)
Control valve 168L - closed (main exit to surface)

During normal operation, aqueous medium 104 is drawn from the bottom of second terminating end portion 122 (third accessway 138) and travels to the suction side of circulator pump 170 via active piping 250. From the discharge side of circulator pump 170, the flow of aqueous medium 104 is preferably directed to solid-waste filter sub-system 150 and is divided by the control valves between an input to solid-waste receptacle 156 and a bypassed input directly to solid-waste tank 154, as shown. The combined flow of filtered aqueous medium 104 is then transferred to biofilter tank 160 by way of fluid transfer pipe 189, as shown. Aqueous medium 104 within biofilter tank 160 interacts with the nitrifying bacteria prior to returning to enclosed container 108 by way of fluid transfer pipe 191, as shown. Aqueous medium 104 preferably flows from first terminating end portion 120 through elongated tube 118 to second terminating end portion 122 where it completes the preferred circulation path. It is preferred that all valves supplying spray rotator 506 are in the open position (it is noted that the valve supplying spray rotators 506 may be independently adjusted to reduce flow rates and the corresponding rotation of the aerators).

FIG. 11A through FIG. 14 present preferred flow arrangements utilized in four separate backflow operations for seafood-farming apparatus 102. Periodic backwashing of seafood-farming apparatus 102 is critical to maintaining productive seafood-farming environments. Aquatic animal effluent (solid waste materials excreted by seafood source 106) accumulates in aqueous medium 104 as a byproduct of farming in the closed system of seafood-farming apparatus 102. As seafood source 106 is grown, the effluent-rich aqueous medium 104 becomes high in nutrients beneficial to surface-grown plants. During backwashing operations, buildups of solid waste are removed from four operationally essential areas within seafood-farming apparatus 102 and are subsequently discharged to the surface of high-density farming site 101.

Each backwash operation preferably begins with the setting of control valves 168 to isolate the backwash area from the balance of the system. Circulator pump 170 is then preferably used to either re-circulate aqueous medium 104 through the backwash area until a sufficient amount of solid waste is suspended within aqueous medium 104, or circulator pump 170 is used to immediately discharge aqueous medium 104, containing the solid waste materials, to the surface via main outlet pipe 266. From main outlet pipe 266, the mixtures of aqueous medium 104 and solid waste materials are processed, or more preferably, utilized as a fertilizer source in the production of one or more surface-grown plant crops (see FIG. 1 and FIG. 15). Thus, aquatic farming system 100 promotes conservation through water re-use and the elimination of essentially all off-site discharge of waste effluent.

Figure 11A:
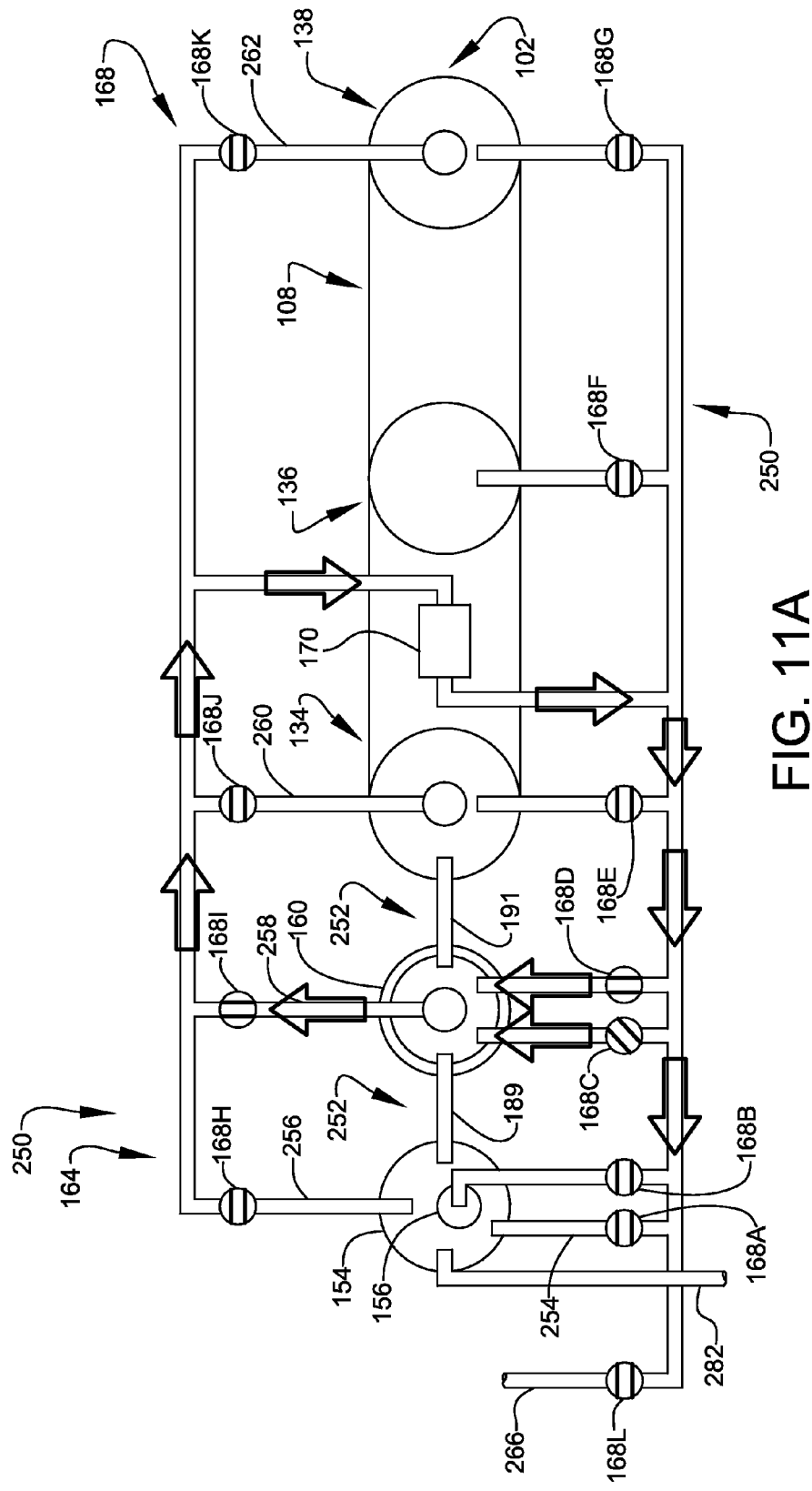
FIG. 11A shows a top view schematically diagramming a preferred flow configuration of the seafood-farming apparatus during an initial backwash of the biofilter tank.

FIG. 11A shows a top view, schematically diagramming a preferred flow configuration within seafood-farming apparatus 102, during an initial backwash of biofilter tank 160. Backwashing of biofilter tank 160 preferably comprises a two-phase process preferably including an additional re-circulation step. Backwashing of biofilter tank 160 is preferably initiated by adjusting control valves 168 to enable the operation of biofilter cleaning assembly 222 and to isolate biofilter tank 160 from the remainder of the system. Circulator pump 170 is then preferably used to re-circulate aqueous medium 104 through biological filter assembly 162 until a sufficient amount of solid waste has been removed from primary biological support media 190. Table B (below) indicates the preferred valve status during the recirculation phase of the backwash of biofilter tank 160.

In the subsequent phase (see FIG. 11B), the control valves 168 are preferably reset to allow aqueous medium 104 (containing the solid waste materials) to be pumped to the surface via main outlet pipe 266. The following table (Table B) indicates preferred valve status during the initial backwash of biofilter tank 160.

TABLE B

PREFERRED VALVE POSITIONS FOR INITIAL
BACKWASH OF BIOFILTER TANK

Control valve 168A - closed (to solid-waste-filter bypass pipe 254)
Control valve 168B - closed (to solid-waste receptacle 156)
Control valve 168C - adjusted for selected biofilter rotation speed (at biomedia rotator 212)
Control valve 168D - open (to biofilter cleaning assembly 222)
Control valve 168E - closed (to spray rotator 506 within first accessway 134)
Control valve 168F - closed (to spray rotator 506 within second accessway 136)
Control valve 168G - closed (to spray rotator 506 within third accessway 138)
Control valve 168H - closed (controlling suction at solid-waste tank 154)
Control valve 168I - open (suction for bio-filter tank)
Control valve 168J - closed (controlling suction at first accessway 134)
Control valve 168K - closed (controlling suction at third accessway 138)
Control valve 168L - closed (main exit to surface)

Figure 11B:
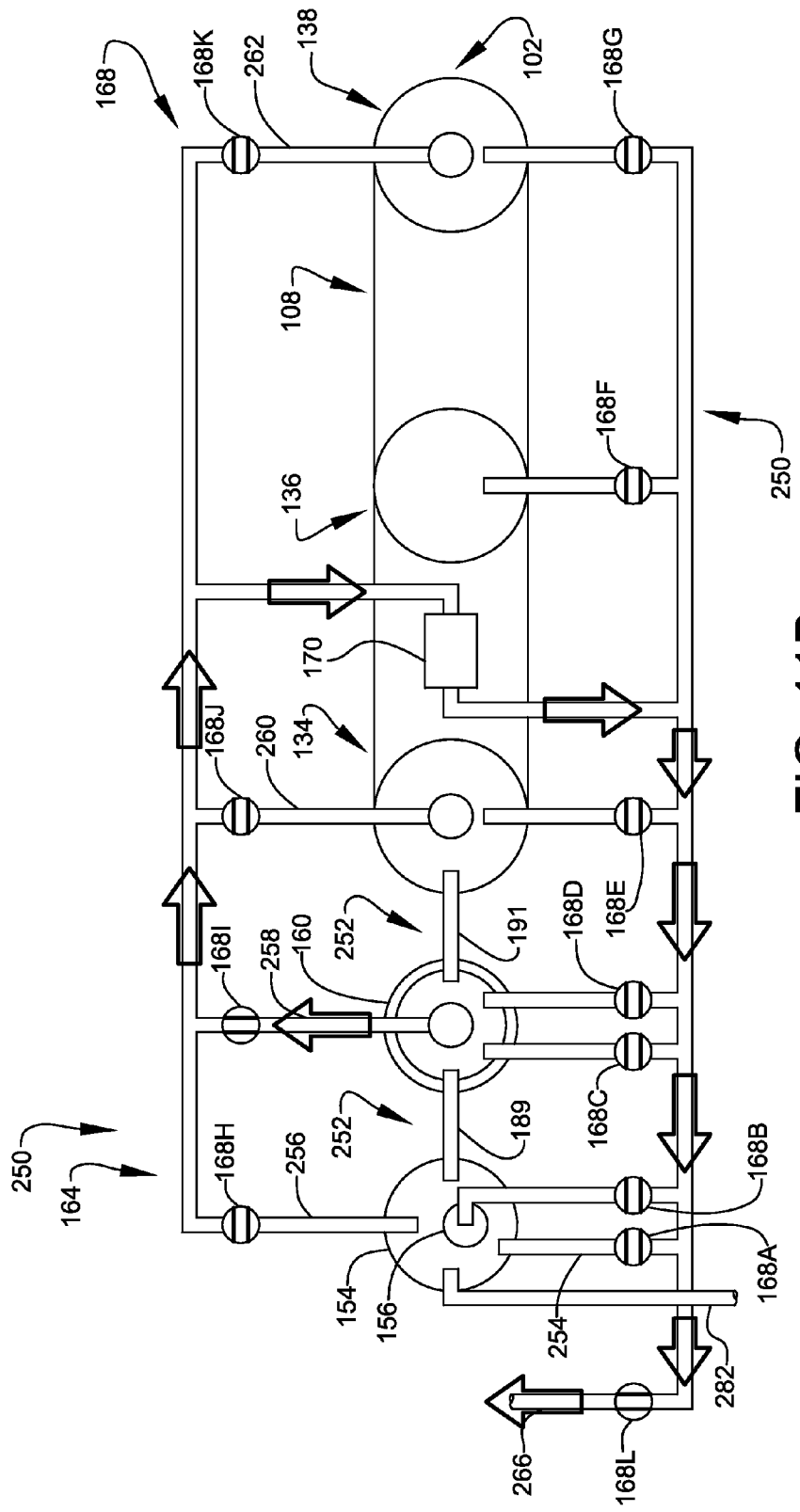
FIG. 11B shows a top view schematically diagramming a preferred flow configuration of the seafood-farming apparatus during a secondary backwash of the biofilter tank.

FIG. 11B shows a top view schematically diagramming a preferred flow configuration of seafood-farming apparatus 102 during the second backwash phase of biofilter tank 160. In the second phase, control valves 168 are preferably reset to allow aqueous medium 104 (containing the solid waste materials) to be pumped to the surface via main outlet pipe 266, as shown. The following table (Table C) indicates preferred valve status during the second backwash phase of biofilter tank 160.

TABLE C

PREFERRED VALVE POSITIONS FOR SECONDARY
BACKWASH OF BIOFILTER TANK

Control valve 168A - closed
Control valve 168B - open
Control valve 168C - closed
Control valve 168D - closed
Control valve 168E - closed
Control valve 168F - closed
Control valve 168G - closed
Control valve 168H - closed
Control valve 168I - open
Control valve 168J - closed
Control valve 168K - closed
Control valve 168L - open (main exit to surface)

Figure 12:
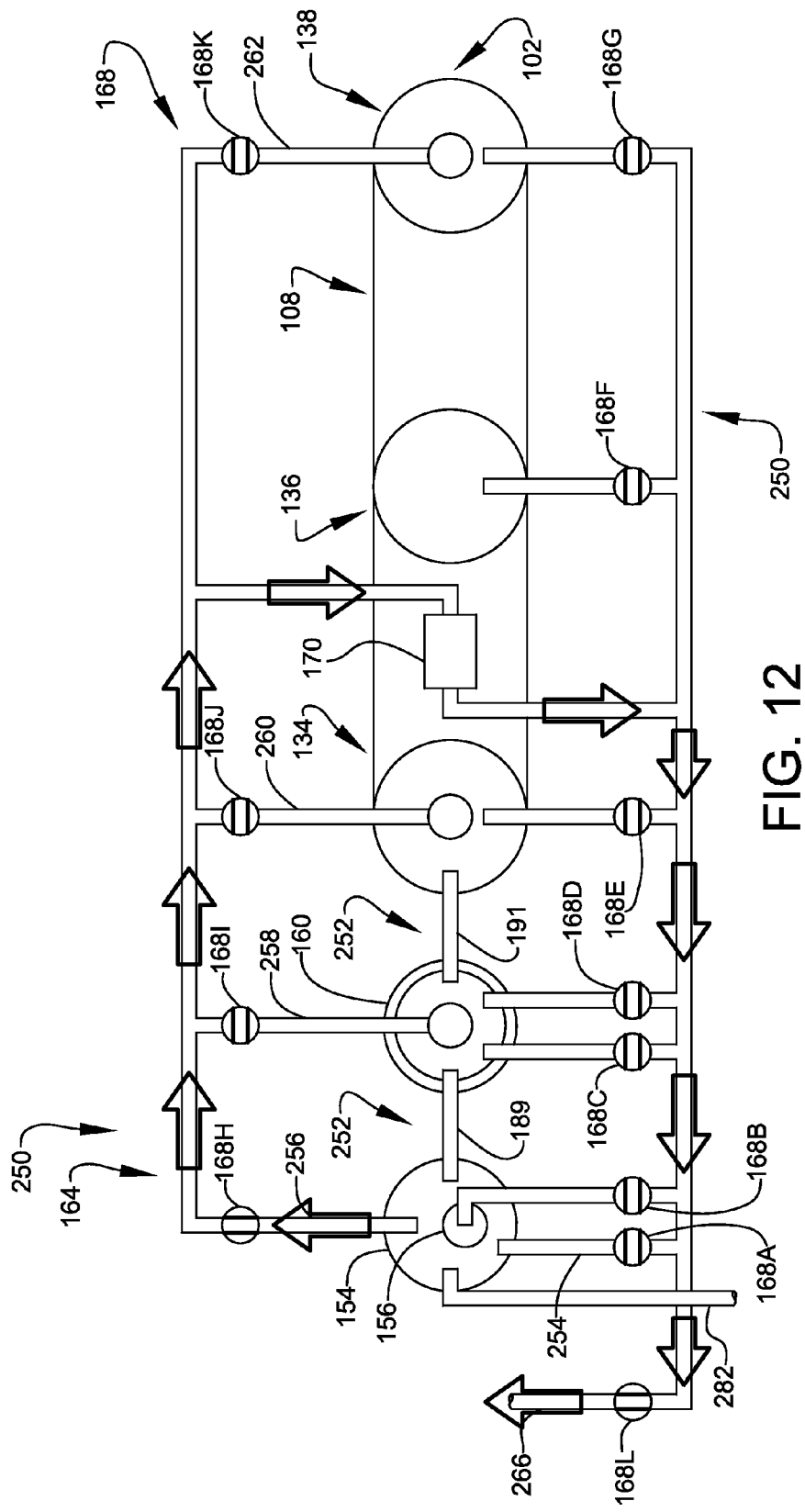
FIG. 12 shows a top view schematically diagramming a preferred flow configuration of the seafood-farming apparatus during a backwash of the solid-waste tank.

FIG. 12 shows a top view schematically diagramming a preferred flow configuration of seafood-farming apparatus 102 during the backwash of solid-waste tank 154. Control valves 168 are preferably set to allow aqueous medium 104 (containing the solid waste materials) to be pumped to the surface via main outlet pipe 266, as shown. The following table (Table D) indicates preferred valve status during the backwash of solid-waste tank 154.

TABLE D

PREFERRED VALVE POSITIONS FOR SECONDARY
BACKWASH OF SOLID-WASTE TANK

Control valve 168A - closed
Control valve 168B - closed
Control valve 168C - closed
Control valve 168D - closed
Control valve 168E - closed
Control valve 168F - closed
Control valve 168G - closed
Control valve 168H - open
Control valve 168I - closed
Control valve 168J - closed
Control valve 168K - closed
Control valve 168L - open (main exit to surface)

Figure 13:
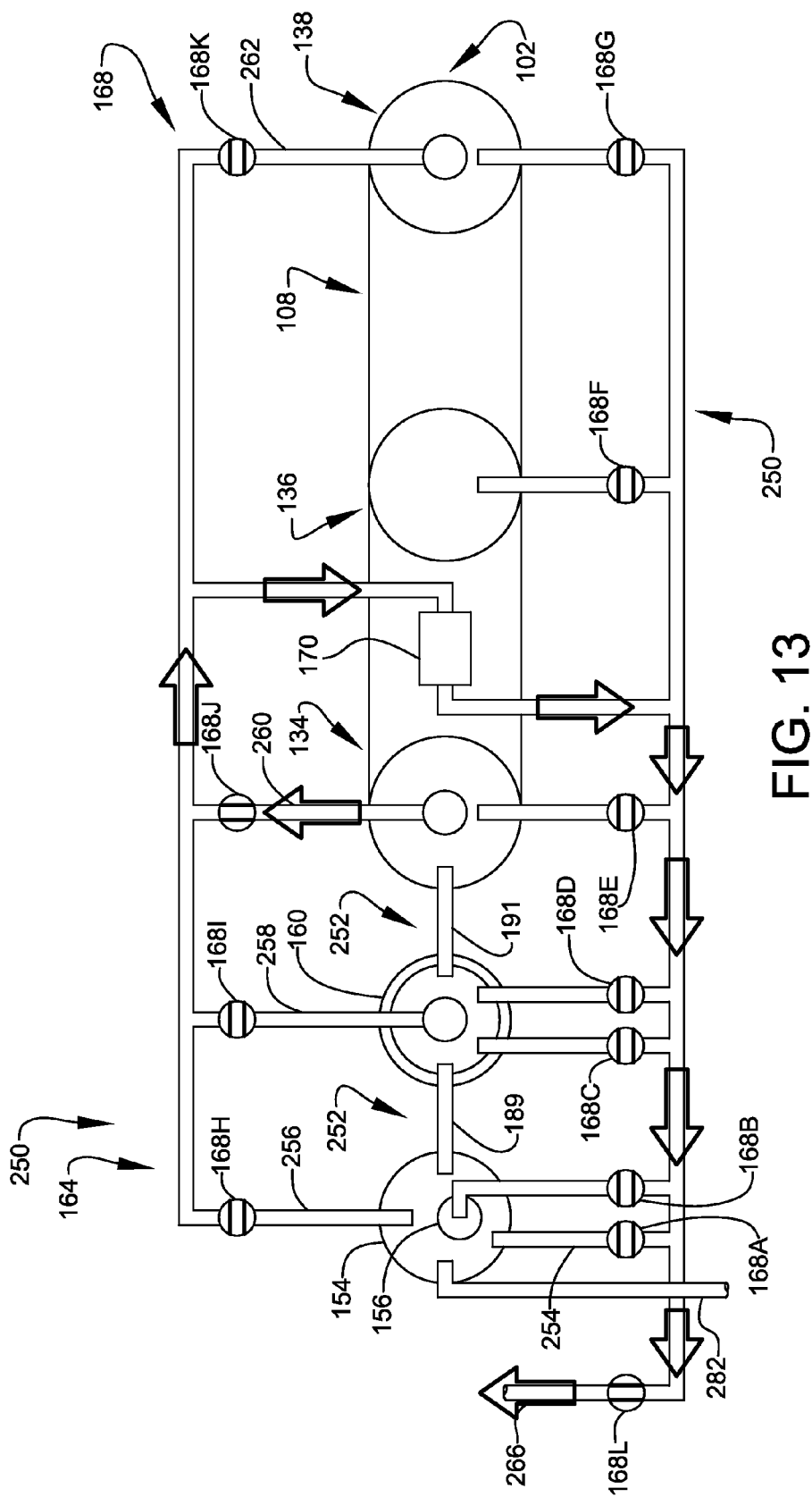
FIG. 13 shows a top view schematically diagramming a preferred flow configuration of the seafood-farming apparatus during a backwash of the first terminating end portion of the enclosed container.

FIG. 13 shows a top view schematically diagramming a preferred flow configuration of seafood-farming apparatus 102 during a backwash of first terminating end portion 120 of enclosed container 108. This preferred backwash operation removes solid waste material from the base of first terminating end portion 120 of enclosed container 108 (see also the sectional view of FIG. 9A). It is noted that aqueous medium 104 (containing the solid waste materials) is immediately pumped to the surface via main outlet pipe 266. The following table (Table E) indicates preferred valve status during backwash of first terminating end portion 120.

TABLE E

PREFERRED VALVE POSITIONS FOR SECONDARY
BACKWASH OF FIRST TERMINATING END PORTION

Control valve 168A - closed
Control valve 168B - closed
Control valve 168C - closed
Control valve 168D - closed
Control valve 168E - closed
Control valve 168F - closed
Control valve 168G - closed
Control valve 168H - closed
Control valve 168I - closed
Control valve 168J - open
Control valve 168K - closed
Control valve 168L - open (main exit to surface)

Figure 14:
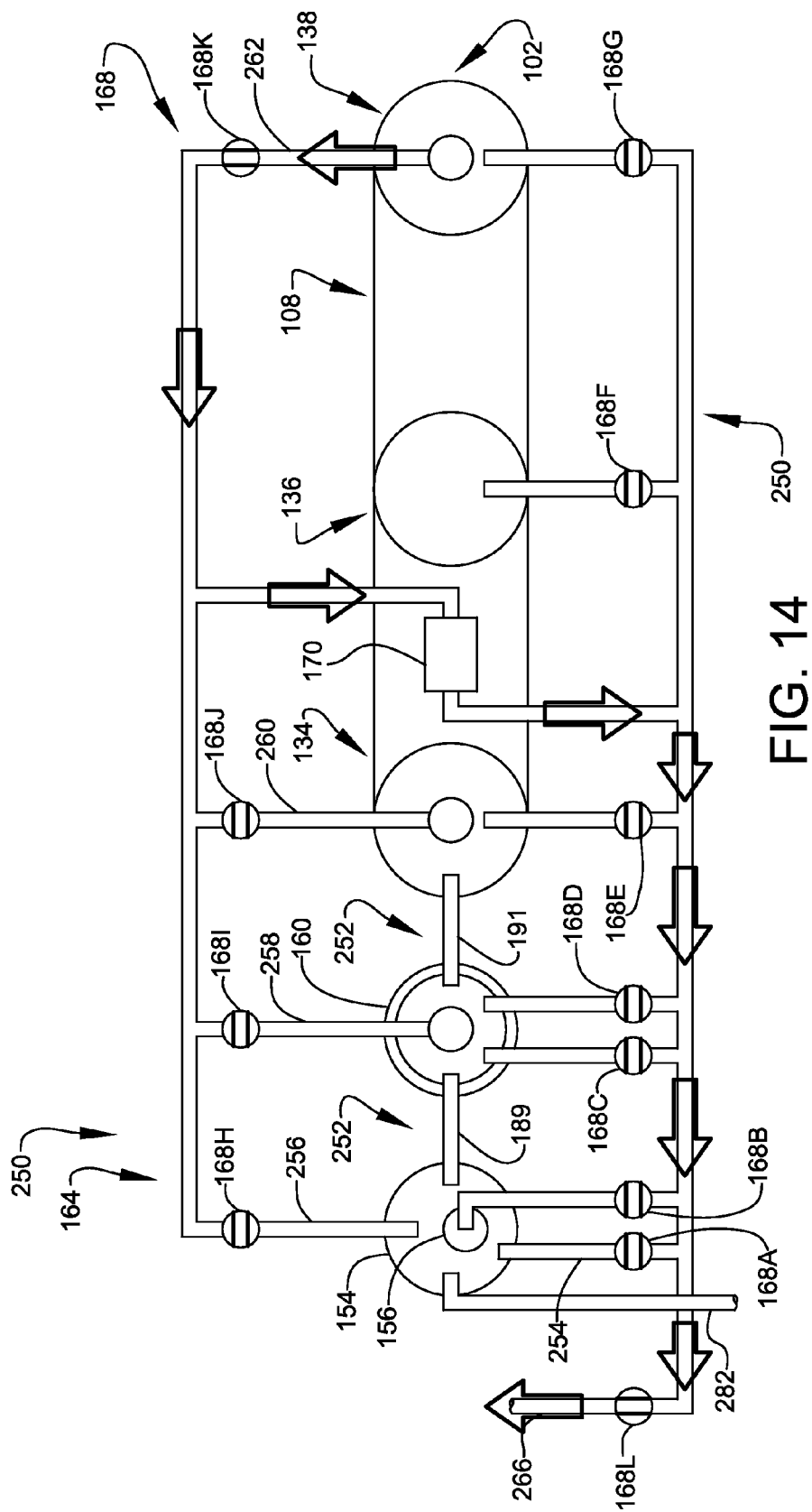
FIG. 14 shows a top view schematically diagramming a preferred flow configuration of the seafood-farming apparatus during a backwash of the second terminating end portion of the enclosed container.

FIG. 14 shows a top view schematically diagramming a preferred flow configuration of seafood-farming apparatus 102 during a backwash of second terminating end portion 122 of enclosed container 108. This preferred backwash operation removes solid waste material from the base of second terminating end portion 122 of enclosed container 108. It is noted that aqueous medium 104 (containing the solid waste materials) is immediately pumped to the surface via main outlet pipe 266. The following table (Table F) indicates preferred valve status during backwash of second terminating end portion 122.

TABLE F

PREFERRED VALVE POSITIONS FOR SECONDARY
BACKWASH OF SECOND TERMINATING END PORTION

Control valve 168A - closed
Control valve 168B - closed
Control valve 168C - closed)
Control valve 168D - closed

TABLE F-continued

PREFERRED VALVE POSITIONS FOR SECONDARY
BACKWASH OF SECOND TERMINATING END PORTION

Control valve 168E - closed
Control valve 168F - closed
Control valve 168G - closed
Control valve 168H - closed
Control valve 168I - closed
Control valve 168J - closed
Control valve 168K - open
Control valve 168L - open (main exit to surface)

The operational condition of each control valve 168 is user settable, preferably by manual adjustments, more preferably controlled, at least in part, by an automated control system. Most preferably, each control valve 168 comprises at least one facility to support remote automatic control. Such preferred automated control features may preferably comprise remote hydraulic control, alternately preferably electric solenoid control, pressure reducing, pressure sustaining, pressure relief, and the like. Automatic control is preferably provided by at least one automatic controller, preferably an electronic controller, more preferably an electronic controller comprising at least one user-programmable automation feature. This preferred feature limits the amount of human labor required to operate seafood-farming apparatus 102. Such automatic controllers are preferably used to set up the operation schedule for each control valve. Products preferred for use as control valves 168 and related automatic controls include those produced by Rain Bird Corporation of Glendora, Calif.

Figure 15:
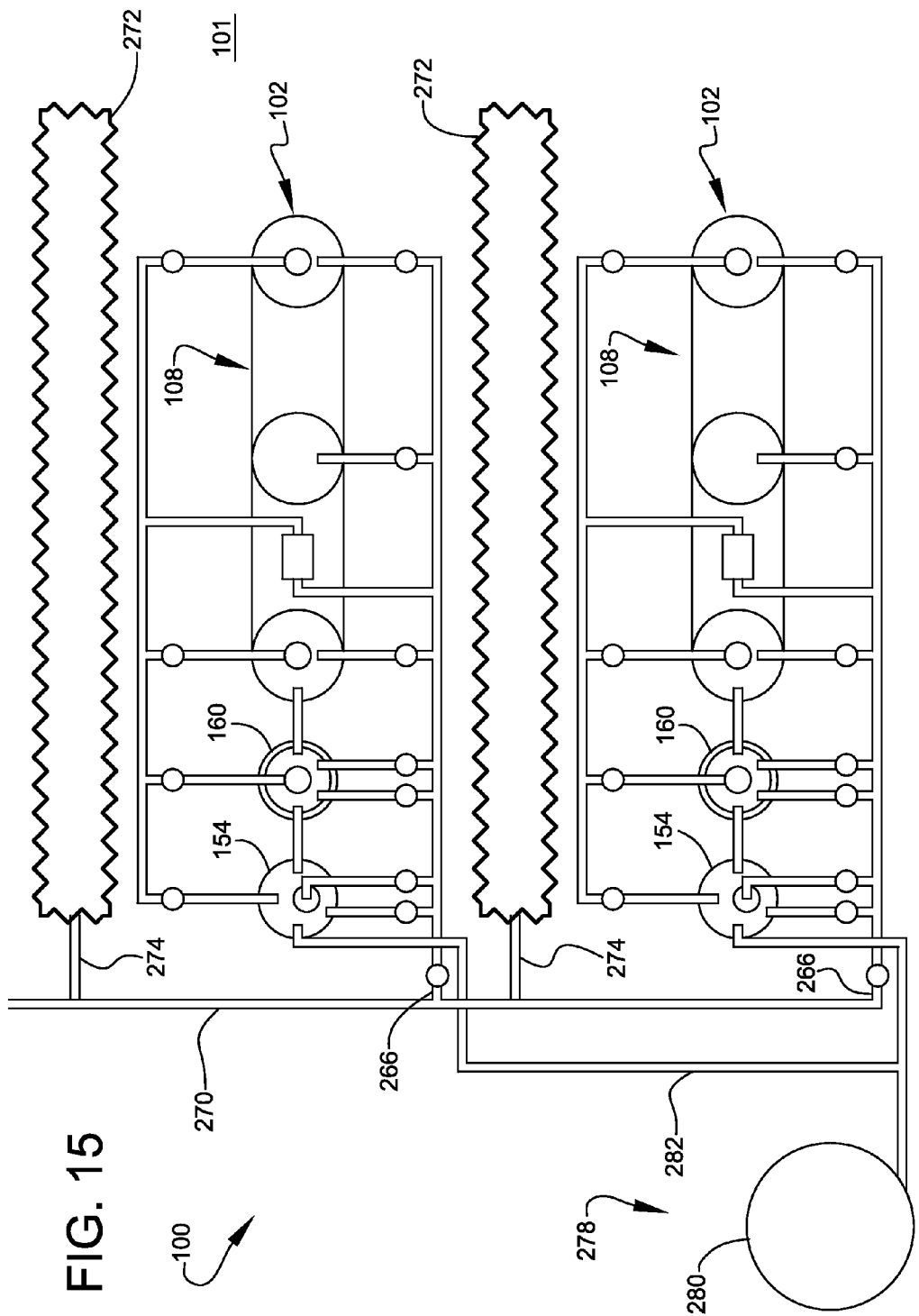
FIG. 15 shows a top view, schematically diagramming surface farming operations within the high-density farming site, according to the preferred embodiments of FIG. 1.

FIG. 15 shows a top view, schematically diagramming surface farming operations within high-density farming site 101, according to the preferred embodiments of FIG. 1. Aquatic farming system 100 preferably comprises a multi-crop farming practice emphasizing overall reduction of the system's environmental footprint over conventional farming practices. Aquatic farming system 100 preferably provides commercial growers with very-high-density production capabilities (and significant space savings for individual or small community operations). This is preferably accomplished by growing the surface crops directly above and between the underground seafood-farming apparatus 102, as shown. The preferred "inverted vertical stacking" of aquatic farming system 100 combines the advantages of hypothetical vertical farming techniques with thermal control afforded by underground production. Furthermore, the preferred use of the waste output of seafood-farming apparatus 102, as a beneficial source of water and organic fertilizer for surface-grown crops, further reduces the system's overall environmental footprint. Upon reading the teachings of this specification, those of ordinary skill in the art will now understand that, under appropriate circumstances, considering such issues as intended use, etc., other backflow discharge arrangements, such as discharging into surface-evaporation ponds, discharging into transpo-evaporation beds, etc., may suffice.

The preferred operation of aquatic farming system 100 is closely tied to the local site in which it is operated. Thus, it is preferred that alternate preferred embodiments of aquatic farming system 100 comprise the land in which high-density farming site 101 is operated. High-density farming site 101 most preferably comprises an inland site of sufficient size and topography to support the burial of seafood-farming apparatus 102. In addition, it is preferred that high-density farming site 101 comprises reasonably close proximity to the intended product markets, thus reducing the environmental impacts related to shipping and transport.

Main outlet pipe 266 preferably discharges to a network of sub-surface irrigation supply lines 270 adapted to deliver aqueous medium 104 (containing the natural fish emulsion) to surface crops 272, as shown. FIG. 1 and FIG. 15 both illustrate a preferred arrangement of surface crop irrigation trenches 274 that feed the emulsion from sub-surface irrigation supply lines 270. Alternately preferably, sub-surface irrigation supply lines 270 are routed to hydroponics houses 276 (it is noted that surface crops 272 may preferably comprise hydroponically-grown plants, conventional surface crops, or a combination of both). It is also noted that the surface farming may also, alternately preferably, include other animal species (such as sheep, cattle, poultry, and the like).

Larger commercial operations preferably utilize multiples of seafood-farming apparatus 102 within a single high-density farming site 101, as shown. In this highly preferred arrangement, grow-out and harvest within each individual seafood-farming apparatus 102 can be staggered to provide essentially continuous harvest of seafood source 106, as further described in connection with FIG. 18.

Preferably, aqueous medium 104 substantially comprises liquid water preferably substantially derived from at least one water source within high-density farming site 101. Fresh makeup water is preferably supplied to seafood-farming apparatus 102 by at least one onsite water source 278. In the embodiment of FIG. 1 and FIG. 15, onsite water source 278 comprises water storage tank 280. The makeup water supplied by water storage tank 280 may preferably originate at an onsite well, municipal water supply, or natural water source. Make-up water preferably directed from water storage tank 280 is preferably carried by make-up water supply lines 282 extending to each seafood-farming apparatus 102, as shown. The fresh make-up water is preferably introduced into seafood-farming apparatus 102 at solid-waste tank 154, as shown. Upon reading the teachings of this specification, those of ordinary skill in the art will now understand that, under appropriate circumstances, considering such issues as intended use, finfish species, etc., additional system arrangements utilizing fresh make-up water, such as the inclusion of one or more separate holding tanks used to temporarily hold the harvested seafood within fresh aerated water (thus reducing the "fishy" taste within the product), etc., may suffice.

Preferred implementations of aquatic farming system 100 preferably comprise an onsite processing facility 284, as shown. Onsite processing facility 284 preferably comprises a means for processing seafood source 106 into a market-ready condition. This preferably enables, in combination with staggered production practices, an essentially continuous supply of market-ready product that can be directly delivered to local markets (at least embodying herein, within such at least one inland site, at least one seafood processing facility structured and arranged to process substantially on-site such at least one seafood source harvested from such at least one seafood-farming-environment apparatus).

Thus, aquatic farming system 100 promotes conservation through water reuse and/or the generation of fertilizer for plants using natural fish emulsion, the elimination of offsite solid waste disposal from intensive aquaculture production, and the significant reduction in needed cropland to simultaneously produce multiple crops. In addition, small efficient commercial installations can be built close to markets therefore reducing transportation costs/environmental impacts related to moving harvested products.

Figure 16:
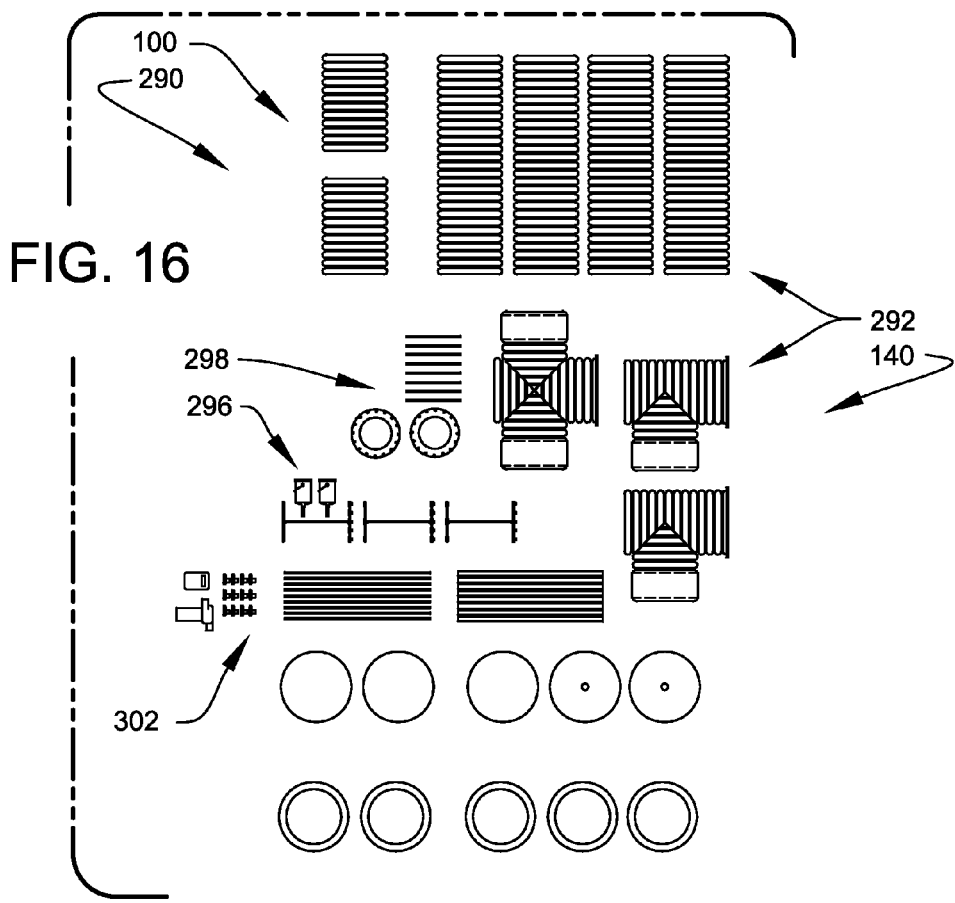
FIG. 16 shows a schematic diagram, illustrating a kit enabling the implementation of the aquatic farming system within the high-density farming site, according to the preferred embodiments of FIG. 1.

FIG. 16 shows a schematic diagram illustrating a kit enabling the rapid implementation of aquatic farming system 100 within a high-density farming site 101, according to the preferred embodiment of FIG. 1. Preferred configurations of seafood-farming apparatus 102, as described above, are readily adaptable to the development of site-assembled "kits" preferably identified herein as seafood-farming apparatus kit 290. Seafood-farming apparatus kit 290 preferably comprises a plurality of direct-burial pipe components 292 structured and arranged to comprise, when assembled, at least one substantially buried watertight container (substantially matching the configuration of the above-described enclosed container 108). Preferably, the length of the watertight container can be selected by specifying the number of pipes segments to be included within the kit. Preferably, direct-burial pipe components 292 are again of a type utilized in conventional gravity-flow wastewater applications (storm sewers, highways, airports, and similar engineered construction) making rapid on-site assembly and installation of the components readily achievable. This preferred construction methodology, of adapting existing commercial drainage piping to produce preferred embodiments of aquatic farming system 100, greatly reduces initial startup time and costs.

Seafood-farming apparatus kit 290 further preferably comprises at least one set of nutrient-supplying sub-system components 296 sufficient to construct at least one nutrient-supplying sub-system substantially equivalent to nutrient-supplying sub-system 142. In addition, seafood-farming apparatus kit 290 comprises at least one set of solid-waste filter sub-system components 298 sufficient to construct at least one solid-waste filter sub-system substantially equivalent to solid-waste filter sub-system 150 (at least embodying herein at least one waste remover structured and arranged to remove unwanted waste from the liquid water contained within such at least one substantially watertight container). Furthermore, seafood-farming apparatus kit 290 further preferably comprises at least one set of liquid circulation network components 302 (pipes, valves, and the like) sufficient to construct at least one liquid circulation network substantially equivalent to liquid circulation network 164. Liquid circulation network components 302 preferably comprise at least one water-inlet connector 304 to connect watertight container to at least one source of the liquid water supplied to the installation site. Upon reading the teachings of this specification, those of ordinary skill in the art will now understand that, under appropriate circumstances, considering such issues as commercial demand, farming costs, regulatory considerations, etc., other kit components, such as automation devices, waterproofing materials, animal stock, feedstock, surface farming devices, communication network components to remote control/monitoring sites, etc., may suffice. Substantially all components of seafood-farming apparatus kit 290 coming into contact with aqueous medium 104 preferably comprise non-corrosive materials having compositions substantially non-toxic to seafood source 106.

Figure 17:
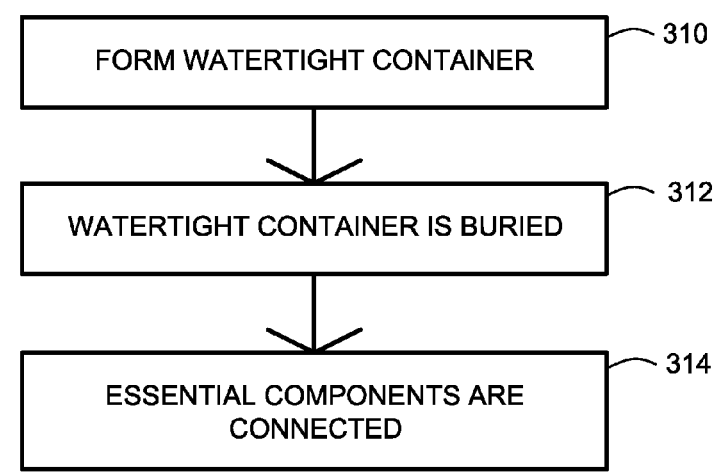
FIG. 17 shows a diagram describing a preferred method of utilizing the kit of FIG. 16 to implement the aquatic farming system within the high-density farming site of FIG. 1.

FIG. 17 shows a diagram describing a preferred method of utilizing the kit of FIG. 16 to implement aquatic farming system 100 within high-density farming site 101 of FIG. 1. The assembly of seafood-farming apparatus kit 290 preferably comprises the following series of steps. Initially, a watertight container (substantially matching the configuration of the above-described enclosed container 108) is formed comprising pipe utilized in gravity-flow wastewater applications, as indicated in preferred step 310. Next, the watertight container is buried substantially underground, preferably using manufacturer-approved installation techniques, as indicated in preferred step 312. As indicated in preferred step 314, essential operational components are preferably assembled and coupled to watertight container 294. These essential components preferably comprise a connection to at least one source of water, nutrient-supplying sub-system components 296, and solid-waste filter sub-system components 298 (at least embodying herein at least one water source structured and arranged to provide liquid water supporting such aquatic farming of the at least one aquatic species, at least one nutrient supplier structured and arranged to supply adequate nutrients to the liquid water supporting such aquatic farming of the at least one aquatic species, and at least one waste remover structured and arranged to remove unwanted waste from the liquid).

Figure 18:
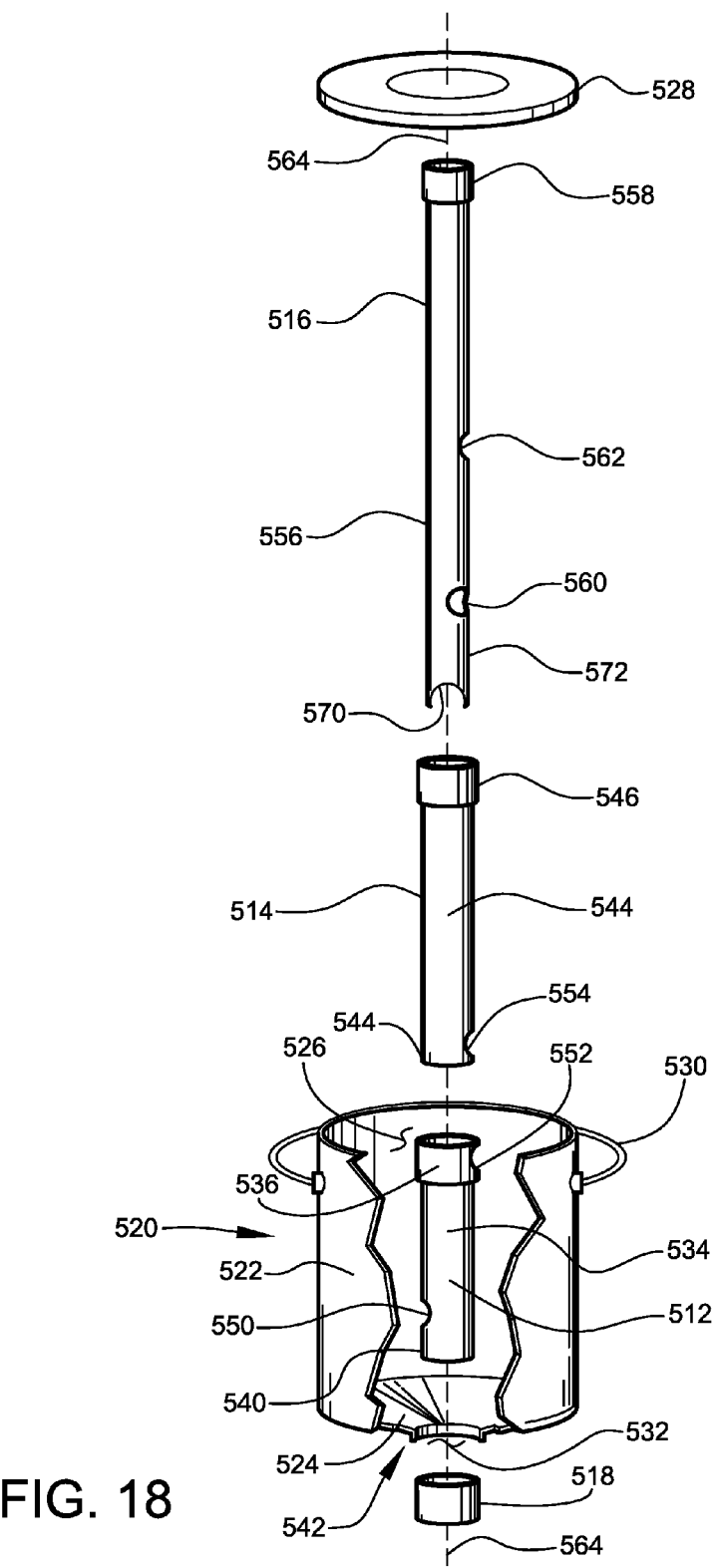
FIG. 18 shows a diagram, describing a preferred method of implementing the aquatic farming system within the high-density farming site, according to the preferred embodiments of FIG. 1

FIG. 18 shows a perspective view illustrating an automated feeding sub-system 500 of nutrient-supplying sub-system 142 of aquatic farming system 100, according to a preferred embodiment 502 of the present invention. Nutrient-supplying sub-system 142 preferably comprises automated feeding sub-system 500, as shown. The automated feeding sub-system 500 preferably comprises one or more feeder mechanisms 504, as shown. Feeder mechanism 504 preferably provides food nutrients from aboveground environment 126 to belowground aquatic location 538, most preferably aqueous medium 104 within hollow interior 116 of enclosed container 108.

Feeder mechanism 504 preferably couples to a spray rotator 506, as shown. Preferably, spray rotator 506 has an uppermost coupling 510 that preferably transfers rotational torque from the spray rotator 506, when the spray rotator 506 is rotating, as shown. The feeder mechanism 504 preferably couples to the uppermost coupling 510 and utilizes the rotational torque from the spray rotator 506 to rotate the feeder mechanism 504, as shown and further explained below.

Figure 19:
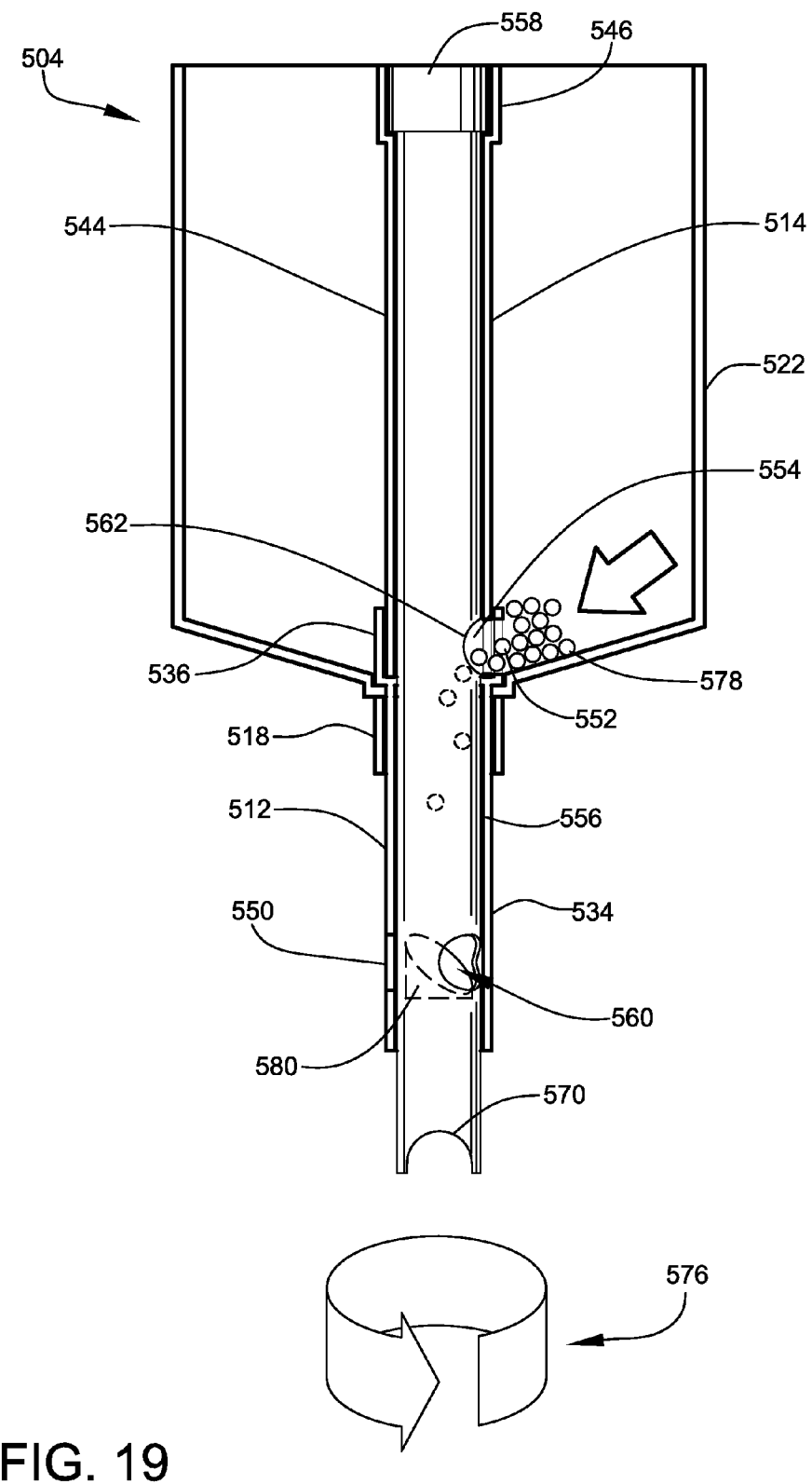
FIG. 19 shows an exploded view, of the feeder mechanism of an automated feeding sub-system, according to the preferred embodiments of FIG. 1.

FIG. 19 shows an exploded view of the feeder mechanism 504 of the automated feeding sub-system 500 of FIG. 1. The feeder mechanism 504 preferably comprises first tube 512, second tube 514, third tube 516, fastening nut 518 and food storage holder 520, as shown. The food storage holder 520 preferably comprises a bucket 522, having a sloped bottom 524, flat open top portion 526, lid 528, handle 530 and bottom aperture 532, as shown.

All of the above feeder components are preferably plastic, preferably PVC plastic. Upon reading this specification, those with ordinary skill in the art will now appreciate that, under appropriate circumstances, considering such issues as cost, structural requirements, available materials, etc., other component materials using materials such as, for example, metals, plastic-like substances, hardwoods, ceramics, etc., may suffice.

First tube 512 preferably comprises first tube portion 534 and first collar portion 536, as shown. The first tube portion 534 is preferably inserted through bottom aperture 532 until first collar portion 536 is resting against the sloped bottom 524, as shown. Bottom aperture 532 is preferably centered in the sloped bottom 524 to facilitate food eventually placed into the bucket 522 gravity feeding into, and through, first tube 512, second tube 514 and third tube 516, as shown and explained further below. Fastening nut 518 is preferably placed over first tube bottom 540 and slid up onto first tube 512 until fastening nut 518 presses tightly against bucket underside 542, as shown. Fastening nut 518 is then preferably secured to the exterior of first tube 512, preferably by permanent adhesive, preferably PVC cement. Upon reading this specification, those with ordinary skill in the art will now appreciate that, under appropriate circumstances, considering such issues as cost, structural requirements, available materials, user preference, etc., other methods of attaching the first tube to the bucket using fastening means such as, for example, other adhesives, threaded connections, other fasteners, removable couplers, press-fit connection, etc., may suffice.

Second tube 514 preferably comprises second tube portion 544 and second collar portion 546, as shown. Bottom portion 544 of second tube 514 preferably fits into first collar portion 536, as shown. Second tube 514 is preferably fitted tightly into first collar portion 536 so that second tube 514 may be rotated within first collar portion 536 only by firmly applied pressure to second tube 514, preferably applied by rotating second collar portion 546.

First tube portion 534 preferably comprises first tube lower aperture 550 and first tube upper aperture 552, as shown. First tube lower aperture 550 is preferably situate below the bucket underside 542, as shown. First tube upper aperture 552 is preferably situate within first collar portion 536, preferably slightly above bottom aperture 532, as shown.

Second tube portion 544 preferably comprises second tube lower aperture 554, preferably placed to be in alignment with first tube upper aperture 552, as shown. A user-adjustable opening is preferably created when the above-described arrangement is produced as a user may rotate second tube portion 544 by grasping second collar portion 546 and placing the respective first tube upper aperture 552 and second tube lower aperture 554 in a fully aligned position providing for a full opening or in a partially-aligned position providing a partial opening.

Third tube 516 preferably comprises third tube portion 556 and third tube collar 558, as shown. Third tube portion 556 preferably fits slidably into second tube portion 544 and first tube portion 534 until third tube collar is nested within second collar portion 546, as shown. Preferably, first tube portion 534 is easily rotatable within second tube portion 544 and first tube portion 534.

Third tube portion 556 preferably comprises third tube lower aperture 560 and third tube upper aperture 562, as shown. Third tube lower aperture 560 is preferably placed so that it will align and create an opening with first tube lower aperture 550 as third tube portion rotates, as shown and further described below. Third tube upper aperture 562 is preferably placed so that it will align and create an opening with second tube lower aperture 554 and first tube upper aperture 552 as third tube portion rotates, as shown and further described below. Each respective first tube 512, second tube 514 and third tube 516 preferably share a central axis 564, as shown.

Third tube portion also preferably comprises rotational torque coupling 570, to couple to uppermost coupling 510, a shown. Preferably, uppermost coupling 510 is a round pipe T-portion, preferably PVC plastic. Third tube portion is preferably U-shaped at the bottom end 572 so it will saddle the uppermost coupling 510 (round pipe T-portion), as shown.

FIG. 20 shows a perspective view illustrating the feeder mechanism 504 of automated feeding sub-system 500 of FIG. 1 in preferred operation. In operation, feeder mechanism 504 is placed onto spray rotator 506 by placing rotational torque coupling 570 onto spray rotator uppermost coupling 510; this arrangement provides a rotational torque force 576 to third tube portion 556 causing third tube portion 556 to rotate. Bucket 522 is preferably filled with at least one selected food 578. As third tube portion 556 rotates, first tube upper aperture 552, second tube lower aperture 554 and third tube upper aperture 562 align and allow food 578 to pass through the apertures until the rotational movement of third tube portion 556 moves third tube upper aperture 562 out of alignment with first tube upper aperture 552 and second tube lower aperture 554, thereby blocking additional food transfer until the next rotational alignment. Upon reading this specification, those with ordinary skill in the art will now appreciate that, under appropriate circumstances, considering such issues as cost, structural requirements, available materials, user preferences, etc., other food transfer adjustments such as, for example, more or less apertures, etc., may suffice.

As food 578 enters third tube portion 556, it preferably falls by gravity to plug 580, preferably angled at about a 45-degree angle and preferably placed within third tube portion 556 so that the food moves toward third tube lower aperture 560, as shown. As third tube portion 556 continues to rotate, third tube lower aperture 560 aligns with first tube lower aperture 550 and food 578 is released from third tube portion 556 and into enclosed container 108, as shown (reference FIG. 1).

Figure 21:
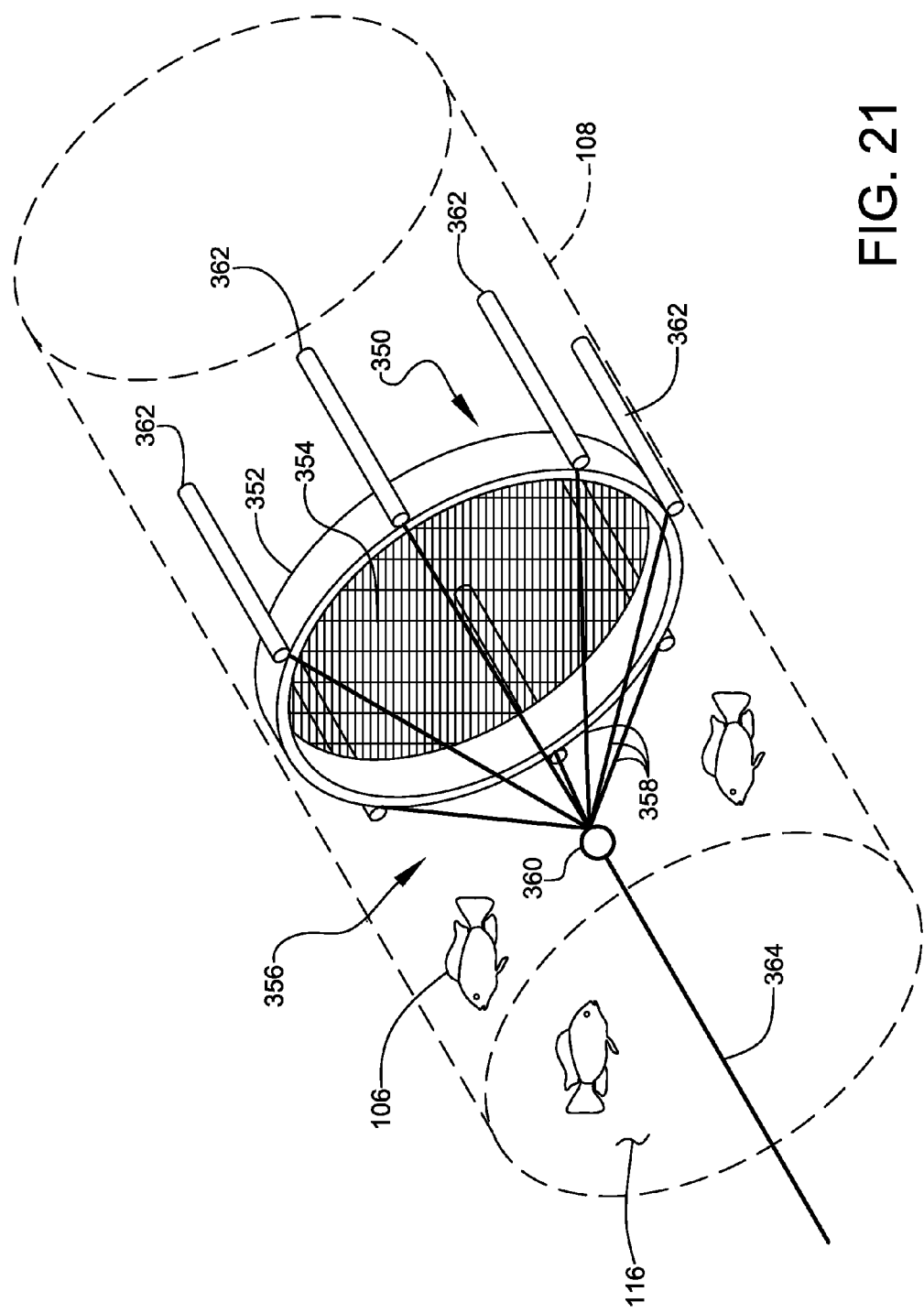
FIG. 21 shows a side perspective view, illustrating a harvesting tool used to assist the harvesting of finfish species of the seafood source, according to a preferred embodiment of the present invention.

FIG. 21 shows a side perspective view illustrating harvesting tool 350 used to assist the harvesting of finfish species of seafood source 106, according to a preferred embodiment of the present invention. It is preferred to harvest finfish species of seafood source 106 from enclosed container 108 by directing the fish stock to second terminating end portion 122 at third accessway 138 (see FIG. 5). This allows the fish to be extracted from enclosed container 108 by hydraulic pumping or other preferred means.

Harvesting tool 350 is preferably sized to fit closely within hollow interior 116 of enclosed container 108, as shown. Preferably, the outer peripheral shape of harvesting tool 350 substantially matches the inner peripheral shape of hollow interior 116 (generally circular cross section in the present embodiment), as shown. Harvesting tool 350 preferably comprises a supportive ring 352 supporting screen portion 354, as shown. Screen portion 354 is preferably structured and arranged to screen seafood source 106 from aqueous medium 104 as harvesting tool 350 is drawn within hollow interior from first terminating end portion 120 toward second terminating end portion 122.

Harvesting tool 350 further preferably comprises tether coupling assembly 356 allowing harvesting tool 350 to be attached to a tether line. Tether coupling assembly 356 preferably comprises a set of flexible cables 358 having first ends coupled to the periphery of supportive ring 352 and second ends coupled to a common pull ring 360, as shown. In addition, a set of backwardly projecting guides 362 are symmetrically mounted to the outer periphery of supportive ring 352, as shown. The backwardly projecting guides 362 preferably assist in maintaining harvesting tool 350 in proper orientation during use.

In a preferred harvesting procedure, spray rotators 506 are disconnected from liquid circulation network 164 and removed from enclosed container 108. Next, the harvesting crew guides a pull line 364 through the length of elongated tube 118 by floating the line between first accessway 134 and third accessway 138. The end of the pull line 364 is then coupled to pull ring 360 and harvesting tool 350 is lowered through first accessway 134 to a position within elongated tube 118. Next, harvesting tool 350 is draw along hollow interior 116 forcing seafood source 106 toward second terminating end portion 122.

Figure 22:
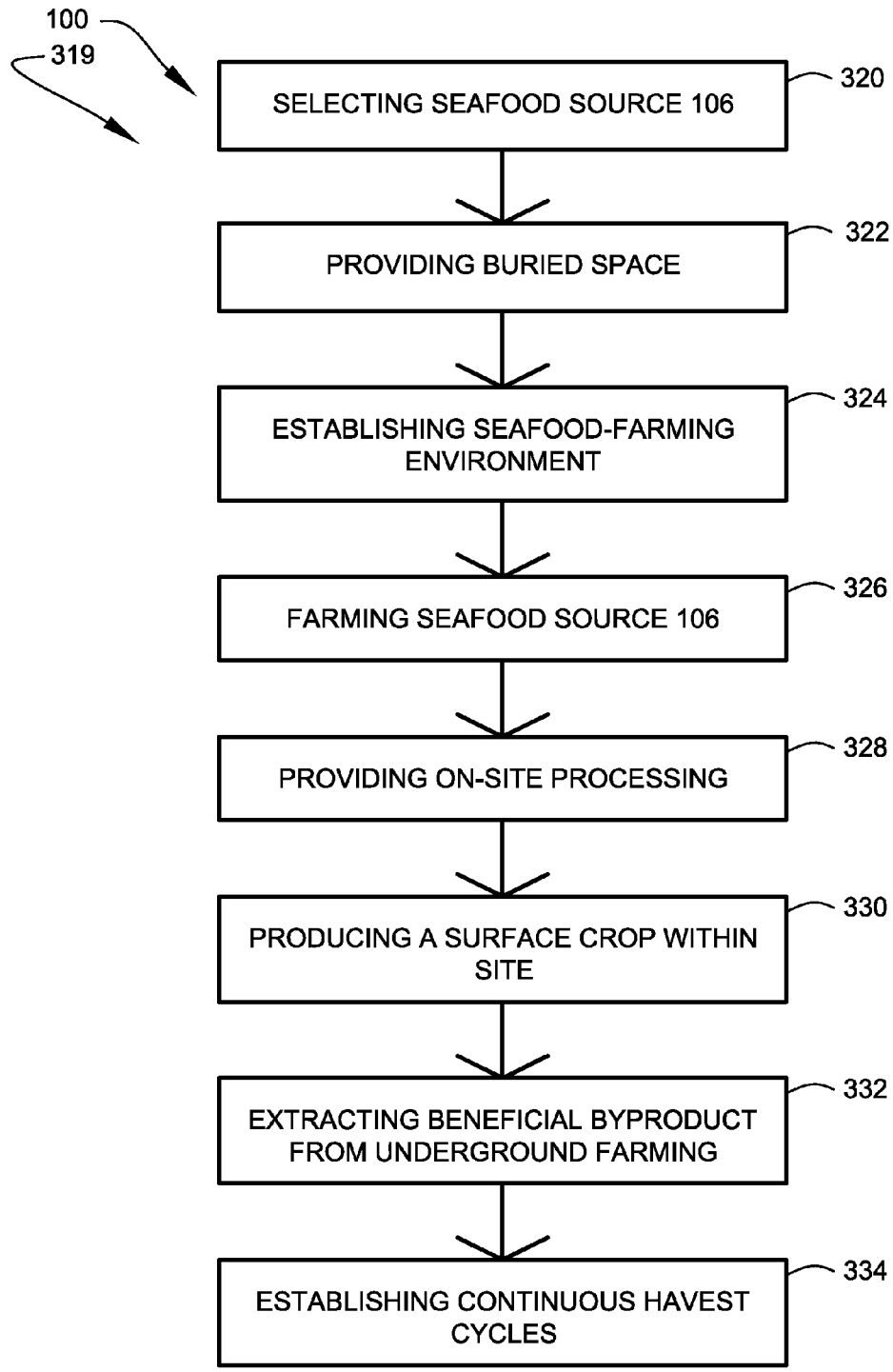
FIG. 22 shows a diagram, describing a preferred method of implementing the aquatic farming system of FIG. 1, within the high-density farming site, according to the preferred methods and embodiments of the present invention.

FIG. 22 shows a diagram describing a preferred method 319 of implementing aquatic farming system 100 within high-density farming site 101, according to the preferred embodiments of FIG. 1. More specifically, in accordance with the above-described preferred embodiments of the present invention, there is described and enabled, a preferred method 319 of farming seafood preferably comprising the following steps. First, selecting at least one seafood source 106, as indicated in preferred step 320, applicant has determined that cichlid finfish including those of the genus Tilapia are especially well suited for rearing within seafood-farming apparatus 102. Next, as indicated in preferred step 322, providing at least one substantially buried space, adaptable to farming seafood source 106, within a selected site. As previously noted, step 322 preferably comprises the establishment of at least one subterranean enclosed container 108 utilizing wastewater piping components. Next, as indicated in preferred step 324, a seafood farming environment (adapted to farm seafood source 106) is established within the substantially buried space. As previously described, the step of establishing a seafood farming environment at least comprises the operational integration of the substantially buried space (and the aqueous medium 104 contained within) with at least one nutrient supplier substantially equivalent to nutrient-supplying sub-system 142, and at least one waste remover substantially equivalent to solid-waste filter sub-system 150. As a result, the above-described arrangements enable the farming of seafood source 104 within the aquatic farming environment, as indicated in preferred step 326.

In a subsequent preferred step, identified herein as step 328, at least one seafood processing facility (onsite processing facility 284) is provided to process seafood source 106 harvested from the substantially buried space.

In another preferred step, identified herein as step 330, a surface-grown farm product is produced by selecting at least one surface-grown farm crop (surface crops 272) to be grown within at least one surface space generally above the substantially buried space. In preferred step 330, at least a portion of surface crops 272 are disposed at an elevation vertically above enclosed container 108. Water, sunlight, and other essential nutrients are preferably provided to establish a surface farming environment conducive to the farming of the surface-grown farm products.

In another preferred step, identified herein as step 332, the above-described backwash procedures are used to extract, from the farming of seafood source 106, at least one aquatic-farming-associated byproduct beneficially usable in the surface farming operations. More specifically, aqueous medium 104 (containing the natural fish emulsion) is utilized to beneficially enhance the surface farming of surface crops 272 by providing a natural source of fertilizer to the surface-grown crops.

In another preferred step, identified herein as step 334, multiple seafood-farming apparatus 102 (at least embodying herein a plurality of substantially buried spaces each one adaptable to farming at least one such at least one aquatic food source) are utilized to establish a substantially continuous harvest of seafood source 106. This preferred step is enabled by first identifying at least one production time-cycle of aquatic food source 106. The production time-cycle preferably comprises a cycle start time and a cycle harvest time and is closely tied to the species of aquatic animal being reared. A suitable aquatic farming environment is preferably established within each of the plurality of seafood-farming apparatus 102. Preferably, using the production time-cycle to farm aquatic food source 104, production between at least two of the seafood-farming apparatus 102 is staggered sequentially by appropriately shifting the cycle harvest times within each; thus, extended harvest durations may be established.

Figure 23:
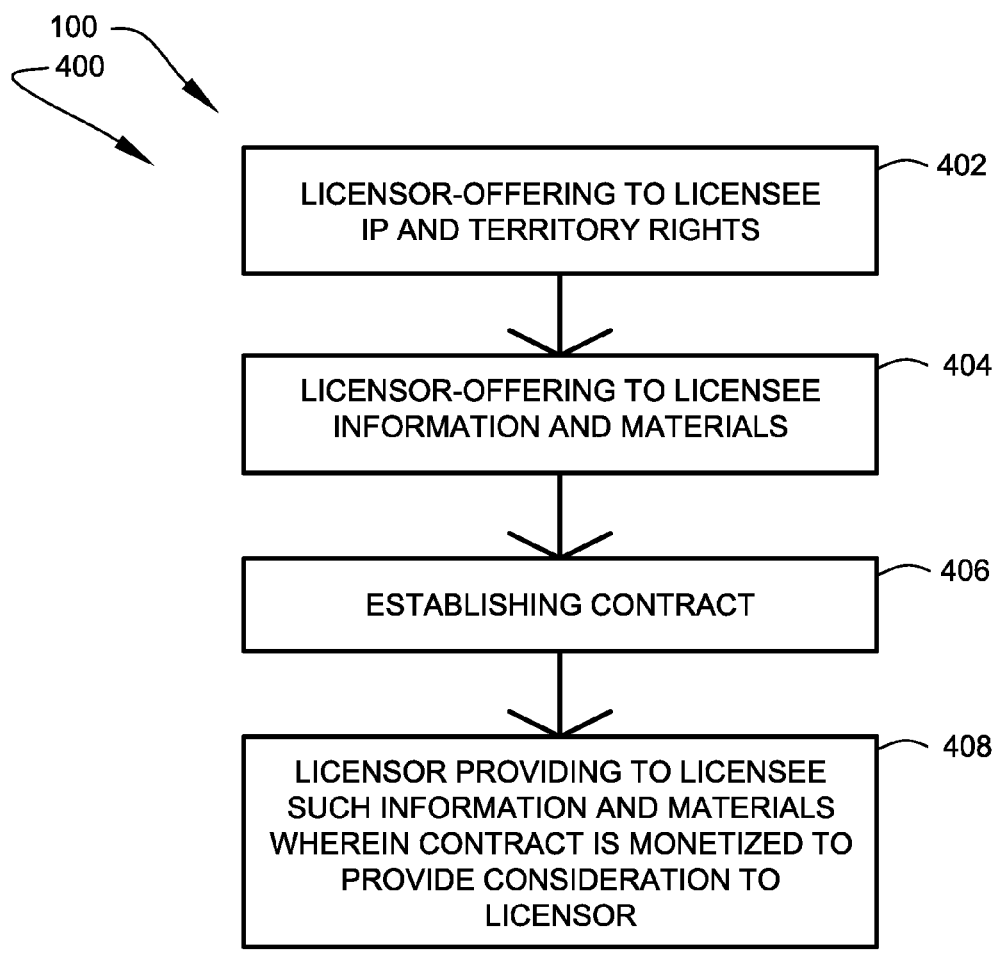
FIG. 23 shows a diagram, describing another preferred method relating to the establishment of at least one substantially-underground aquatic farming environment useful in aquatic farming of the aquatic species, according to the preferred methods and embodiments of the present invention.

FIG. 23 shows a diagram describing a preferred method 400 relating to the establishment of at least one substantially-underground aquatic farming environment useful in aquatic farming of aquatic species 106, according to the preferred embodiments of FIG. 1. Method 400 of aquatic farming system 100 preferably comprises the following preferred steps.

First, there is a licensor-offering, to a potential licensee, to license intellectual property relating to the substantially-underground aquatic farming environment. The licensor-offering preferably includes stipulations regarding license territory (including the proposed farming site), as indicated in preferred step 402. Next, there is a licensor-offering, to the potential licensee, to assist in providing materials and information relating to on-site construction (preferably at least plans, specifications, piping, and controls), relating to the proposed farming site, of the substantially-underground aquatic farming environment, as indicated in preferred step 404.

Next, as indicated in preferred step 406, at least one contractual agreement is received from the potential licensee relating to the licensor-offering. Finally, with assistance from the licensor, such materials and information are provided (relating to such at least one contractual agreement) to the licensee, wherein the contractual agreement is monetized to provide consideration to the licensor, as indicated in preferred step 408. It is noted that preferred step 408 of providing such materials and information may preferably comprise the supplying of a plurality of direct-burial pipe components structured and arranged to comprise, when assembled, at least one apparatus substantially equivalent to seafood-farming apparatus 102.

In addition, method 400 further comprises the additional preferred step 410 of providing, with assistance from the licensor, relating to the contractual agreement, to the licensee, assistance in transport of crops produced by the farming to be packaged and distributed to receiving markets. Furthermore, method 400 further comprises the preferred step 412 of providing, with assistance from the licensor, relating to the contractual agreement, to the licensee, assistance with monetizing crops produced by the farming operations.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system related to farming at least one seafood source comprising: a) at least one seafood-farming-environment apparatus structured and arranged with a single horizontal elongated tube structured and arranged to comprise at least one hollow interior to farm at least one seafood source in at least one horizontal raceway that is in a completely buried space; without the aid of an enclosure of an above ground facility b) wherein at least one seafood-farming-environment apparatus comprises i) at least one nutrient supplier structured and arranged to supply adequate nutrients to at least one aqueous medium supporting farming of at least one seafood source, and ii) at least one waste remover structured and arranged to remove unwanted waste from at least one aqueous medium; wherein at least one seafood-farming-environment apparatus is structured and arranged such that, when completely buried at a minimum of two feet from the top of the horizontal raceway to the surface, the below-ground burial provides assistance in temperature control of at least one completely buried seafood farming environment; wherein at least one aerator structured and arranged to aerate at least one aqueous medium; medium wherein the at least one waste remover comprising at least one solid-waste filter structured and arranged to filter solid-waste materials from at least one aqueous medium; at least one chemical controller structured and arranged to maintain, within at least one aqueous medium, a safe level of deleterious chemical contaminants compatible with the farming of at least one seafood source; wherein: a) at least one completely buried seafood-farming-environment apparatus is structured and arranged such that, when completely buried, the below-ground burial provides assistance in limiting photo illumination within at least one enclosed horizontal raceway; b) such limiting of photo illumination assists in inhibiting the growth of deleterious photosynthetic microorganisms within at least one enclosed horizontal raceway of at least one completely buried seafood farming environment; wherein at least one completely buried seafood-farming-environment apparatus further comprises at least one completely buried liquid circulation network structured and arranged to circulate at least one aqueous medium sequentially between at least one enclosed horizontal raceway, at least one completely buried solid waste filter, and at least one completely buried chemical controller; wherein the system further comprises: a) at least one accessway structured and arranged to provide access to at least one hollow interior from at least one aboveground environment; b) wherein at least one accessway comprises at least one aboveground access opening structured and arranged to provide access to at least one hollow interior; and c) at least one air-exchanging passage structured and arranged to provide at least one exchange of air between at least one aboveground environment and at least one hollow interior; d) wherein at least one exchange of air between at least one aboveground environment and at least one hollow interior provides fluid communication between the air and at least one aqueous medium.

2. The system according claim 1 wherein: a) at least one substantially elongated tube comprises at least one first terminating end portion, at least one second terminating end portion, and at least one tube length extending there between; b) at least one first terminating end portion comprises at least one first accessway; and c) at least one second terminating end portion comprises at least one second accessway.

3. The system according to claim 2 wherein: a) at least one substantially elongated tube comprises at least one third and at least one accessway structured and arranged to provide at least one third access to at least one hollow interior from at least one aboveground environment; and b) at least one third of one accessway is situated between at least one first terminating end portion and at least one second terminating end portion.

4. The system according claim 3 wherein at least one liquid circulation network comprises: a) at least one circulator pump structured and arranged to provide pump-assisted circulation of at least one aqueous medium within at least one liquid circulation network; and b) at least one control valve structured and arranged to controllably alter the sequence of circulation of at least one aqueous medium between at least one substantially enclosed container, at least one solid-waste filter, and at least one chemical controller.

5. The system according to claim 4 wherein at least one solid-waste filter comprises: a) at least one solid-waste tank structured and arranged to contain an amount of at least one aqueous medium to be filtered of solid-waste materials; b) at least one solid-waste-tank inlet structured and arranged to inlet at least one flow of at least one aqueous medium, containing unsettled quantities of solid waste materials; c) removably located within at least one solid-waste tank, at least one solid-waste receptacle structured and arranged to receive at least one flow from at least one solid-waste-tank inlet; d) wherein at least one liquid circulation network is structured and arranged to deliver at least one aqueous medium, containing unsettled quantities of solid waste materials, to at least one solid-waste-tank inlet from at least one substantially enclosed container; e) wherein at least one solid-waste receptacle comprises at least one peripheral wall structured and arranged to define at least one hollow interior portion; f) wherein at least one peripheral wall comprises at least one selectively-permeable wall material structured and arranged to selectively restrict passage of solid waste materials and selectively allow passage of at least one aqueous medium there through; g) wherein solid waste materials selectively removed from at least one aqueous medium are retained within at least one hollow interior portion; h) wherein at least one solid-waste filter further comprises at least one solid-waste-tank outlet structured and arranged to outlet at least one flow of at least one aqueous medium, substantially free of unsettled quantities of solid waste materials, to at least one chemical controller.

6. The system according claim 5 wherein: a) at least one aqueous medium, containing unsettled quantities of solid waste materials, is introduced into at least one solid-waste receptacle under fluid pressure generated by at least one circulator pump; and b) at least one circulator pump is further structured and arranged to fragment solid waste materials prior to reaching at least one solid-waste tank.

7. The system according claim 6 wherein: a) at least one chemical controller comprises at least one biological filter structured and arranged to biologically filter at least one aqueous medium; b) wherein such biological filter controls levels of deleterious chemical contaminants through at least one biological process utilizing at least one biofiltering microorganism.

8. The system according to claim 7 wherein at least one biological filter comprises: a) at least one biofilter tank structured and arranged to contain an amount of at least one aqueous medium to be biologically filtered; and b) located in fluid communication with at least one aqueous medium contained within at least one biofilter tank, primary biological support media structured and arranged to support colonization and growth of at least one biofiltering microorganism; c) wherein at least one biofilter tank comprises i) at least one biofilter-tank inlet structured and arranged to be in fluid communication with at least one liquid circulation network, and ii) at least one biofilter-tank outlet structured and arranged to outlet at least one aqueous medium from at least one biofilter tank to at least one liquid circulation network; d) wherein at least one liquid circulation network is structured and arranged to at least one substantially enclosed container.

9. The system according to claim 8 wherein at least one solid-waste tank and at least one biofilter tank each comprise a liquid-holding capacity of at least 500 gallons.

10. The system according to claim 8 further comprising: a) at least one harvesting tool structured and arranged to assist harvesting of at least one seafood source; b) wherein at least one harvesting tool comprises i) at least one screen structured and arranged to screen at least one seafood source from at least one aqueous medium within at least one hollow interior, and ii) at least one screen tether structured and arranged to draw at least one screen along at least one hollow interior between at least one first terminating end portion and at least one second terminating end portion; c) wherein harvesting of at least one seafood source from at least one second accessway is assisted by moving at least one seafood source toward at least one second terminating end portion.

11. The system according to claim 8 wherein at least one biological filter further comprises: a) located in fluid communication with at least one aqueous medium of at least one biofilter tank, at least one substantially cylindrical support surface structured and arranged to support primary biological support media in at least one position forming at least one outer annular layer substantially covering at least one cylindrical support surface; b) wherein at least one cylindrical support surface comprises at least one biomedia rotator structured and arranged to rotate primary biological support media about a substantially vertical axis of rotation within at least one aqueous medium of at least one biofilter tank; c) wherein at least one biomedia rotator comprises i) at least one fluid coupler structured and arranged to operably couple at least one biomedia rotator to at least one liquid circulation network; and ii) at least one first fluid-ejecting nozzle structured and arranged to generate at least one torque force by pressurized ejection of at least one aqueous medium; and d) wherein operation of at least one first fluid-ejecting nozzle is enabled by pressurization of at least one aqueous medium by at least one circulator pump.

12. The system according to claim 11 wherein: a) at least one cylindrical support surface defines at least one hollow interior portion structured and arranged to hold at least one tertiary filter media; b) both at least one cylindrical support surface and at least one secondary filter media are structured and arranged to be substantially permeable to at least one aqueous medium; and c) tertiary filter media within such at least one hollow interior portion is in fluid communication with at least one aqueous medium.

13. The system according claim 12 wherein at least one biological filter further comprises: a) at least one biofilter cleaner structured and arranged to clean particulates from such at least one outer annular layer of at least one biological support media; b) wherein at least one biofilter cleaner comprises at least one second fluid-ejecting nozzle structured and arranged to flush at least one outer annular layer with at least one pressurized stream of at least one aqueous medium.

14. The system according to claim 13 wherein at least one aerator comprises: a) at least one fluid coupler structured and arranged to operably couple at least one aerator to at least one liquid circulation network, and b) at least one sprayer structured and arranged to generate at least one dispersing spray of at least one aqueous medium; c) wherein operation of said at least one sprayer is enabled by pressurization of at least one aqueous medium by at least one circulator pump; and d) wherein passage of at least one dispersing spray through air assists in maintaining levels of dissolved oxygen within at least one aqueous medium.

15. The system according to claim 14 wherein at least one sprayer comprises: a) a plurality of spray nozzles, each one structured and arranged to generate at least one dispersing spray; and b) at least one spray rotator structured and arranged to rotate plurality of spray nozzles; c) wherein at least one spray rotator comprises at least one third fluid-ejecting nozzle structured and arranged to generate at least one torque force by pressurized ejection of at least one aqueous medium; and d) wherein operation of at least one third fluid-ejecting nozzle is enabled by pressurization of at least one aqueous medium by at least one circulator pump.

16. The system according to claim 15 wherein at least one aerator is located within at least one accessway.

17. The system according to claim 16 wherein: a) at least one accessway comprises at least one removable accessway cover structured and arranged to removably cover at least one above-ground access opening; b) wherein at least one removable accessway cover comprises i) at least one lower cover surface structured and arranged to be, when covering at least one above-ground access opening, oriented generally toward at least one hollow interior, and ii) fitted to at least one lower cover surface, at least one secondary biological support media structured and arranged to support colonization and growth of at least one biofiltering microorganism; iii) wherein at least one dispersing spray generated by each one of plurality of spray nozzles is directed to impinge at least one secondary biological support media.

18. The system according to claim 16 wherein at least one containment boundary comprises at least one heat-exchanging composition structured and arranged to assist exchange of thermal heat between at least one aqueous medium within at least one containment boundary and at least one underground environment external of at least one containment boundary.

19. The system according to claim 18 wherein at least one substantially enclosed container further comprises at least one hollow cylindrical pipe having a diameter of between about 24 inches and about 48 inches.

20. The system according to claim 19 wherein: a) at least one hollow cylindrical pipe is of a type utilized in gravity-flow wastewater applications; and b) at least one hollow cylindrical pipe comprises at least one substantially non-metallic composition.

21. The system according to claim 20 wherein a) at least one seafood-farming-environment apparatus substantially comprises non-corrosive materials; and b) non-corrosive materials comprise compositions substantially non-toxic to such at least one seafood source.

22. The system according to claim 21 wherein at least one hollow cylindrical pipe is oriented substantially horizontally during such below-ground burial.

23. The system according to claim 22 wherein at least one hollow cylindrical pipe comprises a linear length, extending between at least one first terminating end portion and at least one second terminating end portion, of between about 100 feet and about 300 feet.

24. The system according to claim 15 wherein at least one aerator comprises at least one torque force coupler structured and arranged to transfer at least one portion of at least one torque force.

25. The system according to claim 24 wherein at least food supplier comprises: a) at least one food holder structured and arranged to hold at least one volume of food; b) wherein at least one food holder is structured and arranged to store at least one volume of food in a weather-tight condition; c) wherein at least one food holder is structured and arranged to provide at least one timed food release; d) wherein at least one food holder is structured and arranged to provide at least one measured quantity food release; e) wherein at least one food holder is structured and arranged to provide food distribution in an aquatic environment f) wherein at least one food holder is structured and arranged to couple with at least one torque force coupler; g) whereby when coupled with at least one torque force coupler, at least one food holder provides timed distribution of a measured quantity of food.

26. The system according to claim 25 wherein at least food supplier comprises at least one above-ground food holder structured and arranged to provide timed distribution of a measured quantity of food below ground.

27. The system according to claim 25 wherein at least food supplier further comprises: a) at least one food conduit structured and arranged to assist transfer of food from above-ground to below-ground using gravity; b) wherein at least one food conduit comprises at least two nested rotating tubes; c) wherein each of at least two nested rotating tubes comprising at least one respective aperture, in alignment with each other respective aperture, and structured and arranged to allow food passage when apertures overlap during rotation of at least two nested rotating tubes; d) wherein rotation of at least two nested rotating tubes allows food passage when apertures overlap.

28. The system according to claim 27 wherein controlling the rotation speed of at least two nested rotating tubes provides measured quantity food release.

29. The system according to claim 28 wherein varying at least one aperture area of at least one respective aperture provides measured quantity food release.

30. The system according to claim 25 wherein at least one timed food release is a continuous food release.

31. The method according to claim 1 further comprising steps of: a) selecting at least one surface-grown farm product; b) providing, disposed at an elevation vertically above at least one substantially buried space, at least one surface space adaptable to farming at least one surface-grown farm product; c) providing at least one surface farming environment structured and arranged to farm at least one surface-grown farm product within at least one at least one surface space; and d) surface farming at least one surface-grown farm product utilizing at least one surface farming environment.

32. The method according to claim 31 further comprising steps of: a) extracting from such farming of at least one seafood source at least one aquatic-farming-associated byproduct beneficially usable in surface farming; and b) utilizing at least one farming-associated byproduct to beneficially enhance surface farming.

33. The method according to claim 32 further comprising steps of: a) identifying at least one production time-cycle of at least one aquatic food source, wherein at least one production time-cycle comprises at least one cycle start time and at least one cycle harvest time; b) providing a plurality of substantially buried spaces each one adaptable to farming at least one aquatic food source; c) providing within each substantially buried space of plurality of substantially buried spaces, at least one aquatic farming environment structured and arranged to farm at least one aquatic food source; d) using at least one production time-cycle to farm at least one aquatic food source in at least one farming environment; and e) staggering sequentially at least two at least one cycle harvest times; f) wherein at least one extended harvest duration may be established.

* * * * *